United States Patent
Toutov et al.

(10) Patent No.: US 12,498,245 B2
(45) Date of Patent: Dec. 16, 2025

(54) EMBEDDING A MAGNETIC MAP INTO AN IMAGE FILE

(71) Applicant: Astra Navigation, Inc., Escondido, CA (US)

(72) Inventors: Alexandre Toutov, Inverary (CA); Maryna Mukhina, Kyiv (UA); Svitlana Ilnytska, Kyiv (UA)

(73) Assignee: Astra Navigation, Inc., The Woodlands, TX (US)

( * ) Notice: Subject to any disclaimer, the term of this patent is extended or adjusted under 35 U.S.C. 154(b) by 0 days.

(21) Appl. No.: 17/838,997

(22) Filed: Jun. 13, 2022

(65) Prior Publication Data

US 2023/0003544 A1    Jan. 5, 2023

Related U.S. Application Data

(60) Provisional application No. 63/210,411, filed on Jun. 14, 2021.

(51) Int. Cl.
 *G01C 21/00*     (2006.01)
 *G06T 11/00*     (2006.01)
(52) U.S. Cl.
 CPC ............ *G01C 21/38* (2020.08); *G06T 11/001* (2013.01); *G06T 2210/32* (2013.01)
(58) Field of Classification Search
 CPC .... G01C 21/38; G06T 11/001; G06T 2210/32
 See application file for complete search history.

(56) References Cited

U.S. PATENT DOCUMENTS

| 10,655,450 B2* | 5/2020 | Pham ................... E21B 47/022 |
| 2009/0088974 A1 | 4/2009 | Yasan et al. |

(Continued)

FOREIGN PATENT DOCUMENTS

| CN | 101867868 | 10/2010 |
| CN | 101867868 A | 10/2010 |

(Continued)

OTHER PUBLICATIONS

International Search Report and Written Opinion for International Application No. PCT/US2021/037681, 10 pages, May 25, 2022.

(Continued)

*Primary Examiner* — Kee M Tung
*Assistant Examiner* — Khoa Vu

(57) ABSTRACT

In one embodiment, a method includes accessing a magnetic map of an area that includes magnetic-field values for locations in the area. The method also includes accessing an image file that includes pixels that correspond to the locations and include components. The image file also includes a first matrix with elements that each include color values. The components of the pixels include links to elements in the first matrix. The method also includes embedding portions of the magnetic map into the image file by generating a second matrix for the image file including elements that represent the magnetic-field values and, for the locations in the area, writing to the components of the pixels corresponding to the locations links to elements of the second matrix. The method also includes communicating the image file, with the portions of the magnetic map embedded in it, to computing devices for navigation or localization.

40 Claims, 65 Drawing Sheets

(56) References Cited

U.S. PATENT DOCUMENTS

| | | | |
|---|---|---|---|
| 2009/0150457 | A1 | 6/2009 | Nakamura et al. |
| 2012/0038673 | A1* | 2/2012 | Iwata ............... G01R 33/56341 |
| | | | 345/441 |
| 2013/0279543 | A1 | 10/2013 | Torimoto et al. |
| 2014/0029136 | A1 | 1/2014 | Sugii |
| 2014/0129136 | A1 | 5/2014 | Celia |
| 2015/0198722 | A1 | 7/2015 | Ben-Akiva et al. |
| 2016/0116290 | A1 | 4/2016 | Haverinen et al. |
| 2016/0187142 | A1 | 6/2016 | Larsen et al. |
| 2016/0202064 | A1 | 7/2016 | Haverinen |
| 2016/0379074 | A1* | 12/2016 | Nielsen ................ G01S 19/485 |
| | | | 348/143 |
| 2017/0089706 | A1* | 3/2017 | Ribeiro .................. G06F 17/16 |
| 2017/0102467 | A1 | 4/2017 | Nielsen et al. |
| 2017/0299724 | A1 | 10/2017 | Hsu et al. |
| 2018/0080768 | A1* | 3/2018 | Vasilyuk ................ G01C 17/38 |
| 2018/0283048 | A1 | 10/2018 | Hage et al. |
| 2018/0283882 | A1 | 10/2018 | He et al. |
| 2019/0128673 | A1 | 5/2019 | Faragher et al. |
| 2019/0277638 | A1 | 9/2019 | Larsen |
| 2020/0103477 | A1* | 4/2020 | Berkovich ......... G01R 33/0035 |
| 2020/0264316 | A1 | 8/2020 | Langstraat et al. |
| 2020/0293508 | A1 | 9/2020 | Tan et al. |
| 2021/0342372 | A1* | 11/2021 | Simonson ........... G06F 16/2458 |

FOREIGN PATENT DOCUMENTS

| | | |
|---|---|---|
| KR | 20180072914 A | 7/2018 |
| WO | 2021067140 A1 | 4/2021 |

OTHER PUBLICATIONS

"GeoTIFF Format for IRS Digital Data Products" Government of India, Jul. 2022.

Angelis, et al., An Experimental System for Tightly Coupled Integration of GPS and AC Magnetic Positioning, IEEE Transactions on Instrumentation and Measurement, vol. 65, No. 5, pp. 1232-1241, May 2016.

Ashraf, et al., Floor Identification Using Magnetic Field Data with Smartphone Sensors, www.mdpi.com/journal/sensors, Jun. 3, 2019.

Canciani, et al., Absolute Positioning Using The Earth's Magnetic Anomaly Field, Air Force Institute of Technology, Sep. 2016.

Canciani, et al., Magnetic Navigation, Air Force Institute of Technology.

Chen, et al., Quantum Physicists Found a New, Safer Way to Navigate, https://www.wired.com/story/quantum-physicists-found-a-new-safer-way-to-navigate/, Nov. 1, 2018.

EESR from European Application No. 22825691.3 dated Jun. 2, 2025.

Hernandez, et al., Steering Control of Automated Vehicles Using Absolute Positioning GPS and Magnetic Markers, IEEE Transactions On Vehicular Technology, vol. 52, No. 1, pp. 150-161, Jan. 2003.

Indooratlas, et al., Last meter accuracy through technology fusion, https://www.indooratlas.com/positioning-technology/, 2021.

Kim, et al., Indoor positioning system using geomagnetic anomalies for smartphones, International Conference on Indoor Positioning and Indoor Navigation, Nov. 2012.

Kim, et al., Indoor Positioning System Using Magnetic Field Map Navigation and an Encoder System, www.mdpi.com/journal/sensors, Mar. 22, 2017.

Lee, et al., Aerial Simultaneous Localization And Mapping Using Earth's Magnetic Anomaly Field, Air Force Institute of Technology, Mar. 21, 2019.

Li, et al., How feasible is the use of magnetic field alone for indoor positioning, International Conference on Indoor Positioning and Indoor Navigation, Nov. 2012.

Liu, et al., Fusion of Magnetic and Visual Sensors for Indoor Localization: Infrastructure-Free and More Effective, IEEE Transactions On Multimedia, vol. 19, No. 4, pp. 874-888, Apr. 2017.

Lohmann, et al., Magnetic maps in animals: nature's GPS, The Journal of Experimental Biology 210, pp. 3697-3705, Jul. 2007.

Mikhail Tchernychev, "MAGPICK—magnetic map & profile processing." User Guide, Feb. 16, 1998.

NOAA, et al., The World Magnetic Model—Uses, https://www.ngdc.noaa.gov/geomag/WMM/uses.shtml, Feb. 2020.

Prigge, et al., Signal Architecture for a Distributed Magnetic Local Positioning System, IEEE Sensors Journal, vol. 4, No. 6, pp. 864-873, Dec. 2004.

Riehle, et al., Indoor Waypoint Navigation via Magnetic Anomalies, IEEE Engineering in Medicine and Biology Society. Conference Aug. 2011.

Search Report and Written Opinion from PCT Application No. PCT/US2022/033475 dated Oct. 7, 2022.

Shockley, et al., Ground Vehicle Navigation Using Magnetic Field Variation, Air Force Institute of Technology, Sep. 2012.

Solin, et al., Modeling and Interpolation of the Ambient Magnetic Field by Gaussian Processes, Accepted To IEEE Transactions On Robotics, Mar. 21, 2018.

Vallivaara, et al., Simultaneous Localization And Mapping Using The Indoor Magnetic Field, University of Oulu Graduate School; University of Oulu, Faculty of Information Technology and Electrical Engineering Acta Univ. Oul. C 642, 2018.

* cited by examiner

| QA* 21x21 DOUBLE | 1 | 2 | 3 | 4 | 5 | 6 | 7 | 8 | 9 | 10 | 11 | 12 | 13 | 14 | 15 | 16 | 17 | |
|---|---|---|---|---|---|---|---|---|---|---|---|---|---|---|---|---|---|---|
| 1 | 144 | 144 | 133 | 136 | 141 | 140 | 150 | 140 | 154 | 159 | 143 | 153 | 115 | 144 | 114 | 147 | 159 | |
| 2 | 148 | 147 | 144 | 146 | 146 | 136 | 152 | 152 | 142 | 146 | 152 | 143 | 125 | 140 | 144 | 131 | 142 | |
| 3 | 138 | 117 | 114 | 134 | 124 | 127 | 114 | 147 | 149 | 141 | 141 | 130 | 152 | 146 | 139 | 149 | 137 | |
| 4 | 148 | 125 | 133 | 105 | 125 | 182 | 148 | 148 | 114 | 147 | 153 | 158 | 155 | 159 | 155 | 142 | 156 | |
| 5 | 150 | 144 | 85 | 142 | 141 | 163 | 129 | 144 | 154 | 141 | 144 | 147 | 158 | 113 | 147 | 111 | 151 | |
| 6 | 154 | 147 | 134 | 154 | 124 | 158 | 147 | 147 | 143 | 143 | 142 | 152 | 142 | 152 | 145 | 147 | 153 | |
| 7 | 104 | 149 | 151 | 138 | 143 | 147 | 146 | 136 | 145 | 143 | 157 | 143 | 145 | 139 | 144 | 158 | 146 | |
| 8 | 154 | 129 | 114 | 134 | 143 | 164 | 148 | 114 | 133 | 131 | 143 | 143 | 148 | 148 | 143 | 109 | 143 | |
| 9 | 130 | 128 | 123 | 124 | 104 | 140 | 140 | 145 | 149 | 152 | 140 | 142 | 158 | 156 | 90 | 52 | 139 | |
| 10 | 125 | 114 | 110 | 131 | 153 | 108 | 154 | 142 | 147 | 147 | 141 | 152 | 150 | 149 | 115 | 132 | 150 | |
| 11 | 141 | 139 | 146 | 134 | 127 | 158 | 129 | 146 | 154 | 153 | 156 | 155 | 148 | 115 | 144 | 143 | 147 | |
| 12 | 110 | 154 | 141 | 158 | 141 | 142 | 126 | 146 | 156 | 144 | 146 | 140 | 125 | 112 | 140 | 142 | 141 | |
| 13 | 140 | 111 | 142 | 128 | 138 | 126 | 136 | 156 | 139 | 109 | 153 | 142 | 154 | 110 | 145 | 141 | 148 | |
| 14 | 140 | 144 | 126 | 100 | 141 | 145 | 156 | 134 | 148 | 144 | 147 | 150 | 122 | 129 | 129 | 151 | 145 | |
| 15 | 114 | 112 | 142 | 167 | 138 | 140 | 130 | 146 | 112 | 147 | 139 | 148 | 154 | 128 | 144 | 130 | 132 | |
| 16 | 126 | 133 | 114 | 149 | 141 | 150 | 142 | 147 | 131 | 139 | 148 | 108 | 130 | 142 | 145 | 131 | 104 | |
| 17 | 147 | 144 | 117 | 149 | 138 | 152 | 127 | 144 | 158 | 141 | 147 | 124 | 127 | 147 | 129 | 143 | 147 | |
| 18 | 150 | 117 | 139 | 146 | 155 | 155 | 143 | 152 | 137 | 146 | 139 | 129 | 138 | 141 | 144 | 133 | 146 | |
| 19 | 117 | 139 | 137 | 141 | 141 | 140 | 140 | 130 | 143 | 140 | 84 | 156 | 139 | 81 | 145 | 132 | 121 | |
| 20 | 117 | 138 | 140 | 134 | 134 | 145 | 147 | 147 | 111 | 146 | 130 | 122 | 147 | 127 | 138 | 126 | 134 | |
| 21 | 140 | 140 | 140 | 140 | 140 | 140 | 140 | 140 | 140 | 140 | 140 | 140 | 140 | 140 | 140 | 140 | 140 | |

FIG. 51

| NCC x 21x21 DOUBLE | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0.2261 | 0.5543 | | 0.5510 | 0.2261 | 0.2274 | 0.2410 | -0.2342 | -0.2976 | -0.1913 | -0.0220 | 0.1901 | 0.1595 |
| 2 | 0.0935 | 0.4667 | 0.4660 | 0.4010 | 0.2261 | 0.1918 | 0.2737 | 0.1842 | -0.0589 | -0.2614 | -0.2220 | -0.0353 | 0.0689 |
| 3 | 0.0260 | 0.2417 | 0.3756 | 0.2264 | 0.2261 | 0.2918 | 0.2366 | 0.2461 | 0.2965 | 0.3531 | 0.1869 | 0.4413 | 0.0785 |
| 4 | -0.1832 | -0.1135 | 0.0781 | 0.5009 | 0.2261 | 0.1602 | 0.2589 | 0.6184 | 0.5363 | 0.2692 | 0.2940 | 0.2476 | 0.1844 |
| 5 | -0.0698 | 0.1828 | 0.1372 | -0.0403 | 0.2261 | 0.2883 | 0.3073 | 0.1122 | -0.1899 | -0.3826 | -0.1135 | 0.0802 | 0.0065 |
| 6 | 0.1611 | 0.0064 | -0.1578 | 0.0722 | 0.2261 | -0.0179 | 0.1999 | -0.4006 | 0.0168 | 0.0163 | 0.3313 | 0.3546 | -0.1297 |
| 7 | 0.0500 | 0.4184 | 0.5473 | 0.3851 | 0.2261 | -0.1007 | 0.1111 | -0.0708 | -0.0420 | -0.1032 | -0.0914 | 0.0136 | 0.0173 |
| 8 | 0.5171 | 0.4559 | 0.5864 | 0.5140 | 0.2261 | 0.2928 | 0.1706 | -0.0622 | 0.1208 | -0.0376 | -0.1807 | 0.0604 | 0.0483 |
| 9 | -0.2680 | 0.1976 | 0.4024 | 0.1734 | 0.2261 | 0.0635 | 0.1942 | -0.0278 | -0.3846 | -0.4315 | -0.1223 | 0.3473 | 0.0616 |
| 10 | -0.2458 | 0.1351 | 0.1447 | 0.3256 | 0.2261 | -0.2262 | 0.0441 | 0.0580 | -0.2776 | -0.1291 | 0.3222 | -0.0058 | -0.0818 |
| 11 | -0.3278 | 0.1558 | 0.2145 | 0.7537 | 0.2261 | -0.3486 | 0.2264 | -0.3067 | -0.3478 | -0.1359 | -0.5659 | -0.3697 | 0.1068 |
| 12 | -0.0350 | 0.0876 | 0.2779 | 0.1123 | 0.2261 | -0.0414 | -0.2883 | -0.2077 | -0.2304 | -0.1001 | 0.2176 | 0.3951 | 0.2785 |
| 13 | -0.1023 | -0.2703 | 0.0132 | -0.0833 | 0.2261 | 0.2785 | 0.0966 | 0.0011 | -0.1911 | 0.0197 | 0.1342 | -0.0036 | -0.1532 |
| 14 | 0.2423 | 0.5603 | 0.4415 | 0.2482 | 0.2261 | -0.2363 | -0.3908 | -0.3720 | -0.2997 | 0.2918 | 0.1971 | 0.2410 | 0.0548 |
| 15 | 0.1924 | -0.0694 | -0.2523 | -0.0957 | 0.2261 | -0.0900 | -0.2751 | -0.4586 | 0.0015 | 0.2577 | -0.0513 | -0.1597 | -0.2254 |
| 16 | 0.0883 | 0.1732 | 0.1073 | 0.2840 | 0.2261 | -0.3622 | -0.4622 | -0.5352 | -0.1667 | 0.0023 | 0.0904 | 0.3287 | 0.0458 |
| 17 | 0.2552 | 0.2931 | -0.1554 | 0.0105 | 0.2261 | -0.2548 | -0.3587 | -0.2138 | 0.3014 | 0.1676 | 0.3861 | 0.0618 | 0.1529 |
| 18 | 0.4034 | 0.2164 | 0.3750 | 0.3752 | -0.0078 | -0.3845 | -0.5538 | -0.1429 | -0.2505 | -0.2367 | 0.0441 | -0.0173 | -0.0477 |
| 19 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 |

FIG. 52

NCC ☒ MSD ☒
⊞ 21X21 DOUBLE

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 83.3810 | 83.3810 | 0 | 50.2381 | 87.1905 | 78.4286 | 155.9524 | 158.4286 | 164.1429 | 148.4762 | 136.2857 | 140.1905 | 148.0952 | 1 |
| 2 | 135.3810 | 87.8095 | 75 | 78.3810 | 93.1905 | 86.3333 | 84.2581 | 97.1905 | 124.4286 | 159 | 171.333 | 182.0952 | 168.7143 | 1 |
| 3 | 215.6667 | 217.5714 | 183.0476 | 105 | 90.6667 | 77 | 93.4762 | 99.7619 | 102.5714 | 109.2857 | 144.6667 | 162.7143 | 205.8095 | 2 |
| 4 | 297.7809 | 277.5714 | 234.7619 | 68.7143 | 71.1905 | 88.6667 | 84.8095 | 62.6190 | 74.8095 | 112.6667 | 127.5714 | 152.3810 | 157.8095 | 2 |
| 5 | 310.8095 | 183.5238 | 195.5714 | 108.1905 | 97.6667 | 67.5429 | 89.5238 | 87.0952 | 108.8571 | 71.1905 | 100.8571 | 70.8571 | 144.8571 | 1 |
| 6 | 230.4286 | 91.7619 | 132.4286 | 102.6190 | 81.1905 | 93.4286 | 108.3810 | 128.3333 | 84.5238 | 91.8095 | 72.1905 | 76.8571 | 117.9524 | 1 |
| 7 | 220.7143 | 91.7619 | 62.8095 | 74.9045 | 95.0952 | 106.6667 | 110.2857 | 109.7619 | 99.5213 | 97.1429 | 108.9043 | 102.2857 | 109.6190 | 1 |
| 8 | 330.1429 | 255.6667 | 173.9524 | 135.8095 | 145.5238 | 121.3810 | 118.3810 | 104.9524 | 91.6667 | 105.1429 | 113.0948 | 103.7619 | 131.4762 | 1 |
| 9 | 447.9524 | 326.6667 | 233.4762 | 222.0952 | 179.0476 | 172.3810 | 105.3333 | 114.2857 | 151.1905 | 155.5218 | 123.3333 | 75.7143 | 120.9048 | 1 |
| 10 | 430 | 383.9048 | 348.9524 | 182.0476 | 149.3810 | 154.9048 | 140.5714 | 115.5238 | 157.2381 | 103.1429 | 80.6190 | 110.6190 | 140.3333 | 1 |
| 11 | 278.2381 | 226.8571 | 135.1429 | 44.6667 | 73.4762 | 93.8571 | 114.9524 | 164.9048 | 170.1905 | 133.1429 | 174.6667 | 153.9524 | 122.4762 | 1 |
| 12 | 230.0476 | 192.5714 | 130.1429 | 128.3810 | 131.4286 | 130.7619 | 196.9524 | 166.8095 | 174.1429 | 152.0476 | 108.2857 | 89.9524 | 108.4286 | 2 |
| 13 | 292.0476 | 257.4762 | 170.4286 | 172.2857 | 99.5714 | 89.7619 | 124.6190 | 132.2381 | 155.0952 | 127.1905 | 116.1429 | 139.7619 | 192.3333 | 2 |
| 14 | 201.3333 | 92.9041 | 109.7143 | 99.9041 | 59.8571 | 196.8095 | 260.8095 | 248.2857 | 232.8571 | 142.9048 | 168.0952 | 160 | 185.1429 | 1 |
| 15 | 186.2381 | 182.3333 | 211.7619 | 141.4762 | 90.7143 | 197.3333 | 236.1905 | 249.5714 | 173.4762 | 134.5238 | 187.5714 | 198.9524 | 201.7143 | 2 |
| 16 | 146.5714 | 118.2381 | 135.7143 | 79.4762 | 94.1429 | 257.2857 | 272.1429 | 269.8571 | 227.3333 | 191.3810 | 181.0876 | 150.0476 | 154.9048 | 1 |
| 17 | 79.9048 | 75.1429 | 133.2857 | 111.1429 | 245.8095 | 340.3810 | 353.0476 | 451.6667 | 334.0476 | 365.7619 | 321.6190 | 176.2857 | 232.4286 | 2 |
| 18 | 56.8571 | 72.8095 | 64.3810 | 64.2381 | 232.3333 | 344.8095 | 373.9524 | 439.6190 | 479.3333 | 495.1905 | 460.2857 | 368.0952 | 311.4286 | 2 |
| 19 | 1000 | 1000 | 1000 | 1000 | 1000 | 1000 | 1000 | 1000 | 1000 | 1000 | 1000 | 1000 | 1000 | |
| 20 | 1000 | 1000 | 1000 | 1000 | 1000 | 1000 | 1000 | 1000 | 1000 | 1000 | 1000 | 1000 | 1000 | |
| 21 | 1000 | 1000 | 1000 | 1000 | 1000 | 1000 | 1000 | 1000 | 1000 | 1000 | 1000 | 1000 | 1000 | |

FIG. 53

NCC 21X21 DOUBLE

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0.2447 | 0.5190 | 0.9872 | 0.5860 | 0.2063 | 0.2514 | -0.2245 | -0.2004 | -0.2956 | -0.1655 | -0.0745 | 0.1107 | 0.1643 |
| 2 | 0.1421 | 0.4701 | 0.5501 | 0.3833 | 0.2879 | 0.2581 | 0.2545 | 0.1715 | -0.0593 | -0.2297 | -0.2853 | -0.0927 | -0.0088 |
| 3 | 0.2377 | 0.2545 | 0.3433 | 0.1827 | 0.3199 | 0.3387 | 0.2236 | 0.1798 | 0.2673 | 0.3547 | 0.1558 | 0.4172 | 0.0586 |
| 4 | -0.2301 | -0.1400 | 0.0651 | 0.4642 | 0.4544 | 0.1716 | 0.2507 | 0.5867 | 0.5388 | 0.3304 | 0.3135 | 0.3096 | 0.1889 |
| 5 | -0.1280 | 0.0979 | 0.1912 | -0.0848 | 0.0642 | 0.2278 | 0.3678 | 0.1273 | -0.2253 | 0.3411 | 0.1559 | 0.6258 | 0.0047 |
| 6 | 0.1750 | 0.0157 | -0.1775 | -0.0014 | 0.2904 | -0.0372 | -0.2172 | -0.4031 | 0.0065 | 0.0566 | 0.2981 | 0.3494 | -0.1410 |
| 7 | 0.4157 | 0.4423 | 0.5415 | 0.3763 | 0.0878 | -0.1623 | -0.0993 | -0.0758 | -0.0275 | 0.1147 | -0.1557 | 0.0086 | -0.0808 |
| 8 | 0.5274 | 0.4845 | 0.6137 | 0.5232 | 0.3849 | 0.2887 | -0.1000 | -0.0541 | -0.1028 | 0.0778 | -0.2352 | 0.1113 | 0.0343 |
| 9 | -0.2734 | 0.1450 | 0.4020 | 0.1694 | 0.2860 | 0.1471 | 0.1570 | -0.0283 | -0.3804 | -0.4393 | -0.1447 | 0.3974 | 0.0995 |
| 10 | -0.3083 | -0.1511 | -0.1737 | 0.2320 | 0.4455 | 0.2601 | 0.0242 | 0.0737 | -0.2658 | 0.1629 | 0.3861 | 0.0332 | -0.1152 |
| 11 | -0.3424 | -0.1283 | 0.1745 | 0.7337 | 0.5461 | 0.2832 | 0.2694 | -0.2266 | -0.3463 | -0.0842 | -0.5450 | -0.4500 | -0.1007 |
| 12 | 0.0960 | 0.1275 | 0.2639 | 0.1267 | -0.1132 | -0.1081 | -0.2554 | -0.1967 | -0.2637 | 0.0746 | 0.1575 | 0.4049 | 0.3328 |
| 13 | -0.0805 | -0.3320 | -0.0618 | -0.1010 | 0.1343 | 0.2776 | 0.1286 | 0.0479 | -0.1716 | 0.0825 | 0.1251 | 0.0086 | -0.1463 |
| 14 | 0.2091 | 0.5365 | 0.4574 | 0.2078 | 0.4870 | -0.1810 | -0.3950 | -0.3511 | -0.2968 | 0.2988 | 0.2310 | 0.2028 | 0.0570 |
| 15 | -0.1901 | -0.0437 | -0.2049 | -0.1458 | 0.1948 | -0.0921 | -0.2410 | -0.4199 | -0.0019 | 0.2439 | -0.0889 | -0.1578 | -0.2154 |
| 16 | 0.0334 | 0.1379 | 0.1179 | 0.2936 | 0.1744 | -0.4028 | -0.3989 | -0.5250 | -0.1705 | -0.0174 | -0.0197 | 0.3501 | 0.0899 |
| 17 | 0.1958 | 0.3190 | -0.1307 | -0.0120 | -0.0889 | -0.2838 | -0.3245 | -0.1911 | 0.2981 | 0.1943 | 0.3718 | 0.6720 | 0.2120 |
| 18 | 0.3956 | 0.2575 | 0.3549 | 0.4044 | -0.0643 | -0.3465 | -0.5098 | -0.1177 | -0.2021 | -0.3514 | 0.0593 | -0.0780 | -0.0915 |
| 19 | 1.000 | 1.000 | 1.000 | 1.000 | 1.000 | 1.000 | 1.000 | 1.000 | 1.000 | 1.000 | 1.000 | 1.000 | 1.000 |
| 20 | 1.000 | 1.000 | 1.000 | 1.000 | 1.000 | 1.000 | 1.000 | 1.000 | 1.000 | 1.000 | 1.000 | 1.000 | 1.000 |
| 21 | 1.000 | 1.000 | 1.000 | 1.000 | 1.000 | 1.000 | 1.000 | 1.000 | 1.000 | 1.000 | 1.000 | 1.000 | 1.000 |

*FIG. 54*

| | 1 | 2 | 3 | 4 | 5 | 6 | 7 | 8 | 9 | 10 | 11 | 12 | 13 | |
|---|---|---|---|---|---|---|---|---|---|---|---|---|---|---|
| 1 | 142.0660 | 99.3698 | 84.5503 | 70.7016 | 98.5767 | 70.6148 | 170.3222 | 172.2264 | 191.5373 | 171.5051 | 163.2350 | 152.3941 | 143.7888 | 1 |
| 2 | 225.0925 | 167.9441 | 144.7997 | 140.1598 | 133.1396 | 90.9130 | 76.4939 | 90.3918 | 116.5866 | 133.2070 | 141.1862 | 137.9896 | 124.4691 | 1 |
| 3 | 352.0434 | 341.2748 | 299.6074 | 183.8832 | 144.7076 | 93.5292 | 88.6105 | 81.2853 | 73.2882 | 84.1721 | 82.9437 | 80.3907 | 141.3800 | 1 |
| 4 | 421.1760 | 401.2679 | 145.2818 | 140.4670 | 134.1071 | 117.0401 | 93.5904 | 44.5460 | 49.3439 | 67.5753 | 71.5587 | 77.6097 | 114.3574 | 1 |
| 5 | 416.5404 | 278.8254 | 261.5541 | 164.4944 | 145.3123 | 101.6963 | 84.7437 | 92.2863 | 111.7284 | 67.5781 | 80.3347 | 39.1088 | 130.0168 | 1 |
| 6 | 310.0834 | 161.6565 | 167.9601 | 136.3016 | 104.1235 | 110.4387 | 122.7558 | 136.3407 | 92.2565 | 89.6100 | 69.1072 | 62.2835 | 103.6064 | 1 |
| 7 | 314.3515 | 144.2274 | 95.0468 | 89.8698 | 93.7481 | 111.2852 | 105.3754 | 105.6083 | 90.9274 | 82.6127 | 108.6119 | 92.7981 | 91.8036 | 2 |
| 8 | 499.2345 | 377.8757 | 249.9456 | 174.9575 | 170.3993 | 127.7516 | 92.0211 | 82.7947 | 77.7578 | 90.7325 | 107.8841 | 81.3100 | 124.7236 | 1 |
| 9 | 626.3204 | 492.4804 | 347.0377 | 299.5516 | 221.6829 | 164.9386 | 87.2825 | 93.6677 | 133.5304 | 140.8899 | 117.3791 | 67.8242 | 133.4862 | 1 |
| 10 | 575.1795 | 907.9015 | 474.4298 | 274.3342 | 204.8393 | 169.3737 | 151.8255 | 109.0205 | 150.8075 | 111.4086 | 87.2203 | 129.6582 | 197.2325 | 2 |
| 11 | 125.5052 | 274.4585 | 19.5208 | 101.6740 | 100.1549 | 120.8364 | 123.2275 | 146.9402 | 154.5205 | 137.8873 | 117.1715 | 203.3833 | 154.9601 | 1 |
| 12 | 239.3466 | 222.0178 | 177.5159 | 172.2964 | 165.6245 | 154.8103 | 215.9728 | 173.8519 | 206.3749 | 102.4053 | 147.9688 | 130.6950 | 152.0572 | 2 |
| 13 | 332.4055 | 307.5285 | 227.3411 | 206.3757 | 127.7886 | 98.4500 | 135.2794 | 148.2024 | 185.9763 | 159.4300 | 167.0253 | 197.5079 | 209.0154 | 2 |
| 14 | 285.4125 | 153.5926 | 141.9768 | 112.1813 | 65.4558 | 206.8408 | 313.9822 | 312.3885 | 309.2358 | 228.9980 | 255.4874 | 266.8917 | 304.4341 | 3 |
| 15 | 259.4492 | 231.5141 | 233.7721 | 154.4938 | 106.4837 | 247.6370 | 309.0752 | 319.6404 | 245.7873 | 231.1528 | 296.5919 | 314.4274 | 325.2453 | 3 |
| 16 | 216.7286 | 177.8630 | 162.6617 | 88.3822 | 101.7336 | 316.8785 | 342.0410 | 340.0116 | 312.1615 | 304.1357 | 310.9343 | 268.2744 | 265.4839 | 2 |
| 17 | 121.1062 | 102.2085 | 144.9550 | 122.2828 | 286.1232 | 430.0735 | 450.0050 | 565.8023 | 468.8055 | 516.9516 | 484.9875 | 315.9545 | 351.3915 | 3 |
| 18 | 102.5162 | 103.3289 | 79.7042 | 68.0316 | 270.2379 | 414.4117 | 455.1992 | 558.1012 | 617.3612 | 689.3086 | 659.2447 | 538.0423 | 470.0659 | 3 |
| 19 | 1000 | 1000 | 1000 | 1000 | 1000 | 1000 | 1000 | 1000 | 1000 | 1000 | 1000 | 1000 | 1000 | |
| 20 | 1000 | 1000 | 1000 | 1000 | 1000 | 1000 | 1000 | 1000 | 1000 | 1000 | 1000 | 1000 | 1000 | |
| 21 | 1000 | 1000 | 1000 | 1000 | 1000 | 1000 | 1000 | 1000 | 1000 | 1000 | 1000 | 1000 | 1000 | |

*FIG. 55*

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 9.3098 | 8.1194 | 5.7302 | 7.3389 | 7.7689 | 6.8284 | 8.8756 | 10.0487 | 10.1971 | 9.9387 | 9.8561 | 10.7269 | 9.6416 |
| 2 | 12.0305 | 10.8532 | 9.4197 | 9.7417 | 9.3649 | 8.0410 | 6.9133 | 7.4147 | 8.3711 | 9.5369 | 9.7055 | 9.1865 | 8.5239 |
| 3 | 15.5998 | 15.4773 | 14.0670 | 11.4500 | 9.5312 | 8.7089 | 7.5068 | 7.1990 | 6.8714 | 5.9211 | 7.0398 | 7.0197 | 8.6053 |
| 4 | 16.5070 | 15.8659 | 14.1174 | 10.7988 | 10.0389 | 8.3172 | 7.8009 | 5.0630 | 5.8571 | 6.4062 | 7.3486 | 6.8270 | 8.3304 |
| 5 | 15.8120 | 12.9470 | 12.1040 | 9.7507 | 10.1157 | 8.8527 | 7.6918 | 8.3788 | 8.7381 | 6.2761 | 7.6124 | 7.0536 | 8.1546 |
| 6 | 13.1303 | 10.2997 | 10.6235 | 10.0507 | 9.2735 | 8.7403 | 8.7807 | 10.3213 | 7.7967 | 8.3410 | 6.8316 | 6.4496 | 8.1826 |
| 7 | 13.8341 | 10.6352 | 8.1253 | 7.3141 | 7.6322 | 9.2284 | 8.7048 | 7.9211 | 7.7672 | 7.7371 | 8.7335 | 7.8104 | 7.7781 |
| 8 | 16.6122 | 14.8850 | 11.9729 | 11.0225 | 9.5168 | 8.4678 | 8.0172 | 7.5551 | 7.1918 | 7.9276 | 8.1308 | 7.5673 | 7.8080 |
| 9 | 20.2141 | 17.3130 | 14.0427 | 12.8574 | 9.2208 | 9.2352 | 7.4158 | 7.3116 | 10.0118 | 9.6268 | 8.3605 | 6.7132 | 9.3218 |
| 10 | 19.8439 | 19.1133 | 16.9131 | 13.1253 | 10.6171 | 10.4149 | 9.3250 | 8.0762 | 9.4289 | 8.3881 | 7.8244 | 9.7862 | 10.9655 |
| 11 | 14.9410 | 12.9014 | 11.2709 | 7.8587 | 7.5369 | 8.8822 | 8.2359 | 8.8638 | 9.8345 | 10.7672 | 12.1224 | 11.4157 | 11.0356 |
| 12 | 12.0602 | 11.3812 | 10.3216 | 10.5328 | 10.7359 | 9.9199 | 11.4044 | 10.5054 | 10.3475 | 10.5821 | 9.7237 | 9.6543 | 9.7198 |
| 13 | 15.9950 | 14.1257 | 12.0554 | 12.0539 | 9.4452 | 8.5153 | 8.5526 | 9.4983 | 11.0248 | 10.5893 | 9.6526 | 11.0619 | 13.7156 |
| 14 | 14.0181 | 10.4615 | 10.1885 | 7.9319 | 6.9405 | 10.6438 | 13.1908 | 13.9134 | 13.9222 | 12.7017 | 13.7848 | 14.1778 | 14.7219 |
| 15 | 12.8711 | 11.7596 | 12.1571 | 9.7650 | 8.0858 | 12.8519 | 13.8150 | 13.7607 | 13.0381 | 12.1261 | 13.9179 | 14.8326 | 14.9242 |
| 16 | 12.2380 | 10.8842 | 10.4802 | 6.9822 | 7.6997 | 13.5055 | 13.6029 | 13.8734 | 14.5143 | 13.7527 | 14.3564 | 14.2933 | 12.9735 |
| 17 | 7.3834 | 7.6820 | 9.0788 | 8.3446 | 11.7644 | 15.1721 | 15.9264 | 17.4949 | 17.1824 | 17.1186 | 18.1659 | 15.3943 | 15.2525 |
| 18 | 8.4210 | 8.6039 | 7.1910 | 7.0510 | 12.1363 | 14.9461 | 15.3656 | 18.5143 | 18.9492 | 19.7923 | 21.7362 | 18.5449 | 16.6659 |
| 19 | 1000 | 1000 | 1000 | 1000 | 1000 | 1000 | 1000 | 1000 | 1000 | 1000 | 1000 | 1000 | 1000 |
| 20 | 1000 | 1000 | 1000 | 1000 | 1000 | 1000 | 1000 | 1000 | 1000 | 1000 | 1000 | 1000 | 1000 |
| 21 | 1000 | 1000 | 1000 | 1000 | 1000 | 1000 | 1000 | 1000 | 1000 | 1000 | 1000 | 1000 | 1000 |

FIG. 56

| NCC_IN_GDIR | NCC_IN_GMAG | | | | | | | | | | | |
|---|---|---|---|---|---|---|---|---|---|---|---|---|
| 21X21 DOUBLE | | | | | | | | | | | | |
| | 2 | 3 | 4 | 5 | 6 | 7 | 8 | 9 | 10 | 11 | 12 | 13 |
| 1 | 0.0221 | 0.4378 | 0.9284 | 0.6031 | 0.3679 | -0.0125 | -0.4175 | -0.3076 | -0.0770 | 0.2012 | 0.4158 | 0.2589 | 0.3431 |
| 2 | 0.2176 | 0.1726 | 0.4344 | 0.3913 | 0.1677 | -0.2260 | -0.4178 | -0.3217 | -0.2514 | -0.1214 | -0.0564 | -0.3653 | -0.4635 |
| 3 | 0.1945 | 0.0119 | 0.2357 | 0.2464 | -0.0835 | -0.4319 | -0.4517 | -0.2575 | -0.1563 | -0.1501 | -0.0871 | -0.2413 | -0.3334 |
| 4 | 0.2921 | -0.1038 | 0.1796 | 0.1575 | 0.1671 | -0.2327 | -0.3002 | -0.1785 | -0.1159 | 0.2082 | 0.1751 | -0.1279 | -0.4069 |
| 5 | 0.2848 | 0.1488 | -0.0632 | 0.0494 | 0.6702 | 0.2837 | -0.0153 | -0.3355 | -0.3541 | -0.2639 | -0.1672 | -0.1483 | -0.6953 |
| 6 | 0.1553 | 0.1769 | 0.2362 | 0.1880 | 0.2783 | 0.2330 | 0.0439 | -0.2301 | -0.4560 | 0.0342 | 0.1859 | 0.2034 | -0.3327 |
| 7 | 0.2235 | 0.4992 | 0.5500 | 0.4474 | 0.3226 | 0.3781 | -0.0582 | -0.1750 | 0.0391 | 0.4134 | 0.4846 | 0.1424 | -0.4300 |
| 8 | 0.0357 | 0.3227 | 0.4273 | 0.1595 | 0.0863 | 0.0337 | -0.0664 | -0.0338 | -0.3648 | 0.1182 | 0.5010 | 0.0524 | -0.3232 |
| 9 | 0.3645 | 0.3362 | 0.4377 | 0.4171 | 0.3347 | -0.0435 | -0.1248 | -0.1382 | 0.0999 | 0.2600 | 0.3937 | 0.1208 | -0.2234 |
| 10 | 0.2188 | 0.0136 | -0.0566 | -0.0098 | 0.2354 | -0.1387 | -0.1143 | -0.1164 | 0.0845 | 0.1204 | 0.2571 | -0.2702 | -0.3368 |
| 11 | 0.0106 | -0.1080 | -0.0563 | 0.2937 | 0.4488 | 2.4579E+04 | -0.1372 | -0.2472 | 0.1344 | -0.0507 | 0.2071 | -0.0134 | -0.0820 |
| 12 | 0.4726 | 0.2144 | -0.0373 | 0.3131 | 0.3305 | -0.1412 | -0.3894 | -0.1862 | 0.3556 | 0.2612 | 0.5417 | 0.0275 | 0.0745 |
| 13 | 0.1078 | -0.0701 | 0.2017 | 0.1078 | -0.2798 | -0.4861 | -0.2941 | 0.1137 | 0.3844 | 0.5080 | 0.4449 | -0.2488 | -0.2375 |
| 14 | 3.1941E+04 | -0.1594 | 0.1098 | 0.0557 | -0.2250 | -0.5322 | -0.1853 | 0.1317 | 33.74 | 0.6350 | 0.1499 | -0.3652 | -0.3652 |
| 15 | 0.3162 | 0.0190 | -0.0057 | 0.2484 | -0.417 | -0.5292 | -0.1656 | 0.1229 | 0.2200 | 0.6460 | 0.1289 | -0.0847 | -0.3331 |
| 16 | 0.0283 | -0.2894 | -0.1819 | -0.1772 | -0.2287 | -0.4471 | 0.1192 | 0.1898 | 0.4153 | 0.6101 | 0.3699 | 0.4330 | -0.0785 |
| 17 | 0.0059 | -0.0188 | -0.2022 | -0.2869 | -0.4705 | -0.5348 | 0.0293 | 0.1896 | 0.3187 | 0.0584 | 0.0778 | 0.1822 | -0.1498 |
| 18 | 0.1577 | 0.2165 | 0.0354 | -0.3195 | -0.5336 | -0.3549 | 0.0690 | 0.0605 | 0.4610 | 0.0899 | 0.3267 | 0.3499 | 0.2040 |

| NCC IN GDIR x | NCC IN GMAG x | MSD IN GMAG x | MAD IN GMAG x | | | | | | | | | |
|---|---|---|---|---|---|---|---|---|---|---|---|---|
| ⊞ 21X21 DOUBLE | | | | | | | | | | | | |
| | 1 | 2 | 3 | 4 | 5 | 6 | 7 | 8 | 9 | 10 | 11 | 12 | 13 |
| 1 | 16.5453 | 13.3424 | 15.0860 | 11.5013 | 13.7090 | 19.4095 | 23.7569 | 26.0982 | 20.9512 | 17.4312 | 14.9601 | 16.0682 | 13.5016 |
| 2 | 13.9915 | 17.2606 | 11.9882 | 12.6770 | 15.4190 | 18.2971 | 20.1761 | 22.0884 | 20.6592 | 18.5075 | 18.0346 | 20.7532 | 22.8872 |
| 3 | 19.1408 | 18.0664 | 14.0968 | 14.0384 | 16.4394 | 19.4898 | 18.9025 | 18.8998 | 19.1930 | 18.0259 | 16.4695 | 20.2650 | 22.5307 |
| 4 | 18.8624 | 17.8430 | 14.7299 | 14.1020 | 15.6327 | 17.3194 | 18.9839 | 17.9480 | 17.8192 | 14.6160 | 13.7005 | 18.2356 | 24.1872 |
| 5 | 23.2222 | 19.2443 | 17.5198 | 14.1281 | 12.5102 | 15.6502 | 16.9691 | 19.7989 | 18.8430 | 17.1216 | 16.3409 | 17.3519 | 24.3405 |
| 6 | 24.5806 | 16.8327 | 14.9652 | 15.3979 | 15.3340 | 17.6160 | 16.7986 | 20.1321 | 20.5909 | 18.7600 | 17.0210 | 17.1013 | 21.9813 |
| 7 | 29.6044 | 22.4539 | 17.6998 | 18.0912 | 16.3410 | 15.2018 | 17.2124 | 18.7879 | 17.5298 | 17.4744 | 17.0053 | 17.4838 | 25.4052 |
| 8 | 29.1644 | 25.6767 | 20.5296 | 21.4550 | 18.0949 | 19.6922 | 16.3270 | 17.2662 | 18.7030 | 16.1961 | 13.2785 | 15.5867 | 20.9318 |
| 9 | 38.7591 | 37.4802 | 29.3652 | 24.8572 | 19.2637 | 19.5225 | 17.3657 | 16.7535 | 16.5793 | 14.6782 | 13.0901 | 13.7963 | 20.1563 |
| 10 | 31.3958 | 30.3253 | 26.1106 | 21.0077 | 15.6607 | 20.0803 | 17.9792 | 17.8135 | 16.4871 | 15.3319 | 13.3866 | 17.2437 | 18.9090 |
| 11 | 35.1954 | 37.4752 | 31.6950 | 21.2721 | 15.5612 | 19.0762 | 20.6503 | 20.0637 | 18.0717 | 15.7836 | 15.3753 | 15.3867 | 15.7276 |
| 12 | 25.3964 | 23.4919 | 20.6911 | 14.5395 | 14.5150 | 19.6538 | 24.1195 | 20.2108 | 14.9252 | 13.9252 | 11.0994 | 14.5380 | 14.0728 |
| 13 | 29.9456 | 21.9432 | 18.5900 | 17.5401 | 20.8197 | 23.0255 | 23.7458 | 18.0398 | 14.6820 | 11.9749 | 12.1898 | 17.9854 | 17.7677 |
| 14 | 26.8489 | 19.1217 | 15.5553 | 14.9994 | 21.1907 | 21.0739 | 19.1292 | 16.7927 | 13.9792 | 10.5929 | 15.9297 | 18.7139 | 20.2070 |
| 15 | 17.0639 | 17.6928 | 16.4568 | 13.9913 | 19.2663 | 21.4467 | 23.0940 | 18.4030 | 19.7191 | 12.3471 | 19.0772 | 21.3106 | 23.7372 |
| 16 | 17.0885 | 20.6035 | 20.6035 | 18.0887 | 25.1265 | 26.4813 | 26.2488 | 23.8318 | 22.1194 | 18.5097 | 19.2837 | 16.5512 | 20.7195 |
| 17 | 18.2689 | 18.5489 | 19.3788 | 21.8956 | 30.4880 | 34.6412 | 28.8097 | 27.9549 | 26.3505 | 28.3924 | 23.0897 | 19.0863 | 21.3284 |
| 18 | 14.9336 | 13.8894 | 16.3881 | 25.6345 | 33.2490 | 38.3383 | 34.4491 | 35.8504 | 35.1181 | 37.7485 | 27.8527 | 23.5015 | 19.9478 |

*FIG. 59*

EMBEDDING A MAGNETIC MAP INTO AN IMAGE FILE

PRIORITY

This application claims the benefit under 35 U.S.C. § 119(e) of U.S. Provisional Patent Application No. 63/210,411, filed 14 Jun. 2021, which is incorporated herein by reference in its entirety for all purposes.

TECHNICAL FIELD

This disclosure generally relates to magnetic mapping and navigation.

BACKGROUND

Navigation systems come in a variety of different architectures for use in different applications, including personal, commercial, and military. Many such systems operate on the premise of a Global Navigation Satellite System (GNSS). GNSS is a general term used to describe a network of satellites that can be used to produce position, navigation, and time (PNT) data sets. The Global Positioning System (GPS) is a widely used form of GNSS. Regional implementations of such systems are also used to generate more regionally specific PNT data. For example, Galileo can be used in Europe; GLONASS can be used in Russia; and the BeiDou Navigation Satellite System (BDS) can be used in China.

GNSSs can have failure points. For example, some GNSSs lose reliability when operating inside buildings or in areas where network communication to the device is intermittent. Some GNSSs lose reliability when operating in dense city environments where large buildings interfere with communication signals. Some GNSSs lose reliability when operated in areas such as caves, tunnels, and mountains that impede location devices' reception of signals from GNSS satellites. Moreover, some GNSSs are susceptible to malicious attacks by electronic interference or physical intervention that degrade their reliability.

BRIEF SUMMARY

In particular embodiments, it is possible to use a magnetic map (e.g. a map of the global magnetic field (GMF)) of a particular area to localize and navigate within that area. Data received from magnetic-measurement devices (e.g. magnetometers) are used for building magnetic maps and later localizing or navigating over the corresponding areas. In particular embodiments, an image of the area for which a magnetic map is built may be used to visualize the current location of the magnetic-measurement device (which may be the current location of the user of that device). In particular embodiments, GeoTIFF-formatted image files may be used for this purpose, as their metadata may include global coordinates of each pixel in the image. In particular embodiments, the data of the magnetic map of the area presented in the image is added to the image data (e.g. embedded in the image) without distorting the original image information. Many currently used navigation systems (e.g. WAZE) use GeoTIFF-formatted images for display purposes. In particular embodiments, a magnetic map of an area embedded in an image of the area allows for storing and transmitting magnetic-map data in these navigating systems using existing data-transfer protocols (e.g. with no substantial modifications to the transmission protocols being necessary). In particular embodiments, adding navigation by magnetic field to existing systems creates an additional independent source of navigational data, making these navigation systems more robust and accurate. In particular embodiments, magnetic maps are embedded in other types of image files (e.g. TIFF, PNG, SVG, JPG, etc.). In particular embodiments, magnetic-map data can be embedded in an image as a separate colormap. This may allow presenting magnetic-map data as an image (e.g. a heat map) on its own. In particular embodiments, data received from a magnetic-measurement device in real time can be presented as an image (e.g. a thin strip of pixels). In particular embodiments, navigation over a magnetic map can be done by comparing images. Particular embodiments require specially formatted data constituting an image file and, therefore, require the use of a computing device (e.g. including a processor and a storage unit). Moreover, particular embodiments require a specific colorization of embedded information that can be performed only by image-manipulation software executed by a computing device.

Although this disclosure describes or illustrates particular embodiments as providing particular advantages or features, particular embodiments may provide none, some, or all of these advantages or features.

BRIEF DESCRIPTION OF THE DRAWINGS

FIG. 49 illustrates numerical values for a sample quantized map fragment.

FIG. 50 illustrates an example magnetic-profile strip.

FIG. 51 illustrates example results of magnetic-profile matching using NCC criterion.

FIG. 52 illustrates example results of magnetic-profile matching using MSD criterion.

FIG. 53 illustrates example results of magnetic-profile matching using MAD criterion.

FIG. 54 illustrates example results of magnetic-profile matching with noisy magnetic profiles (e.g. with added noise) using NCC criterion.

FIG. 55 illustrates example results of magnetic-profile matching with noisy magnetic profiles (e.g. with added noise) using MSD criterion.

FIG. 56 illustrates example results of magnetic-profile matching with noisy magnetic profiles (e.g. with added noise) using MAD criterion.

FIG. 57 illustrates example results of magnetic-gradient-profile matching using NCC criterion.

FIG. 58 illustrates example results of magnetic-gradient-profile matching using MSD criterion.

FIG. 59 illustrates example results of magnetic-gradient-profile matching using MAD criterion.

DESCRIPTION OF EXAMPLE EMBODIMENTS

Figure 1:
FIG. 1 illustrates an example image from an example image file.

In particular embodiments, one or more portions of one or more magnetic maps are embedded in one or more image files that may, but need not necessarily, contain georeferencing information. A Geographic Tagged Image File Format (GeoTIFF) file is an example of an image file containing georeferencing information. Other examples include, but are not limited to, American Standard Code for Information Interchange (ASCII); GeoTIFF; Portable Network Graphics (PNG); Keyhole Markup Language (KMZ); Extensible Markup Language (XML); or Textfile (TXT). Although particular image files containing particular georeferencing information are disclosed and illustrated herein, this disclosure contemplates any suitable image files containing any suitable georeferencing information, including information about indoor or outdoor locations. Particular embodiments use a particular order of steps or a particular coordinate system to embed portions of magnetic maps into image files. In particular embodiments, data about a magnetic field (such as for example one or more portions of a magnetic map) may be specified in one or more of following file formats: ASCII; GeoTIFF; PNG; KMZ; XML; or TXT. Although data about a magnetic field are described as being specified in particular file formats herein, this disclosure contemplates any suitable data about any suitable magnetic field being specified in any suitable file format. In particular embodiments, which format is used may be determined by ease of reading and visualizing data for the user or by requirements for data accuracy when navigating or localizing. Herein reference to an image file may encompass the image represented in the image file, and vice versa, where appropriate.

In particular embodiments, a magnetic map includes data representing values of a magnetic field (such as, for example, the geomagnetic field (GMF)) at points in two-dimensional (2D) or three-dimensional (3D) space. Examples of global magnetic maps include, but are not limited to, Earth Magnetic Anomaly Grid with Two-Arc-Minute Resolution (EMAG2), World Digital Magnetic Anomaly Map (WDMAM), Enhanced Magnetic Model (EMM), and the World Magnetic Model (WMM). Although particular magnetic maps are described or illustrated herein, this disclosure contemplates any suitable magnetic maps. Moreover, although global magnetic maps are described or illustrated herein, this disclosure contemplates any suitable magnetic maps encompassing any suitable area, one or more portions of which may be indoor or outdoor. In addition, one or more portions of the area may be under the ground or on the ground of a celestial body (such as Earth); underwater or on the surface of a body of water or other liquid; in the atmosphere of a celestial body (such as Earth); in outer space; or elsewhere. As an example, a magnetic map may include values of a magnetic field at points in, on, or near a structure, such as a house, office building, hospital, retail or wholesale store, warehouse, manufacturing facility, depot, hangar, garage, tunnel, bunker, underground mine, watercraft, aircraft, spacecraft, or other suitable structure. As another example, a magnetic map may include values of a magnetic field at points in, on, or near an outside area, such as a sidewalk, road, bridge, runway, lot, surface mine, waterway, field, pasture, forest, park, or other suitable outside area. In particular embodiments, magnetic maps may be created or used as disclosed in U.S. Patent Application Publication No. US 2022/0026235, U.S. Patent Application Publication No. US 2022/0026217, and U.S. Patent Application Publication No. US 2022/0026212, each of which is incorporated herein by reference in its entirety for all purposes.

As described above, in particular embodiments, one or more portions of one or more magnetic maps may be embedded in one or more GeoTIFF files. GeoTIFF is a metadata standard that enables georeferencing information to be embedded in a Tagged Image File Format (TIFF) file. In particular embodiments, georeferencing information may include information used to establish spatial references, such as, for example, map projections, coordinate systems, ellipsoids, or geodetic datums or systems. Although particular georeferencing information is described herein, this disclosure contemplates any suitable georeferencing information. In particular embodiments, GeoTIFF is compliant with TIFF 6.0 and software capable of reading and interpreting TIFF files can read and interpret GeoTIFF files. Particular embodiments may use a world file (which may be a plain-text sidecar file), such as a TFW file, as an alternative to in-line metadata for geospatial metadata. The world file may reside in the same folder as the TIFF file. In particular embodiments, the TFW file format is used by Geographic Information Systems (GISs) to georeference raster map images. A TFW file may describe a location, scale, and rotation of a raster on a map stored as a TIFF image. A TFW file may be used for saving the world location of an aerial satellite photograph and may use a format similar to Joint Photographic Experts Group (JPEG) World (JPW) files. Although particular GeoTIFF files are described herein, this disclosure contemplates any suitable GeoTIFF files or any other suitable files containing georeferencing information.

In particular embodiments, in addition or as an alternative to one or more portions of one or more magnetic maps being embedded in one or more GeoTIFF files, one or more portions of one or more magnetic maps may be embedded in one or more Cloud Optimized GeoTIFF (COG) files. COG is a standard based on GeoTIFF that facilitates the use of GeoTIFF files hosted on Hypertext Transfer Protocol (HTTP) servers by enabling the use of partial data in a GeoTIFF file without the entire file being downloaded. In particular embodiments, COG works with HTTP range requests and specifies a particular layout of data and metadata in a GeoTIFF file, which enables a client to predict what range of bytes to download. Herein, reference to a COG file may encompass a GeoTIFF file, and vice versa, where appropriate. Herein, reference to a single file may encompass multiple files, and vice versa, where appropriate. Herein, reference to a file format (e.g. GeoTIFF or COG) may encompass a file having that file format (e.g. a GeoTIFF file or a COG file). In particular embodiments, COG files may be read by and written to by Open Source Geospatial Foundation (OSGeo) software, Geospatial Data Abstraction Library (GDAL) software, Quantum GIS (QGIS) software, GeoTrellis software, or other suitable geographic software tools.

In particular embodiments, a GeoTIFF file contains image data in full color palette, like red-green-blue (RGB), and is originally unindexed. In particular embodiments, magnetic values are added in the form of indexed data to the visual data of the ground surface. Indexed color is a technique to manage a digital image's colors to save computer memory and file storage, while speeding up display refresh and file transfers. It may be a form of vector quantization compression. When an image is encoded in this way, color information is not directly carried by the image pixel data but is stored in a separate piece of data called a color lookup table (CLUT), or palette, which is an array of color specifications. Every element in the array represents a color, indexed by its position within the array. Each image pixel does not contain the full specification of its color, but only its index into the palette. This technique is sometimes referred as pseudo color or indirect color, as colors are addressed indirectly.

In particular embodiments, indexed color saves a significant amount of memory, storage space, and transmission time. Using true color, each pixel needs 24 bits, or 3 bytes. A typical 640×480 Video Graphics Array (VGA) resolution true color uncompressed image needs 640×480×3=921,600 bytes (900 KB). Limiting the image colors to 256, every pixel needs only 8 bits, or 1 byte each, so the example image now needs only 640×480×1=307,200 bytes (300 KB), plus 256×3=768 additional bytes to store the palette map (assuming RGB), approximately one third of the original size. Smaller palettes (4-bit 16 colors, 2-bit 4 colors) can pack the pixels even more (to one sixth or one twelfth), at the cost of color accuracy. Most image file formats that support indexed color images also support some compression scheme, enhancing their ability to store the images in smaller files. Colorized and artistic effects can be achieved by altering the color palette of indexed color images, for example to produce colorized sepia tone images. Due to the separate nature of the associated palette element of the indexed color images, they may be used to remap grayscale images into pseudo color ones through the use of pseudo color palettes.

In particular embodiments, arbitrary gradient color scales, usually 256 shades, with no relationship to real colors of a given image, are employed to artificially colorize a grayscale image to reveal details or to map the pixel level values to amounts of some physical magnitude (potential, temperature, altitude, etc.). There are many pseudo color palettes, some of them standardized, used mainly in scientific applications, such as, for example, astronomy and radioastronomy, satellite land imaging, thermography, study of materials, tomography, and magnetic resonance imaging in medicine.

In particular embodiments, indexed color images depend on their own color palettes. Typically, raw image data or colormap tables cannot reliably be exchanged between different image files without intermediate mapping. Also, if the original color palette for a given indexed image is lost, restoring it can be difficult. In particular embodiments, this may be used as an advantage, since in such a way it is possible to secure the data of a magnetic map. In particular embodiments, the use of an indexed color palette for representing magnetic-field values reduces the amount of memory for storing the map and helps to protect the map, since it may be difficult to use the map data without knowing which color (or field value) corresponds to which index in the palette. In particular embodiments, a colormap is a matrix of values that define the colors for graphics objects such as surface, image, and patch objects. A software application, such as for example MATLAB, may draw the objects by mapping data values to colors in the colormap. A colormap may be any length and may be three columns wide. Each row in the matrix may define one color using an RGB triplet. An RGB triplet is a three-element row vector whose elements specify the intensities of the red, green, and blue components of the color. Typically, the intensities are double or single values in the range [0, 1]. A value of 0 indicates no color and a value of 1 indicates full intensity.

TIFF files, including GeoTIFF, can be compressed. In particular embodiments, example compression schemes for compressing TIFF files include Deflate, LZW, PackBits, CCITT Group 3 fax, CCITT Group 4 fax, and JPEG. Although particular compression schemes are disclosed and illustrated herein, this disclosure contemplates any suitable compression schemes.

In particular embodiments, GeoTIFF and TIFF formats are used in georeferenced satellite images with incorporated data about coordinate system, type of transformation, geoid, etc. Using associated tags, information about pseudo color palettes can also be included for mapping GMF data in the same way as for indexed images. The values of the GMF in this palette are quantized by level and assigned to the combination (e.g. as in three-colored RGB manner or smaller if the informativity of map is not high). Although particular embodiments are described and illustrated with reference to the GMF, this disclosure contemplates any suitable magnetic field(s). Similarly, although GMF data and values of the GMF are described and illustrated herein, this disclosure contemplates any suitable data representing any suitable magnetic field(s) and any suitable values of any suitable magnetic field(s). Herein, where appropriate, reference to GMF data encompasses any suitable data about any suitable magnetic field(s), which may, but need not, include the earth's magnetic field. Herein, where appropriate, reference to GMF values encompasses data for any suitable magnetic fields, which may, but need not, include values of the earth's magnetic field. Herein, where appropriate, reference to GMF encompasses any suitable magnetic field(s), which may, but need not, include the earth's magnetic field. TIFF formats can be opened and edited in MATLAB and by other free software like LibTIFF. Its variant COG is supported by Google. LibTIFF is a library for reading and writing TIFF files. The set also contains command line tools for processing TIFFs. It is distributed in source code and can be found as binary builds for a variety of platforms.

In particular embodiments, differences in size and resolution between a GeoTIFF image and a GMF map tile (1° latitude×1° longitude) being embedded in it are dealt with as follows. Although particular geographic coordinate systems are described and illustrated herein, this disclosure contemplates any suitable geographic or other coordinate systems. FIG. 1 illustrates an example image from an example image file. In the example of FIG. 1, the image is an aerial view of part of the city of Boston and the file is a TIFF file. Its corresponding geo tag, R, may be as follows:

R=
   MapCellsReference with properties:
      XWorldLimits: [764317.995579396 779019.409746063]
      YWorldLimits: [2951122.28480912 2960574.36564245]
      RasterSize: [2881 4481]—number of pixels
   RasterInterpretation: 'cells'
      ColumnsStartFrom: 'north'—direction of X axis
      RowsStartFrom: 'west'—direction of Y axis
      CellExtentInWorldX: 3.28083333333333—pixel size in meters by X axis (may be also in longitude)
      CellExtentInWorldY: 3.28083333333333—pixel size in meters by Y axis (may be also in latitude)
      RasterExtentInWorldX: 14701.4141666667—width of raster (here in meters, may be also in degrees of longitude)
      RasterExtentInWorldY: 9452.08083333332—height of raster (here in meters, may be also in degrees of latitude)
      XIntrinsicLimits: [0.5 4481.5]
      YIntrinsicLimits: [0.5 2881.5]
      TransformationType: 'rectilinear'
      CoordinateSystemType: 'planar'

In particular embodiments, the GMF map and the image are not initially connected to each other. There is a database of images of the earth's surface in the GeoTIFF format and, separately, magnetic-field data is obtained and a GMF map is generated. After processing, the magnetic data is added to the existing images. That is, an image is taken, its resolution is determined, the corresponding fragment(s) from the map tile(s) are selected, and the dimensions are reduced to fit the image. A GMF map tile may, for example, be 1° latitude×1° longitude, or approximately 108 kilometers by 108 kilometers. If the resolution of a GMF map is a one meter by one meter cell, then for the GeoTIFF file in FIG. 1 the corresponding GMF map tile is separated and adjusted to the original size of the image. However, the resolution of the GeoTIFF file is 3.28 meters per element of array (per pixel). Therefore, if, in the GMF map the tile resolution is one meter per array element, then the existing resolution of the image is kept intact and data from the GMF map is adjusted accordingly to fit the image.

In particular embodiments, a grid of the total magnetic intensity is made using a minimum curvature algorithm to create a two-dimensional grid equally scaled in both directions. The algorithm produces a smooth grid by iteratively solving a set of difference equations minimizing the total second horizontal derivative while attempting to honor the input data. The size and resolution of GeoTIFF files can be used in this process. The size of GeoTIFF images is likely to be smaller than 1° latitude×1° longitude, therefore the original GMF map tile is adjusted to it, with no loss of data in particular embodiments. However, if the resolution of the GeoTIFF image is smaller than the GMF map, then adjusting the data to the image will, in particular embodiments, cause magnetic information to be lost. To address this, the GMF map is not compressed, but is rather roughened. The example below demonstrates how it happens for the onedimensional case. In this demonstration, one pixel in the GeoTIFF file has resolution of 3 meters, while one cell of GMF map has resolution of one meter and contains data in micro Tesla (µT).

GMF Map Cells (Data in µT), One Cell is One Meter

| 53 | 58 | 51 | 48 | 45 | 47 |
|---|---|---|---|---|---|

(53+58+51)/3=54

(48+45+47)/3=46.7

GMF Values Adjusted to GeoTIFF with Resolution ~3 Meter Per One Cell

| 54 | 46.7 |
|---|---|

In this example, an average is taken across three data values and the result is placed in one cell instead of having a separate cell for each original value. This example can be extended to a two-dimensional case as follows. If cells of GMF map have resolution one meter by one meter, and cells in the GeoTIFF file (for example, boston.tiff) have larger resolution, for example three meters by three meters, extra data may be averaged. The example given below shows fitting of GMF map resolution to the GeoTIFF file resolution. In this two-dimensional example, each GMF map cell (with data inside given in µT) is one square meter (1×1 meter), while one pixel in GeoTIFF file corresponds to nine square meters (3×3 meters). To match those data properly, data in GMF cells have to be averaged as shown in the table below.

GMF Map Cells (Data in µT), 1 Cell is 1×1 m²

| 53 | 58 | 51 | 48 | 45 | 47 |
|---|---|---|---|---|---|
| 43 | 50 | 45 | 48 | 50 | 30 |
| 56 | 49 | 48 | 47 | 48 | 39 |

(53+58+51+43+50+45+56+49+48)/9=50.3333

(48+45+47+48+50+30+47+48+39)/9=44.6667

GMF Values Adjusted to GeoTIFF with Resolution 3×3 m² Per 1 Cell

| 50.3333 | 44.6667 |
|---|---|

| Input: | Output: |
|---|---|
| $M_E$, $M_N$, $M_U$ from one (several) Patch_ID GeoTIFF resolution CellExtentInWorldX, CellExtentInWorldY and size RasterSize | Patch_size_geotiff_adjusted - new patch is created of the size equal to size of GeoTIFF and with each element to be either containing [$M_E$, $M_N$, $M_U$] averaged for given resolution if they were present in original Patch_ID or NaN if the GMF data for the given point was absent |

In particular embodiments, a new patch is created according to the size of the GeoTIFF file and the converted GMF data obtained from the first step is then added to this newly created patch.

In particular embodiments, if data are absent and there are areas for which magnetic data are unavailable (e.g. because magnetic readings have not yet been taken), then the absent data may be left as absent. This may be preferable in particular embodiments, but then the GeoTIFF image colored by GMF may appear patched with holes (places where the absent data is NaN or colored in black per the color palette). This may appear confusing to the user. Alternatively, the absent data may be taken from Earth Magnetic Anomaly Grid with Two-Arc-Minute Resolution (EMAG2), or any other suitable GMF map, and embedded into the GeoTIFF, possibly with special marking(s), for example, in the color palette or in one or more geo tag(s). In particular embodiments, this may present difficulties as it may be necessary to mark in some way the data that are absent and to be filled in from a global map. New data, for example, may be coming later and may need to be incorporated in an already existing GeoTIFF image. Particular embodiments may address this similar to processes in which, for the initially absent data filled from EMAG, later some specific number(s) may be added in a recurrent update algorithm.

In particular embodiments, the following ranges of GMF and resolution are taken into account when selecting a color palette. Consider the base EMAG2v3 Source GeoTIFFs available at https://www.ngdc.noaa.gov/geomag/emag2.html. In particular embodiments, the GeoTIFF format can be used in Environmental Systems Research Institute (ESRI) ArcGIS or any other suitable GIS application. In these GeoTIFFs, values (nT) are stored as 32-bit floating point and the no data value is 99999. The minimal and maximal values of GMF in (nT) are as follows:

min=−3.3810e+03 max=8.6326e+03 min=−3381 nT max=8632 nT

Figure 2:
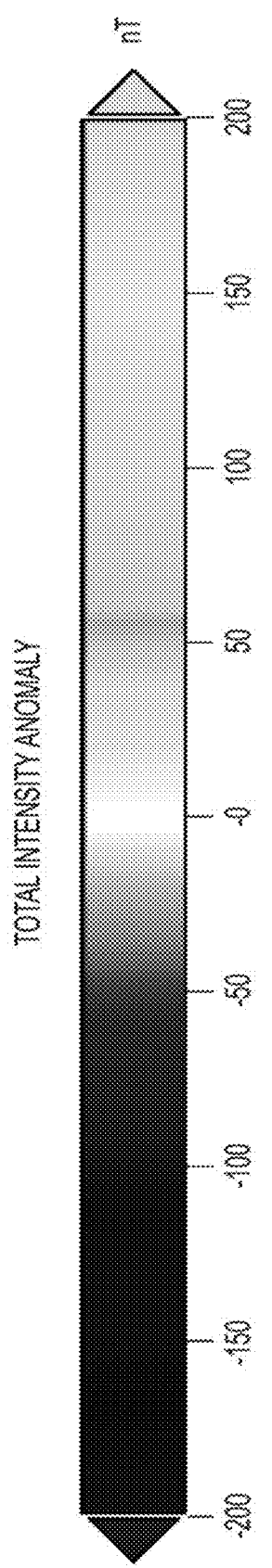
FIG. 2 provides an example visualization of an example range of magnetic-field strengths.
Figure 3:
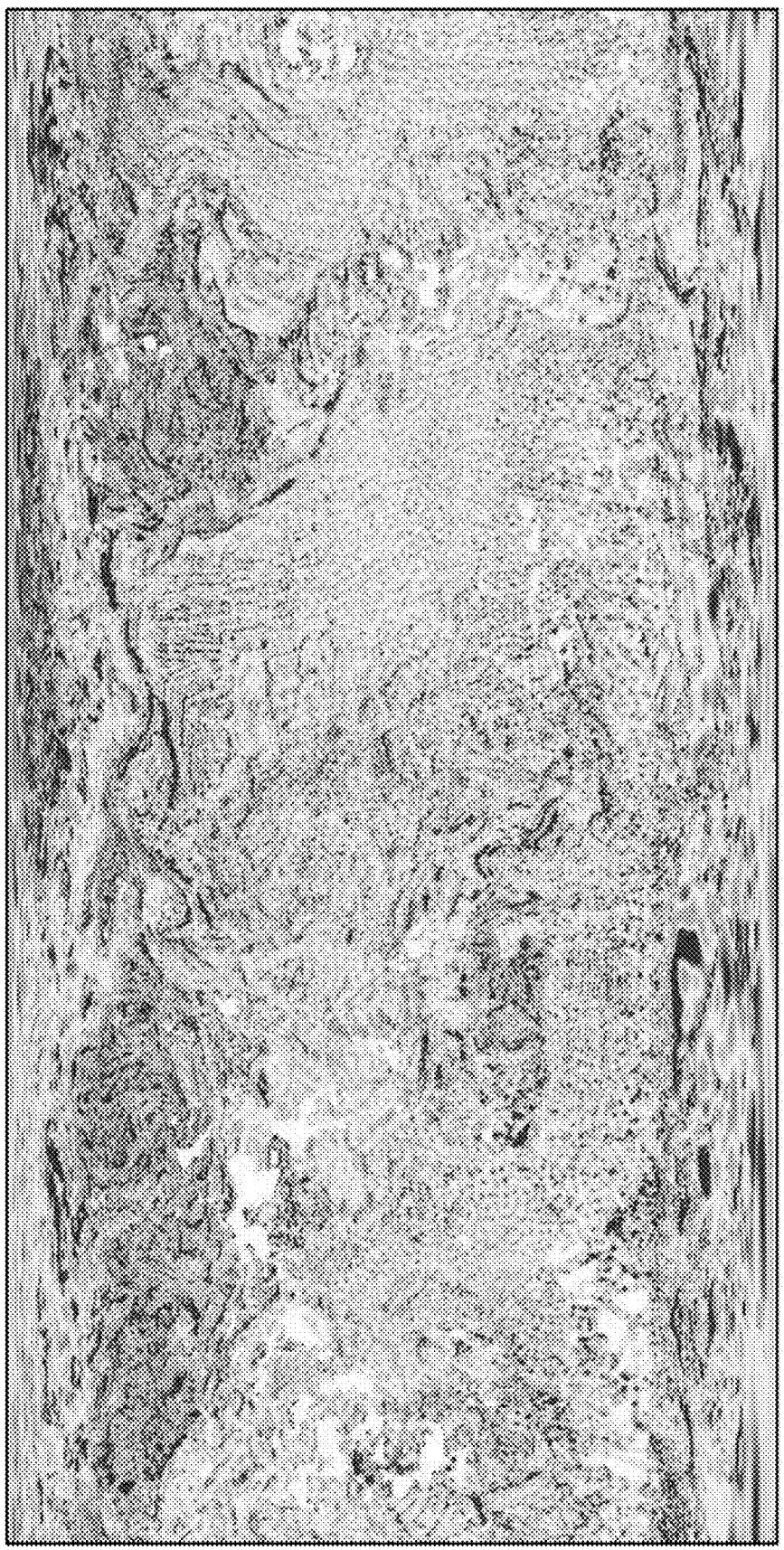
FIG. 3 provides an example visualization of an EMAG2v3 source GeoTIFF file.

FIG. 2 illustrates an example visualization of these values in grayscale. Although grayscale is described and illustrated herein, this disclosure contemplates any suitable color scheme, including full color. Herein, reference to color encompasses grayscale, and vice versa, where appropriate. FIG. 3 illustrates an example visualization, in grayscale, of an EMAG2v3 source GeoTIFF file. In the example of FIG. 3, the x axis ranges from 0° to 360° and the y axis ranges from −90° to +90°. Its corresponding geo tag, R, may be as follows:

R=
    MapCellsReference with properties:
      XWorldLimits: [−0.0166666666675 359.983333351332]
      YWorldLimits: [−89.9833333378325 89.9833333378325]
      RasterSize: [5399 10800]
      RasterInterpretation: 'cells'
        ColumnsStartFrom: 'north'
          RowsStartFrom: 'west'
      CellExtentInWorldX: 0.033333333335 (in degrees of longitude)
      CellExtentInWorldY: 0.033333333335 (in degrees of latitude)
      RasterExtentInWorldX: 360.000000018
      RasterExtentInWorldY: 179.966666675665
        XIntrinsicLimits: [0.5 10800.5]
        YIntrinsicLimits: [0.5 5399.5]
        TransformationType: 'rectilinear'
        CoordinateSystemType: 'planar'

Generally, the total value of GMF consists of two components: regular and anomalous.

$$F = F_{regular} + F_{anomalous}$$

The regular component can be calculated for any point of the ground surface for given location and time. For calculation it is possible to use World Magnetic Model (WMM) WMM2020 or International Geomagnetic Reference Field (IGRF). The total value of GMF is measured by magnetometers.

EMAG2 is a map of magnetic anomalies and contains negative values. In particular embodiments, an anomaly is a total value of magnetic field minus a regular component determined, for example, by the International Geomagnetic Reference Field (IGRF) or World Magnetic Model (WMM). The World Magnetic Model (WMM) and the International Geomagnetic Reference Field (IGRF) are estimated from the most recent data and may be of comparable quality. The differences between IGRF and WMM are within expected model inaccuracy. The WMM is a predictive-only model and is valid for the current epoch (2020.0 to 2025.0). The IGRF is retrospectively updated and the latest update, IGRF-12 is valid for the years 1900.0-2020.0. While IGRF is produced by the voluntary research of the scientific community under the banner of the International Association of Geomagnetism and Aeronomy (IAGA), the WMM is produced by NCEI and the British Geological Survey (BGS) for the US and UK defense agencies with guaranteed quality, user support, and updates. For the U.S. Department of Defense, the U.K. Ministry of Defence, the North Atlantic Treaty Organization (NATO), the International Hydrographic Organization (IHO) and the Federal Aviation Administration (FAA) the standard is WMM. For other users, the choice between WMM and IGRF may be arbitrary. Both of these models contain a standard mathematical description of the large-scale structure of the Earth's main magnetic field and its secular variation. When measurements are obtained (e.g. from mobile devices), these measurements contain the total field and therefore should be pre-processed to get them in the form of anomalies. In particular embodiments, this can be done using already implemented software modules (functions) of IGRF or WMM in MATLAB, python, C (or any other appropriate programming language).

In particular embodiments, the earth's magnetic field and its secular variation can be calculated using either the WMM or IRGF. The range of change in values of total GMF may be approximately 25,000 nT to 65,000 nT near the earth surface. The results of calculation of the regular component of the total GMF together with horizontal and vertical components using WMM are presented in the examples of FIGS. 4-6. Official WMM 2020 report (for a model for 2020-2025 years) contains all necessary formulas, coefficients, and test values to validate a model (https://www.ngdc.noaa.gov/geomag/WMM/data/WMM2020/WMM2020_Report.pdf). The following provides information about IGRF model and its limitations (https://www.ngdc.noaa.gov/IAGA/vmod/igrfhw.html).

Figure 4:
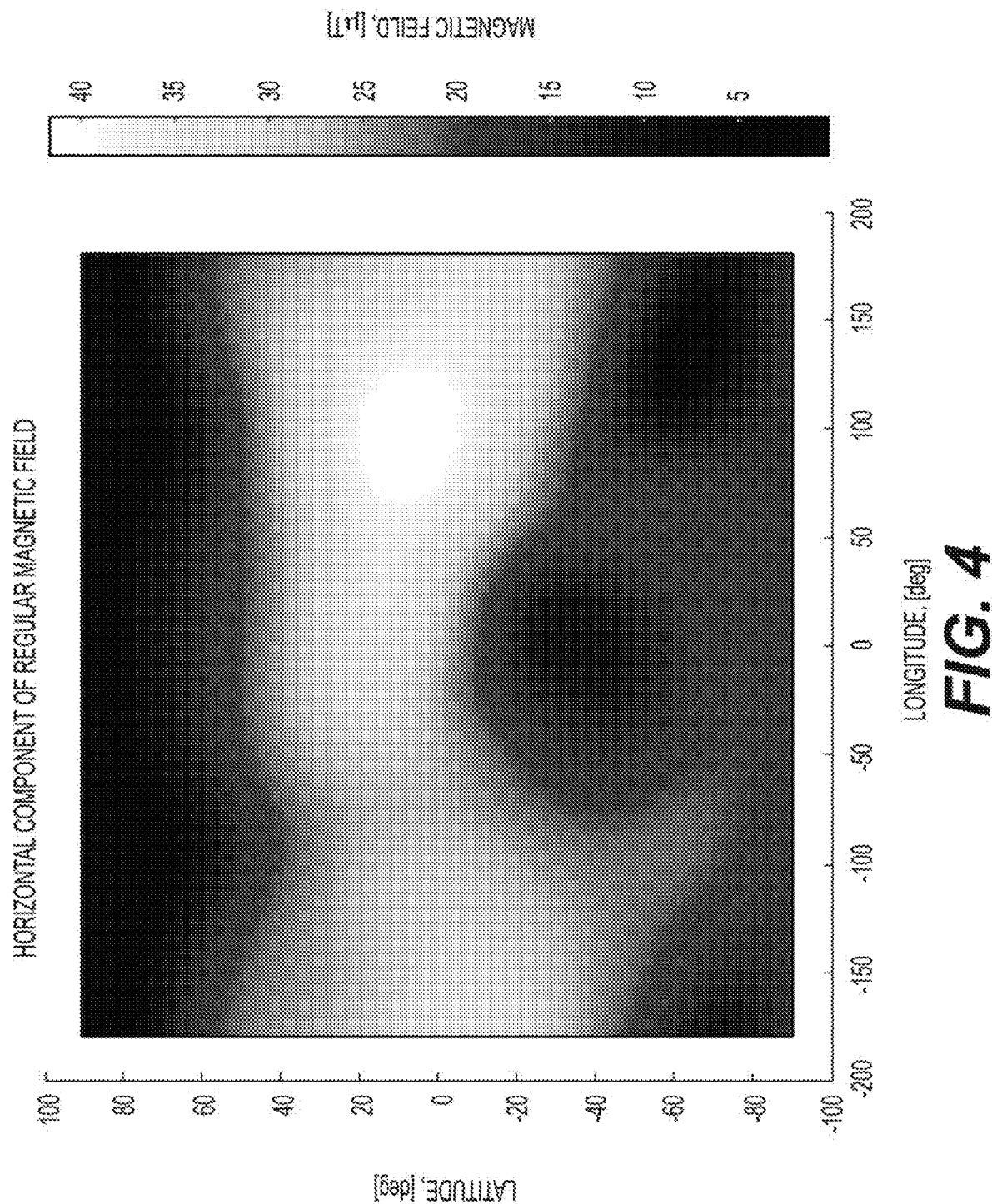
FIG. 4 provides an example visualization of an example horizontal component of an example magnetic field in an example area.
Figure 5:
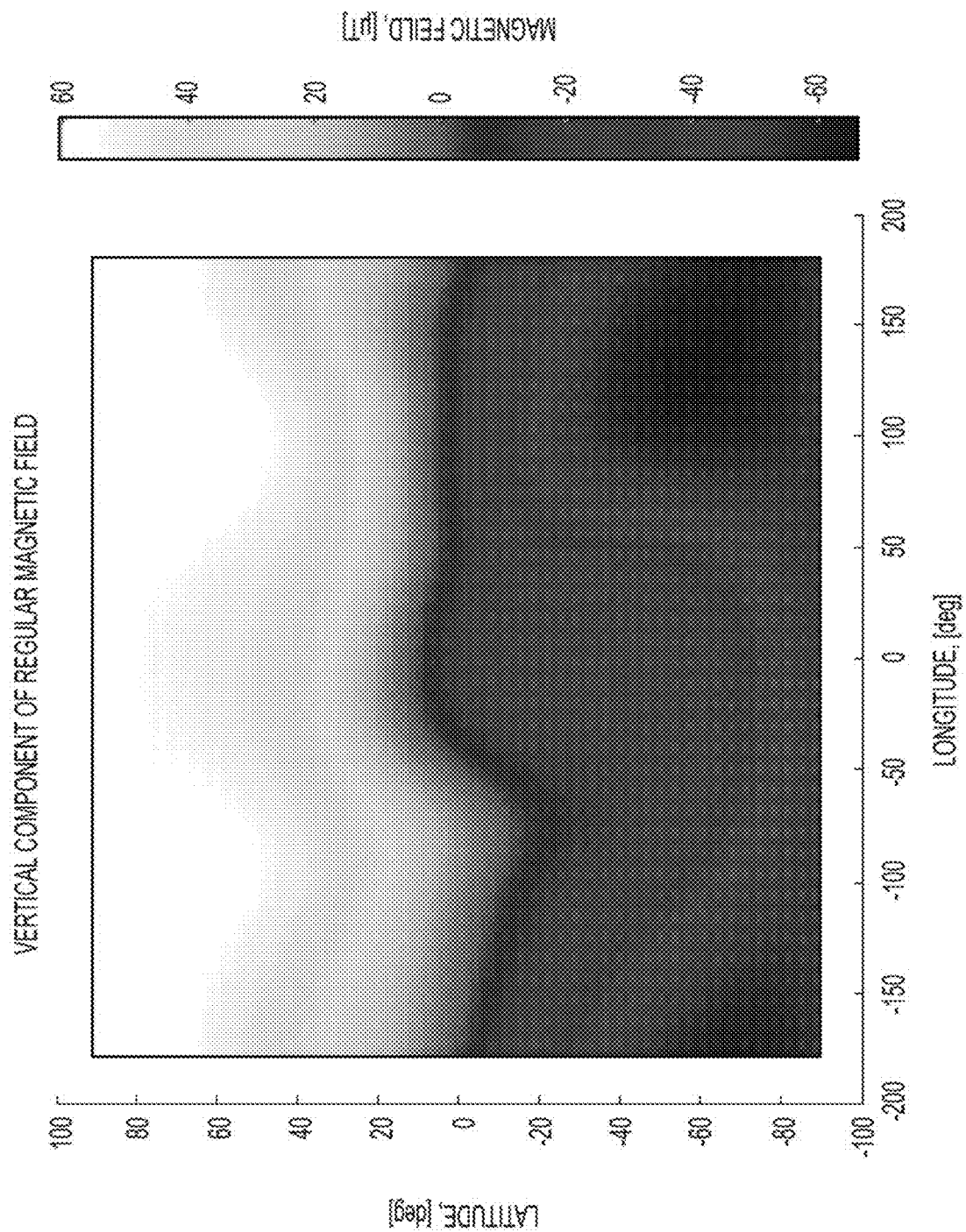
FIG. 5 provides an example visualization of an example vertical component of an example magnetic field in an example area.
Figure 6:
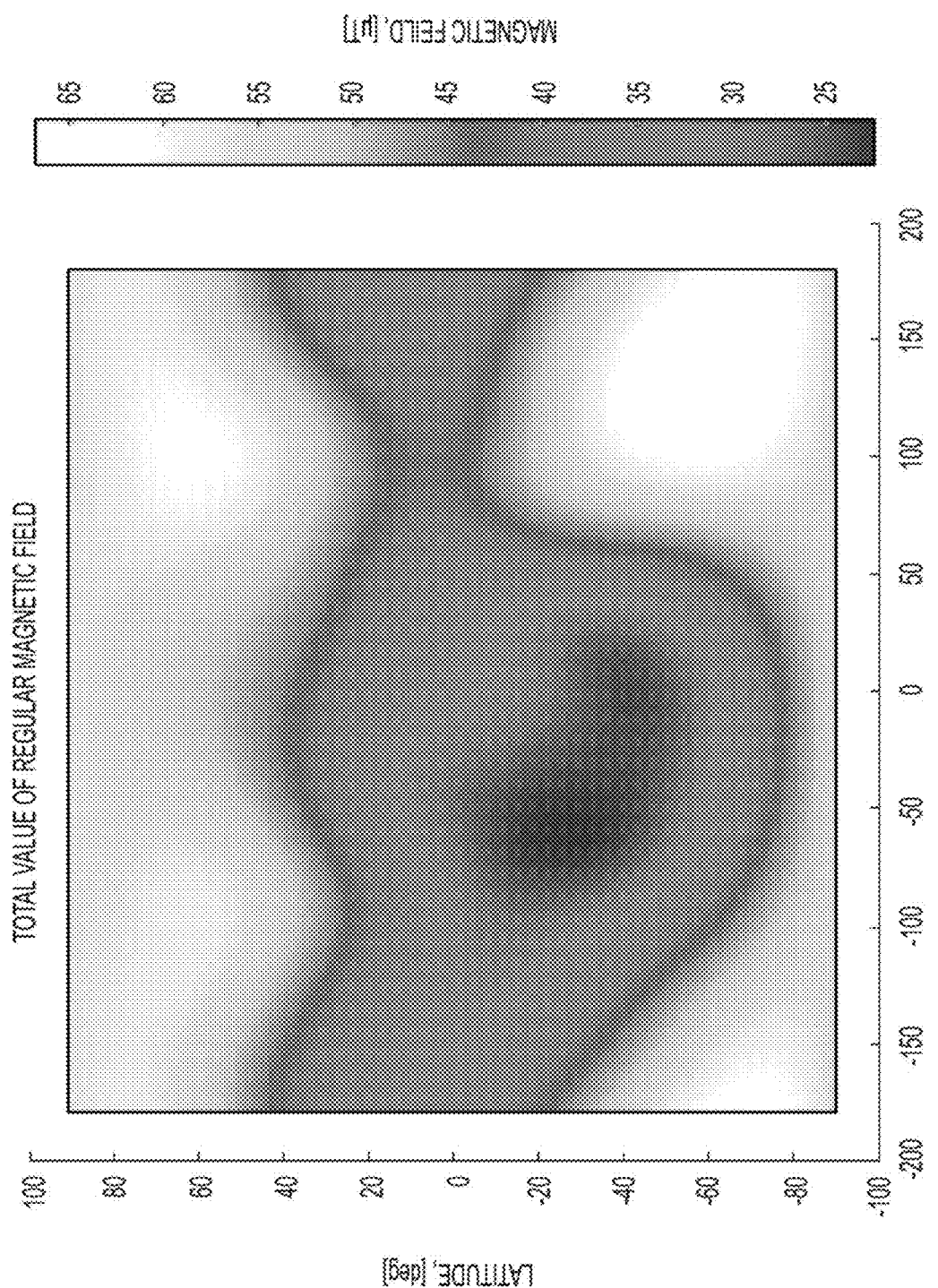
FIG. 6 provides an example visualization of an example total value of an example magnetic field in an example area.

The earth's magnetic field crudely resembles that of a central dipole. On the earth's surface the field varies from being horizontal and of magnitude about 30,000 nT near the equator to vertical and about 60,000 nT near the poles. The root mean square (RMS) magnitude of the vector over the surface is about 45,000 nT. The internal geomagnetic field also varies in time, on a time-scale of months and longer, in an as yet unpredictable manner. This so-called secular variation (SV) has a complicated spatial pattern, with a global RMS magnitude of about 80 nT/year. Consequently, a numerical model of the geomagnetic field may have coefficients that vary with time. FIG. 4 illustrates an example horizontal component of an example regular magnetic field. FIG. 5 illustrates an example vertical component of an example regular magnetic field. FIG. 6 illustrates an example total value of an example regular magnetic field. In particular embodiments, the range for indexed color Geo-TIFF images are selected depending on the ranges of EMAG2 minimum of −3381 nT and maximum of 8632 nT. The resolution may be selected depending on the assumed accuracy of used sensors (magnetometers). Assuming an accuracy of approximately 1 µT, the range may be −0.000003381 T and 0.000008632 T. This is a rather small variation, and in particular embodiments the range can be divided into 13 quantized levels: −3, −2, −1, 0, 1, 2, 3, 4, 5, 6, 7, 8, and 9. For example, a particular sensor (e.g. magnetometer embedded in a mobile phone) may have an accuracy of 0.0625 µT.

In particular embodiments, a magnetic field is a vector quantity, having at each point in space a strength and a direction. To describe a magnetic field, three quantities may be used. These may be as follows:
  three orthogonal strength components (X, Y, and Z);
  the total field strength and two angles (F, D, I); or
  two strength components and an angle (H, Z, D)

Figure 7:
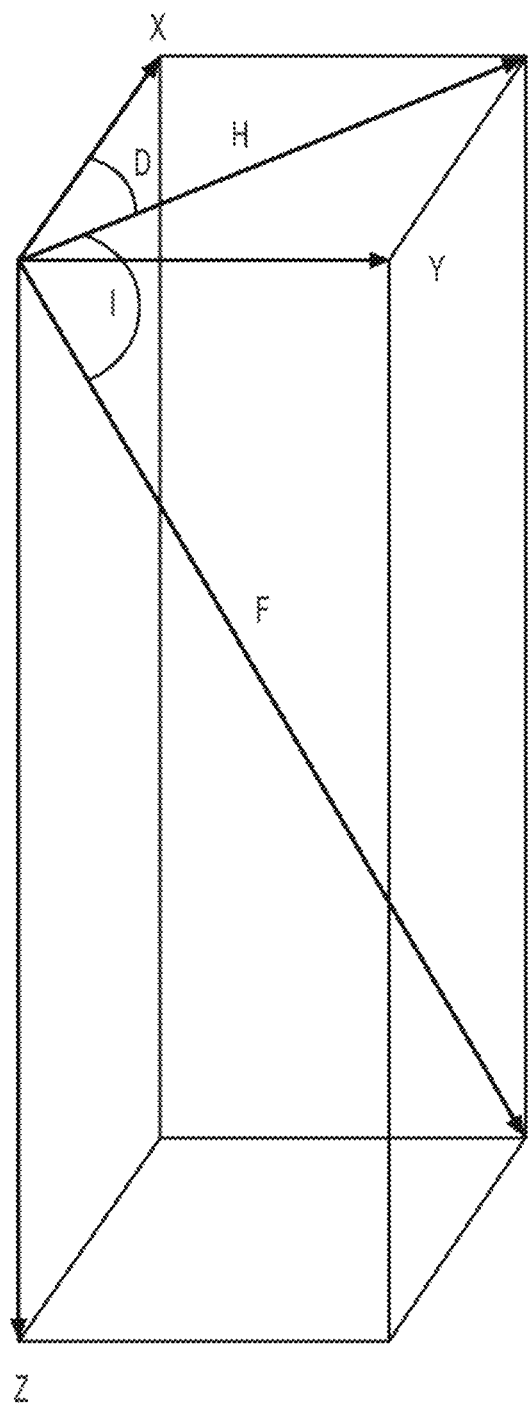
FIG. 7 illustrates example components of an example magnetic field.

The relationships among these elements can be seen in the example of FIG. 7. These elements may be described as follows:

Magnetic Components

| Component | Description |
| --- | --- |
| F | the total intensity of the magnetic field vector |
| H | the horizontal intensity of the magnetic field vector |
| Z | the vertical component of the magnetic field vector; by convention Z is positive downward |
| X | the north component of the magnetic field; X is positive northward |
| Y | the east component of the magnetic field; Y is positive eastward |
| D | magnetic declination, defined as the angle between true north (geographic north) and the magnetic north (the horizontal component of the field). D is positive eastward of true North. |
| I | magnetic inclination, defined as the angle measured from the horizontal plane to the magnetic field vector; downward is positive |

D and I may be measured in degrees, and all other elements may be measured in nanotesla. The seven elements are related through the following expressions:

Declination (D)

$$D = \left(\frac{Y}{X}\right)$$

Inclination (I)

$$I = \left(\frac{Z}{H}\right); \cos\cos(I) = \frac{H}{F}$$

Horizontal (H)

$$H = \sqrt{X^2 + Y^2}; H = F \cdot \cos\cos(I)$$

North (X)

$$X = H \cdot \cos\cos(D)$$

East (Y)

$$Y = H \cdot \sin\sin(D)$$

Down (Z)

$$Z=\sqrt{F^2-X^2-Y^2}$$

Intensity (F)

$$F=\sqrt{X^2+Y^2+Z^2}$$

In particular embodiments, a magnetic map includes data representing one or more values for one or more of these elements at points in a 2D or 3D space.

If a GeoTIFF image with true color (e.g. full RGB of 65,536 colors) is converted into an indexed image (e.g. with a specified palette containing both visual and magnetic data), then particular reductions in quality may occur. In MATLAB or another similar programming environment, RGB images can be converted into indexed images by setting the colormap. Converting a GeoTIFF file of the image in FIG. 1 into a colormap with only 32 colors may produce the following results:

| FieldName | RGB Information | Indexed Information |
| --- | --- | --- |
| FileSize | 38729900 | 13767766 |
| ColorType | truecolor | indexed |
| BitDepth | 24 | 8 |
| BitsPerSample | 8 | 8 |
| PhotometricInterpretation | RGB | Palette |

For navigation (and visualization of mapping information), it may be sufficient to have a smaller color palette to leave room for GMF data. In particular embodiments, RGB GeoTIFF images are rewritten into indexed images, creating a new pseudo palette of colors containing in one part the color information and in another part magnetic data (which may be quantized). In particular embodiments, GMF data is incorporated into a GeoTIFF file via a transparency channel. In particular embodiments, a multi-layered GeoTIFF is created where the layers will be for the same palette or for different palettes. It may be preferable in particular embodiments to incorporate GMF data into a GeoTIFF file via a transparency channel.

In particular embodiments, in the RGB model, a color is described as a combination of the three primary colors of light (red, green, and blue) in particular concentrations. For each of the three components, 0 represents minimum intensity, and $2^{(BitsPerSample)}-1$ represents maximum intensity. Thus, an RGB value of (0,0,0) represents black, and (255,255,255) represents white, assuming 8-bit components. For PlanarConfiguration=1, the components are stored in the indicated order: first Red, then Green, then Blue. For PlanarConfiguration=2, the StripOffsets for the component planes are stored in the indicated order: first the Red component plane StripOffsets, then the Green plane StripOffsets, then the Blue plane StripOffsets. In particular embodiments, in the palette-color model, a color is described with a single component. The value of the component is used as an index into the red, green, and blue curves in the ColorMap field to retrieve an RGB triplet that defines the color. When PhotometricInterpretation=3 is used, ColorMap must be present and SamplesPerPixel must be 1. In particular embodiments, this means that the image is used to define an irregularly shaped region of another image in the same TIFF file. SamplesPerPixel and BitsPerSample must be 1. PackBits compression is recommended in particular embodiments. The 1-bits define the interior of the region, and the 0-bits define the exterior of the region. A reader application can use a transparency mask to determine which parts of the image to display. Main image pixels that correspond to 1-bits in the transparency mask are imaged to the screen or printer, but main image pixels that correspond to 0-bits in the transparency mask are not displayed or printed.

In particular embodiments, TIFF readers may process multiple images (subfiles) per TIFF file, although they are not required to do anything with images after the first one. TIFF writers may be required to write a long word of 0 after the last Image File Directory (IFD) (to signal that this is the last IFD), as described in a TIFF format specification. If multiple subfiles are written, the first one must be the full-resolution image. Subsequent images, such as reduced-resolution images, may be in any order in the TIFF file. If a reader wants to use such images, it must scan the corresponding IFD's before deciding how to proceed. Some TIFF files may have more components per pixel than may be expected. A Baseline TIFF reader must skip over them, using the values of the SamplesPerPixel and BitsPerSample fields. For example, it is possible that the data will have a PhotometricInterpretation of RGB but have four SamplesPerPixel. In particular embodiments, extra components specify that each pixel has m extra components whose interpretation is defined by one of the values listed below. When this field is used, the SamplesPerPixel field has a value greater than the PhotometricInterpretation field suggests. For example, full-color RGB data normally has SamplesPerPixel=3. If SamplesPerPixel is greater than three, then the ExtraSamples field describes the meaning of the extra samples. If SamplesPerPixel is, say, five then ExtraSamples will contain two values, one for each extra sample. ExtraSamples is typically used to include non-color information, such as opacity, in an image. Possible values for each item in the field's value are as follows:

0=Unspecified data
1=Associated alpha data (with pre-multiplied color)
2=Unassociated alpha data Associated alpha data is opacity information. Unassociated alpha data is transparency information that logically exists independent of an image. It is commonly called a soft matte. Including both unassociated and associated alpha is undefined because associated alpha specifies that color components are pre-multiplied by the alpha component, while unassociated alpha specifies the opposite. By convention, extra components that are present must be stored as the "last components" in each pixel. For example, if SamplesPerPixel is 4 and there is 1 extra component, then it is located in the last component location (SamplesPerPixel-1) in each pixel. Components designated as "extra" are just like other components in a pixel. In particular, the size of such components is defined by the value of the BitsPerSample field. With the introduction of this field, TIFF readers must not assume a particular SamplesPerPixel value based on the value of the PhotometricInterpretation field. For example, if the file is an RGB file, SamplesPerPixel may be greater than 3. The default is no extra samples. This field may be present if there are extra samples.

As an example, in particular embodiments, when embedding a magnetic map into a GeoTIFF or other suitable image, there may be a default map image in TIFF format based on GNSS data. This file may have, for example, three samples per pixel. The geomagnetic data is added as an extra component via appropriate programming environment (MATLAB could be used as one option) in the form of the alpha channel. After applying appropriate code, the new TIFF file may (in this example) have four samples per pixel, including the newly added GMF data. This modified TIFF file may be used to extract embedded GMF data for localization, navigation or any other purposes.

As an example only, and not by way of limitation, particular embodiments incorporate GMF data into a GeoTIFF file via a transparency channel, where alpha channel is the transparency channel.

There are three components of magnetic-field strength Mx, My, Mz. The magnitude of magnetic field, M, may be defined as follows:

$$M=\sqrt{M_x^2+M_y^2+M_z^2}$$

Figure 8:
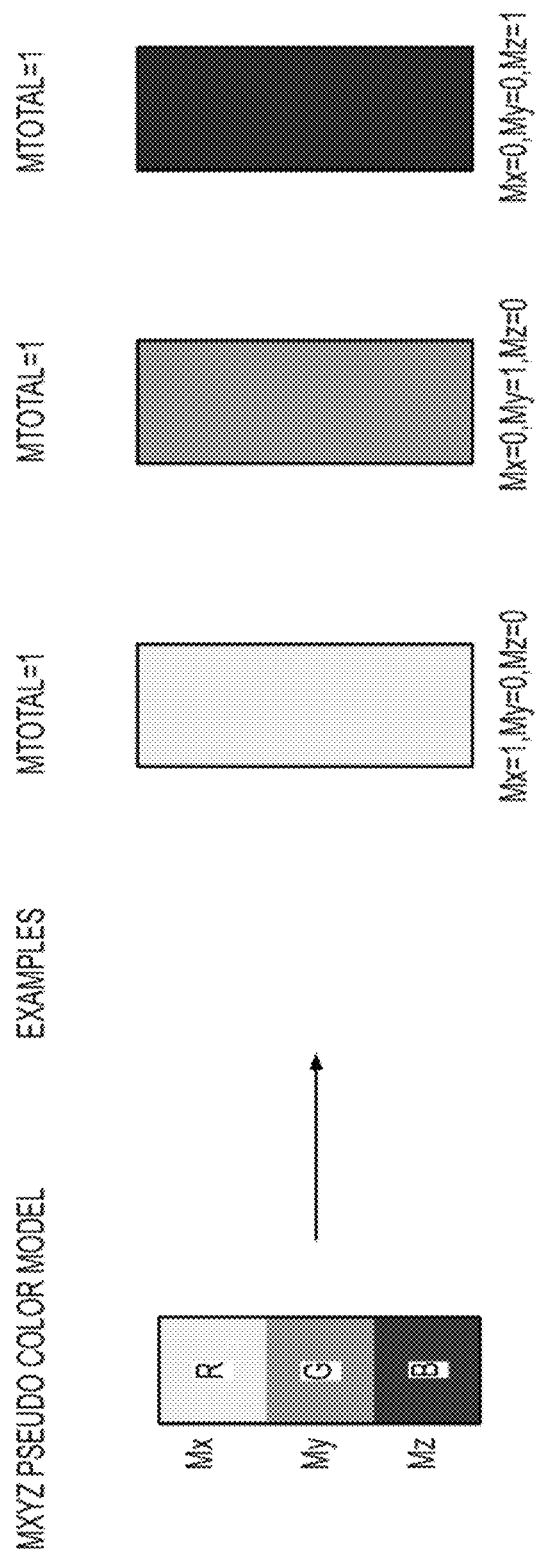
FIG. 8 illustrates an example MXYZ pseudocolor model.

For different combinations of Mx, My, and Mz, the magnitude may be the same. As for color representation in an RGB model, different components of a triad may produce different final colors. If the same approach is used, then the final colorization of the GMF map may be different for the same values of total magnetic field, which may be undesirable. Consider the following example, illustrated in FIG. 8. If the total magnitude of GMF at a given point is equal to one, then there will be a variety of options of distribution between the XYZ components, which may result in different pseudo coloring. For visualization, the layer representation of XYZ components can be used to make distinctions between different distribution of GMF components.

In particular embodiments, a patch is a data set that includes GMF values for a particular area. For example, Patch_ID1 may include GMF data for area 1, Patch_ID2 may include GMF data for area 2, etc. The number of patches may be related to the number of patches needed to fill the map tile. Patch_ID may contain three components of GMF (Mx, My, Mz) and the total magnitude.

In particular embodiments, additional tags are added to the original GeoTIFF file. This additional information may be used to be able to restore the original GMF data after embedding. The MXYZ pseudo colormap may be analogue to a colormap in indexed images, and, in particular embodiments, a quantization method is needed for navigation if a three-components magnetic field is used. For an MXYZ map, it can be assumed that the data of the three components of GMF are obtained in a prescribed coordinate system orientation, for example, east, north, up (ENU) coordinates (or they may be converted to this orientation by quaternions or Direction Cosine Matrix (DCM) from a mobile sensor unit). An MXYZ pseudo colormap can be determined from quantization of already present GMF data. In particular embodiments, such as this example, the colormap will be different each time for different patches. In addition, or as an alternative, the MXYZ pseudo colormap can be prescribed, depending on the max and min possible values of the XYZ components of the magnetic field. Particular embodiments may use the modified quantization algorithm or use one of the following algorithms already available in MATLAB, Python, or other appropriate programming environments:

Uniform Quantization—Uniform quantization cuts the RGB color cube into smaller cubes of length tol. For example, if you specify a tol of 0.1, the edges of the cubes are one-tenth the length of the RGB cube. The total number of small cubes is:

$$n=(\text{floor}(1/\text{tol})+1)^3$$

Each cube represents a single color in the output image. Therefore, the maximum length of the colormap is n. rgb2ind command removes any colors that don't appear in the input image, so the actual colormap can be much smaller than n. This may be advantageous from the point of view of universality, as it may provide the prescribed pseudo colormap for all regions with different levels of GMF.

Minimum Variance Quantization—Minimum variance quantization cuts the RGB color cube into smaller boxes (not necessarily cubes) of different sizes, depending on how the colors are distributed in the image. If the input image actually uses fewer colors than the number specified, the output colormap is also smaller. This may be advantageous for visualization of detailed GMF in local region, as minimal variation in the field may have distinctive color differences. This may also be advantageous for protecting the data from unauthorized use since the extracting the GMF data for navigation is only possible if knowing/having tags for a specific GeoTIFF.

Inverse Colormap—The inverse colormap algorithm quantizes the specified colormap into 32 distinct levels per color component. Then, for each pixel in the input image, the closest color in the quantized colormap is found. This is similar to Uniform Quantization, but here the length of the colormap will be the same, even if for the given GeoTIFF one or several pseudo color range are absent in the GMF data.

In particular embodiments, the following example algorithm may be used. Although this disclosure describes and illustrates particular steps of this method as occurring in a particular order, this disclosure contemplates any suitable steps of this method occurring in any suitable order. Moreover, although this disclosure describes and illustrates this example algorithm including particular steps, this disclosure contemplates any suitable algorithm including any suitable steps, which may include all, some, or none of the following steps, where appropriate. Furthermore, although this disclosure describes and illustrates particular components, devices, or systems carrying out particular steps of this algorithm, this disclosure contemplates any suitable combination of any suitable components, devices, or systems carrying out any suitable steps of the algorithm. In a first step, the XYZ components of GMF (from Patch_ID) given in the body-fixed coordinate system should be converted into XYZ components in ENU frames (or the frame used in the GeoTIFF referencing). In particular embodiments, conversion of XYZ components of GMF from the body-fixed to ENU frame are done before those data are put into Patch_ID (at least leveling). One cell of Patch_ID may contain several measurements, and each of them could be done with different orientation in space.

The file boston.tiff (shown in the example of FIG. 1) has an orientation of axis as west and north.

input $Mx,My,Mz$ ==>output $M_E,M_N,M_U$

In a second step, data about XYZ components to fill the selected GeoTIFF file may be extracted from Patch_ID (or it may include several patches). These data are magnetic data, collected and pre-processed: XYZ components in ENU system (or vertical Z and horizontal H components+declination D). There may be variations however. The GeoTIFF file may have a resolution other than Patch_ID. It is determined by one or more tags from the following data fields:

CellExtentInWorldX

CellExtentInWorldY

In a third step, the XYZ components of GMF in the Patch_size_geotiff_adjusted are quantized.

| Input: | | Output: |
|---|---|---|
| $M_E$, $M_N$, $M_U$ | → | MXYZ pseudo colormap |

Either prescribed length or varying length is used, depending on the selected quantization method. In particular embodiments, this output is eventually processed to generate a map for navigation and visualization.

In a fourth step, the GeoTIFF file is modified by adding the alpha channel. In particular embodiments, the MXYZ pseudo colormap obtained in the third step is added to the GeoTIFF file in the form of the alpha channel as an additional component. The value in the alpha channel (fourth sample in pixel) may be a link to a specific value of GMF contained in the MXYZ pseudo colormap.

| Input: | | Output: |
|---|---|---|
| MXYZ pseudo colormap, Patch_size_geotiff_adjusted | → | new GeoTIFF file with alpha channel |

In particular embodiments, the maximum range of transparency is from zero (e.g. full transparency) to 255 (e.g. black color). In particular embodiments, the MXYZ pseudo colormap may be adjusted to 256 length (there may be only variation in maximum and minimum limits of GMF associated with 1 and 255 values of alpha) and zero value of alpha may be saved for NaN values in Patch_size_geotiff_ adjusted in order not to be not shown in the image.

In a fifth step, an additional tag containing information about the quantization method and MXYZ pseudo colormap is created. This additional information is added to restore the original GMF data after embedding in particular embodiments. In particular embodiments, the tag is created together with the GeoTIFF file. In particular embodiments, the additional information may be in the form of a TXT file. The tag is a part of metadata associated with the GeoTIFF file. There is a number of required tags, but this file format allows creation of user-defined tags specific to a particular application.

As an example of creating an MXYZ colormap from a magnetic profile, each component (XYZ) is quantized into a given number of levels, depending on its maximal and minimal values. The corresponding quantized value is assumed to be one of the basic colors (RGB). Each entry in the magnetic profile or patch_ID is then associated with the combination of XYZ-RGB that is then written in the color palette (e.g. 'coded' via color palette). In the GeoTIFF file instead of all three components of GMF the only one number (integer number) is stored as a link to the MXYZ colormap. In this case, it is possible that the pixel with the same value of total magnitude of GMF may have different color as a result of different combination of XYZ (RGB) components. For visualization, particular embodiments can switch between this 3D colorization and the visualization via alpha channel by total magnitude of GMF. The reading from an example from Coronado island may be taken as an example of magnetic profile to be colorized:

```
%assigning the components of GMF
X=ds.calMagX___T__;
Y=ds.calMagY___T__;
Z=ds.calMagZ___T ;
%assigning the latitude and longitude
```

```
latitude=ds.Lat__;
longitude=ds.Long__;
%calculating the total magnitude of GMF – actual one
totGMF=sqrt(X.^2+Y.^2+Z.^2);
%assigning the level 255 to non-transparent value
totGMFmax=max(totGMF);
totGMFmin=min(totGMF);
delta=totGMFmax-totGMFmin;
QLevel_GMF=delta/255;
QGMF=round((totGMF-totGMFmin)/QLevel_GMF);
%adding fixed positive shift to avoid negative values: shift=1000
X=1000+X;
Y=1000+Y;
Z=1000+Z;
%calculation of min and max values in XYZ components of GMF
Xmin=min(X);
Xmax=max(X);
Ymin=min(Y);
Ymax=max(Y);
Zmin=min(Z);
Zmax=max(Z);
%calculation of range in XYZ components of GMF
deltaX=Xmax-Xmin;
deltaY=Ymax-Ymin;
deltaZ=Zmax-Zmin;
```

In particular embodiments, each component of GMF is quantized into eight levels (from zero to seven) and the ranges in maximal and minimal values in XYZ are divided into seven sets. The total possible size for color palette is $2^3*2^3*2^3=512$.

```
%quantization level in each XYZ components
QLevelX=deltaX/7;
QLevelY=deltaY/7;
QLevelZ=deltaZ/7;
%quantization
QX=round((X-Xmin)/QLevelX);
QY=round((Y-Y min)/QLevelY);
QZ=round((Z-Zmin)/QLevelZ);
%colormap contains three components of RGB with length 8 bit
%MATLAB representation requires range of RGB components in [0, 1]
%that's why XYZ components are also converted in this range
QX_RGB=QX/7;
QY_RGB=QY/7;
QZ_RGB=QZ/7;
%forming the color palette
QXYZ=round([QX_RGB QY_RGB QZ_RGB],2);
%eliminating the repeating entries
MXYZ_colormap = unique(QXYZ(:,[1 2 3]), 'rows');
%replacing the XYZ by single value from MXYZ colormap
[tf, index]=ismember(QXYZ,MXYZ_colormap,'rows');
%Variable 'index' has the same number of rows as QXYZ
%rename it in magnetic profile
magnetic_profile=index;
%plotting the colorized 3D magnetic profile
figure,geoscatter(latitude,longitude,30,MXYZ_colormap(index,:))
%plotting the colorized total magnitude of GMF along the track
figure,geoscatter(latitude,longitude,30,QGMF)
h=colorbar
```

The resulting color palette may contain contains 94 entries. In cases of higher accuracy, the length of representation for each component can be increased to 16 Qlevels. In this case, the total length of the MXYZ palette will be $2^4*2^4*2^4=4096$. But, for the same example, the presentation may include 264 entries.

Figure 9:
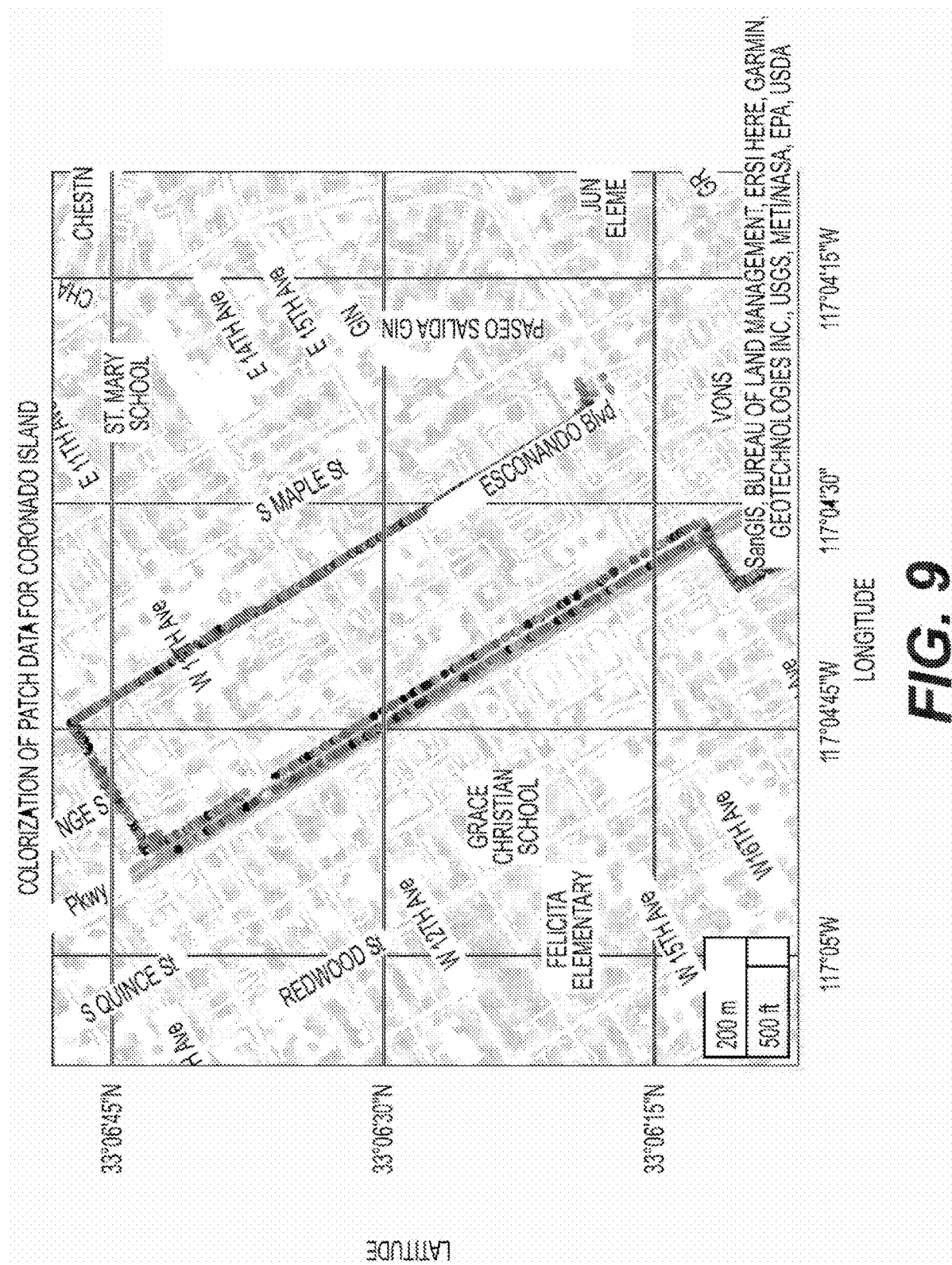
FIG. 9 provides an example visualization of an example trajectory.
Figure 10:
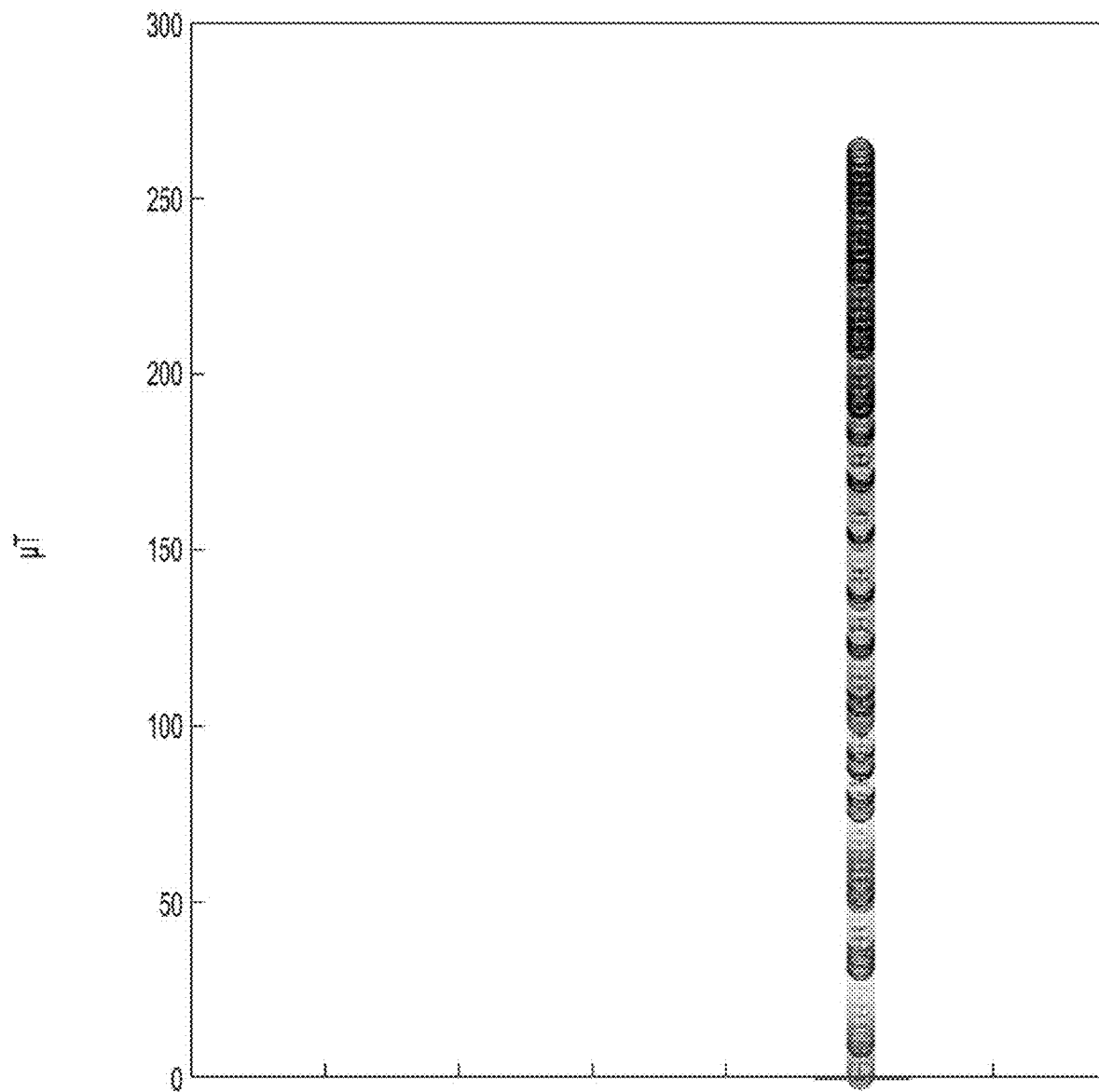
FIG. 10 provides an example visualization of an example colorbar.

In particular embodiments, with this approach (when taking the specific region or specific magnetic profile to be visualized and added to GeoTIFF), the length of the MXYZ palette will be varied and not fixed. Moreover, to decode the palette data it may be advantageous to know ranges of XYZ components: Xmin, Xmax, Ymin, Ymax, Zmin, Zmax, and number of quantization levels together with quantization method. FIG. 9 illustrates an example visualization of an example trajectory. The result is a colorized 3D magnetic profile, which may be displayed graphically to a user. In particular embodiments, more data may be displayed and more colorization may be added to the map. The colorbar (from a 264 length MXYZ colormap) may be displayed as illustrated (in grayscale) in the example of FIG. 10.

Herein, where appropriate, a trajectory is a curve that a magnetic-measurement device describes through a 2D or 3D space as it makes and records magnetic measurements. The magnetic-measurement device may make and record one or more magnetic measurements at each of one or more points along the trajectory. The points may be defined using any suitable 2D or 3D coordinate system, such as, for example, the Geographic Coordinate System (GCS), which identifies positions on the Earth in degrees of latitude and longitude; the Earth-Centered Earth-Fixed (ECEF) coordinate system; the Military Grid Reference System (MGRS); the Universal Transverse Mercator (UTM) grid system; or the Universal Polar Stereographic (UPS) grid system; or any other suitable coordinate system. The magnetic-measurement device may make and record one or more magnetic measurements along the trajectory and record one or more locations for those magnetic measurements (e.g. the locations where they were made). The magnetic-measurement device may also record one or more timestamps for those magnetic measurements, e.g., indicating when they were made. The magnetic-measurement device may also record one or more characteristics of the magnetic-measurement device for those magnetic measurements, such as, for example, a device identifier of the magnetic-measurement device; a device type of the magnetic-measurement device (e.g. automobile, mobile phone, drone, etc.); a sensor type (e.g. magnetometer type) of the sensor(s) that made the magnetic measurements; one or more headings of the magnetic-measurement device when the magnetic measurements were made; one or more orientations of the magnetic-measurement device when the magnetic measurements were made; or any other suitable characteristics of the magnetic-measurement device. Such trajectory data (e.g. magnetic measurements, locations, timestamps, and device characteristics), in any suitable combination, may be used to create or update a magnetic map. For example, a magnetic-measurement device may generate trajectory data for a trajectory, temporarily store the trajectory data, and then communicate the trajectory data to a server for incorporation into a magnetic map encompassing the trajectory, along with other trajectories from other magnetic-measurement devices. Although particular combinations of particular trajectory data are described or illustrated herein, this disclosure contemplates any suitable combinations of any suitable trajectory data. Herein, reference to a trajectory may encompass trajectory data, and vice versa, where appropriate.

Figure 11:
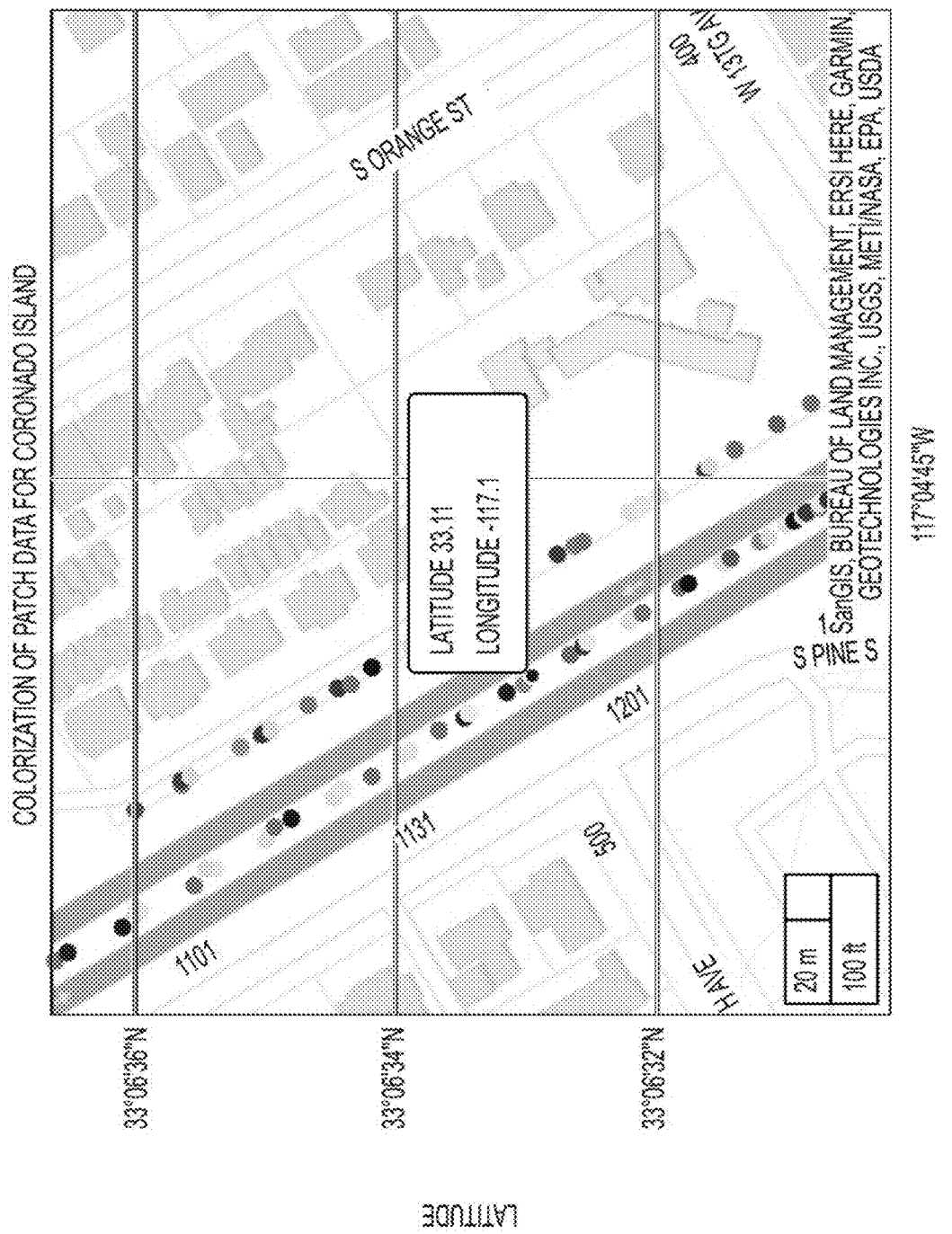
FIG. 11 illustrates an example zoomed-in portion of the visualization in FIG. 9.
Figure 12:
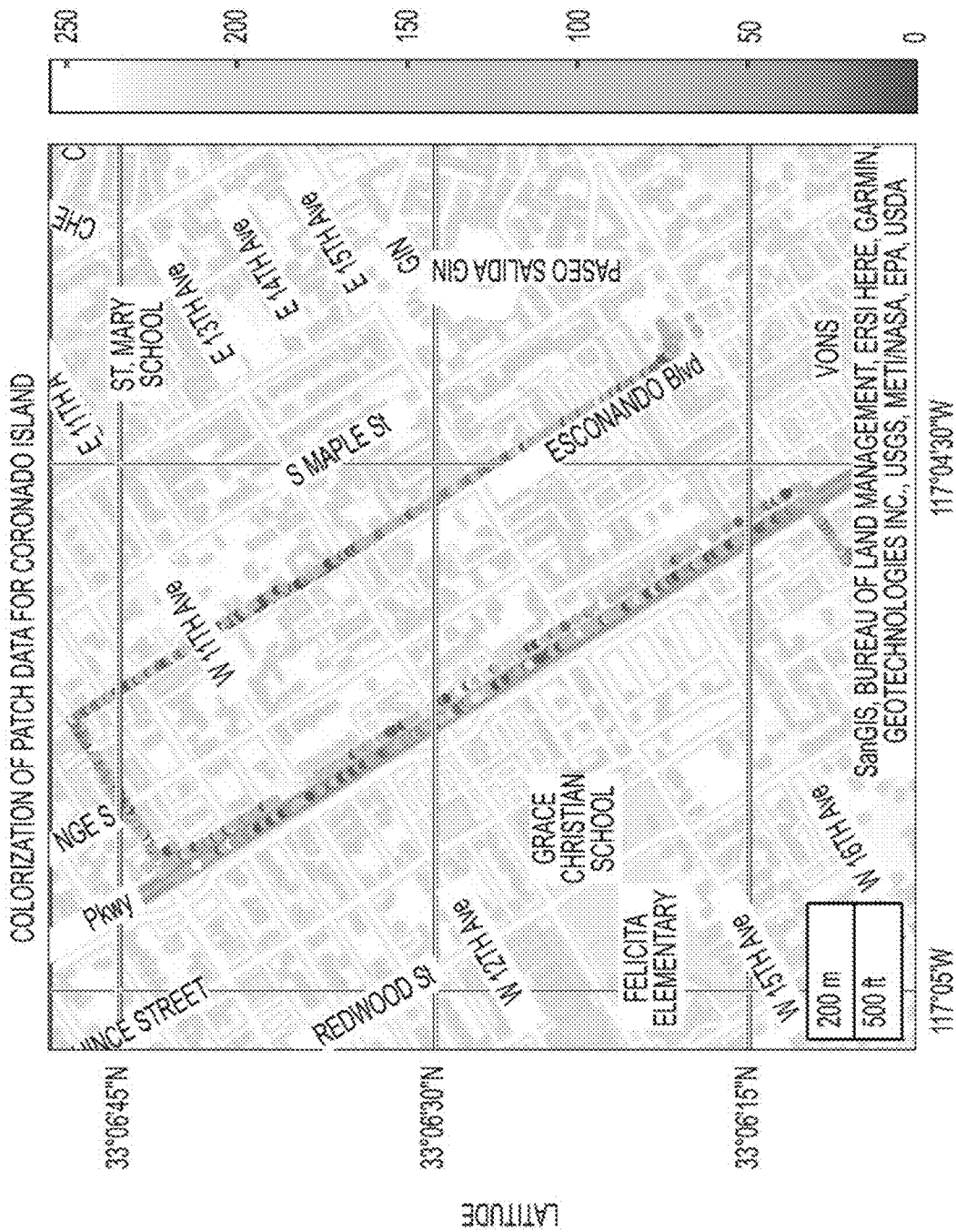
FIG. 12 illustrates example total magnitude of GMF along the route in FIG. 9.
Figure 13:
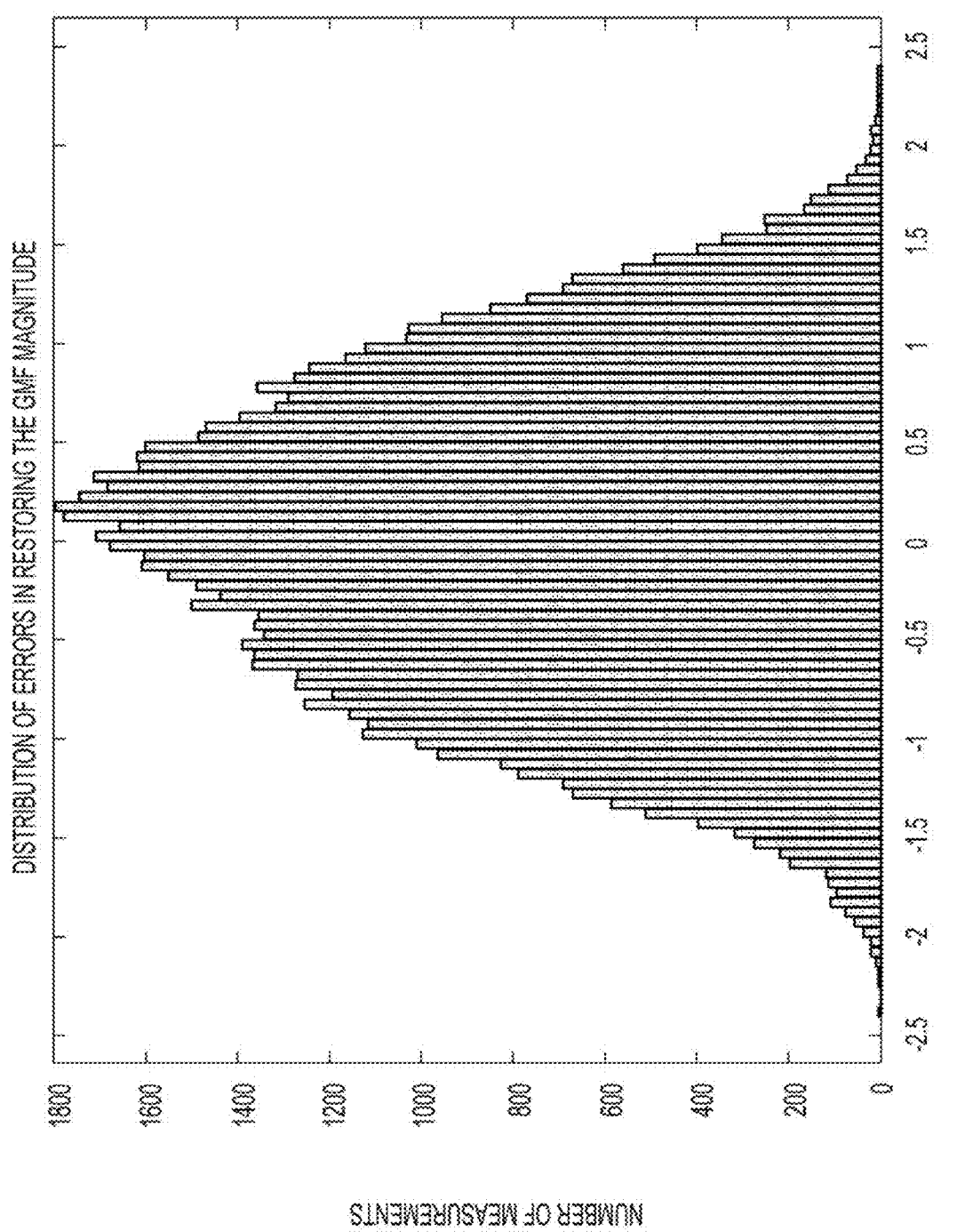
FIG. 13 illustrates an example distribution of errors in restoring example GMF magnitude.

FIG. 11 illustrates an example zoomed-in portion of the visualization illustrated in the example of FIG. 9. FIG. 12 illustrates example total magnitude of GMF along the route in the example of FIG. 9. Here, the value of total magnitude of GMF is taken directly from actual values of XYZ components from magnetic profiles. When there is a need to restore the values of the GMF back from the MXYZ colormap, the corresponding quantized values of XYZ are used. In this case, errors in restoring these values compared to the original values of the GMF prior to the described embedding process. For color palette size from the original example (264), the error in restoring GMF magnitude is determined as follows:

$X\_restored = MXYZ\_colormap(index,1) * 15 * QLevelX + Xmin - 1000;$ $Y\_restored = MXYZ\_colormap(index,2) * 15 * QLevelY + Ymin - 1000;$ $Z\_restored = MXYZ\_colormap(index,3) * 15 * QLevelZ + Zmin - 1000;$ $GMF\_restored = sqrt(X\_restored.\hat{\ }2 + Y\_restored.\hat{\ }2 + Z\_restored.\hat{\ }2);$ $deltaGMF = GMF\_restored - totGMF;$ As illustrated in the example of FIG. 13, the maximal deviation may be as follows:
max(deltaGMF)
ans=
2.3504

Figure 14:
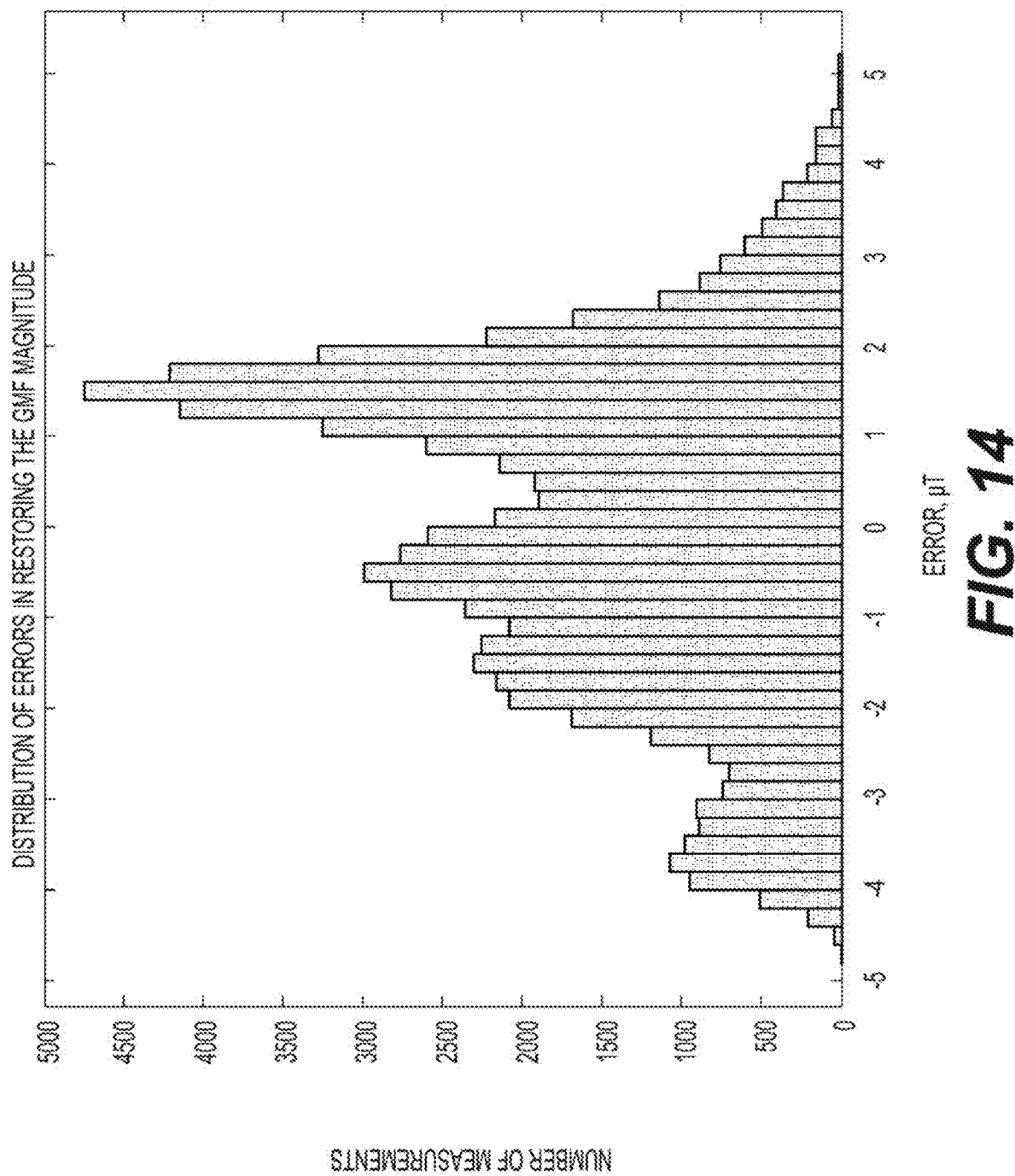
FIG. 14 illustrates another example distribution of errors in restoring example GMF magnitude.

As illustrated in the example of FIG. 14, in the case of smaller size of MXYZ colormap (94), the maximal deviation may be as follows:
max(deltaGMF)
ans=
5.0521

In particular embodiments, the quantization level 16 in each GMF component is enough to code the GMF data in visual form by pseudo coloring. The maximal length of color palette in this case will be 4096, but actual length in each case will be different depending on the variation of XYZ components in the given patch. To restore the original data, it may be advantageous to have the access to MXYZ colormap, to know the quantization level in X, Y, and Z and to know their minimal values. Thus, the magnetic data embedded in GeoTIFF in the form of MXYZ color palette via alpha channel may be protected from unauthorized access. Below, different quantization levels and restoring error associated with each level are discussed. At the time of embedding, the system may determine the best or optimal quantization level with the least restoration error using machine learning or by going through each at that time and selecting the one with the least error. The quantization may be done based on the expected value of restoring error, and each time the QLevel may be different.

Figure 15:
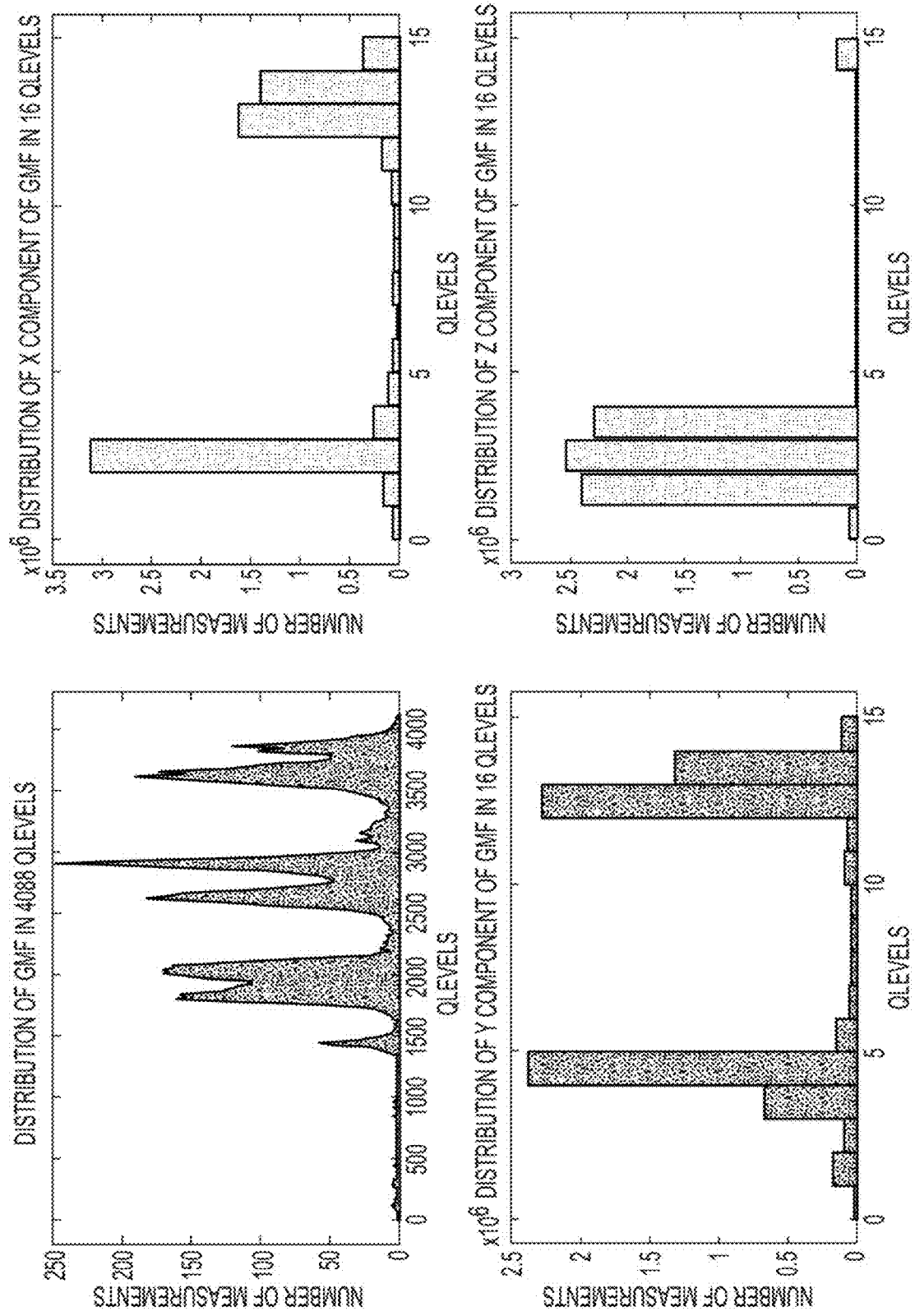
FIG. 15 illustrates example distributions among example quantization levels in example components of an example magnetic profile.

Above, it was assumed that the size of the MXYZ color palette is fixed. In particular embodiments, it is set to be equal to 4096, or $2^4$ quantization levels (QLevels) in each XYZ component (RGB channels). Particular embodiments may vary minimum and maximum levels in each XYZ component and fill the whole palette uniformly. FIG. 15 illustrates example distribution among 16 example Qlevels in each of the X, Y, and Z components for an example magnetic profile. This distribution is non-uniform. There is missing data between approximately five to 10 QLevels in all three components. In the Z-component, the data is absent, but in the X and Y components, there is a small variation in ranges five to 10.

Figure 16:
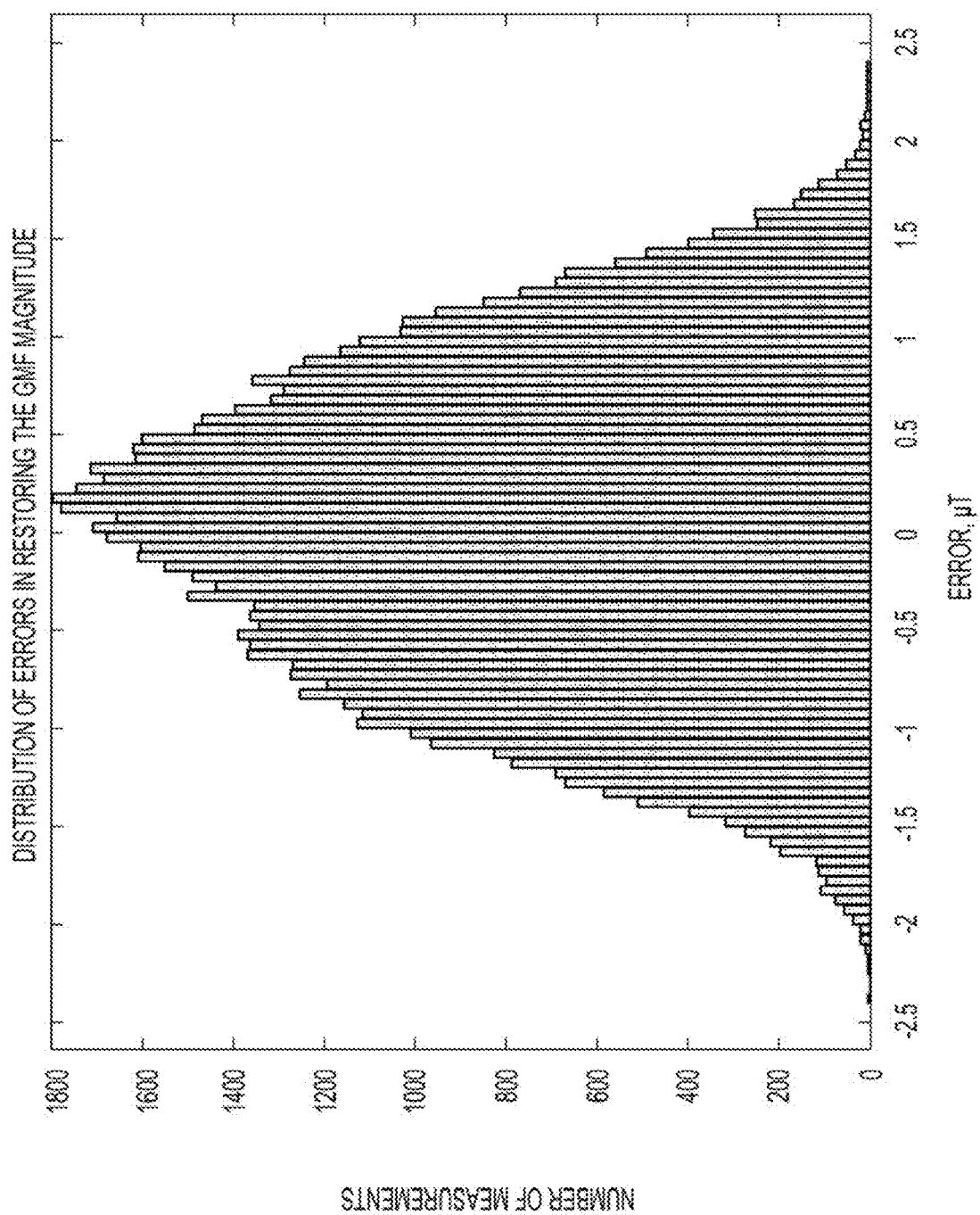
FIG. 16 illustrates another example distribution of errors in restoring example GMF magnitude.

In particular embodiments, the number of Qlevels is 16. Values of QLevels, total size of MXYZ color palette and error of restoring total magnitude of GMF are as follows and as illustrated in the example of FIG. 16:

| X | Y | Z | MXYZ colormap | Error of restoring |
|---|---|---|---|---|
| 3.2841 | 3.1429 | 2.8184 | 264 | 2.3504 |

Figure 17:
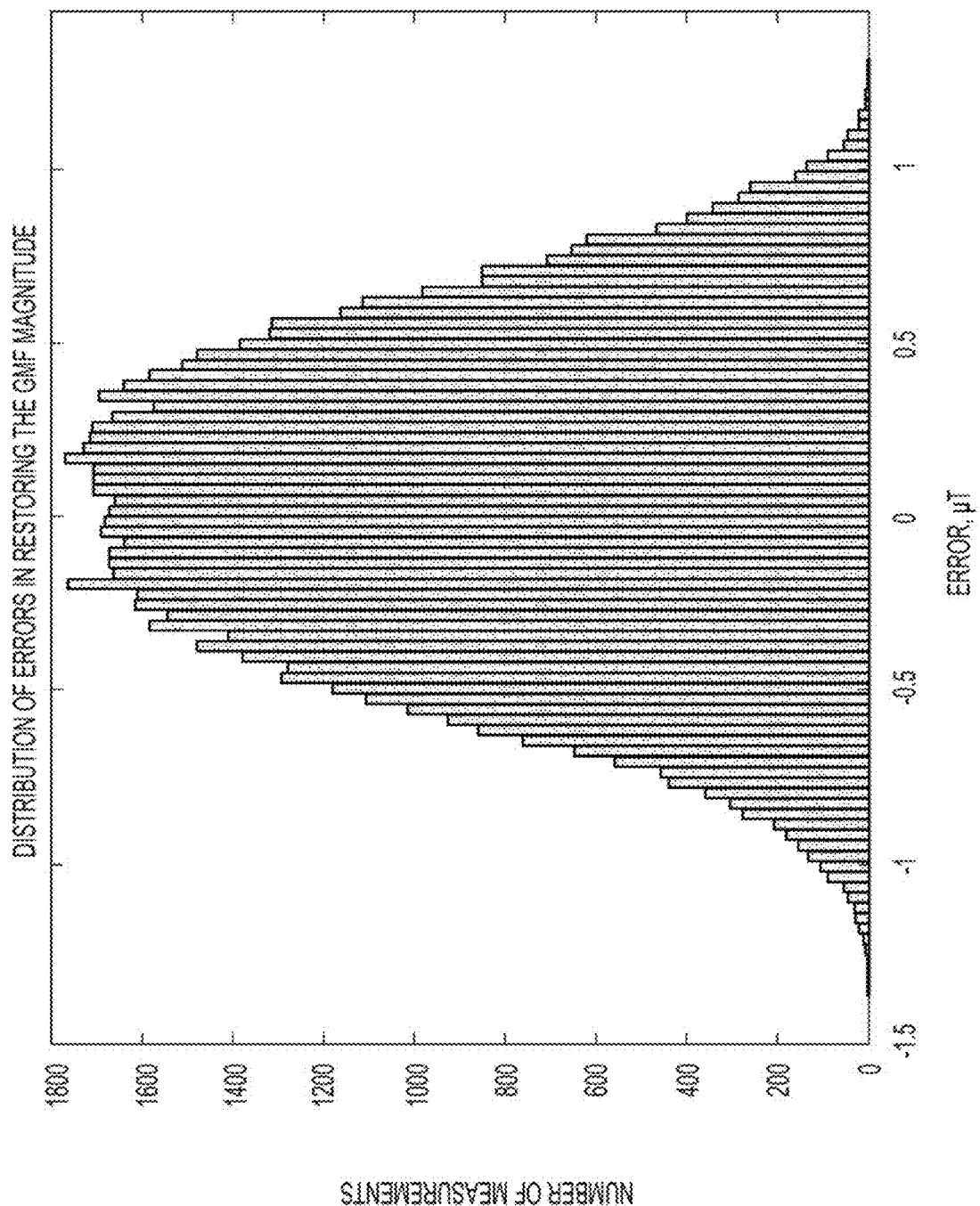
FIG. 17 illustrates another example distribution of errors in restoring example GMF magnitude.

In particular embodiments, the number of Qlevels in each X, Y, and Z component is 32. The length of the MXYZ colormap will increase, as illustrated in the example of FIG. 17. Values of QLevels and total size of MXYZ color palette in this case are as follows:

| X | Y | Z | MXYZ colormap | Error of restoring |
|---|---|---|---|---|
| 1.5891 | 1.5208 | 1.3637 | 762 | 1.2989 |

Figure 18:
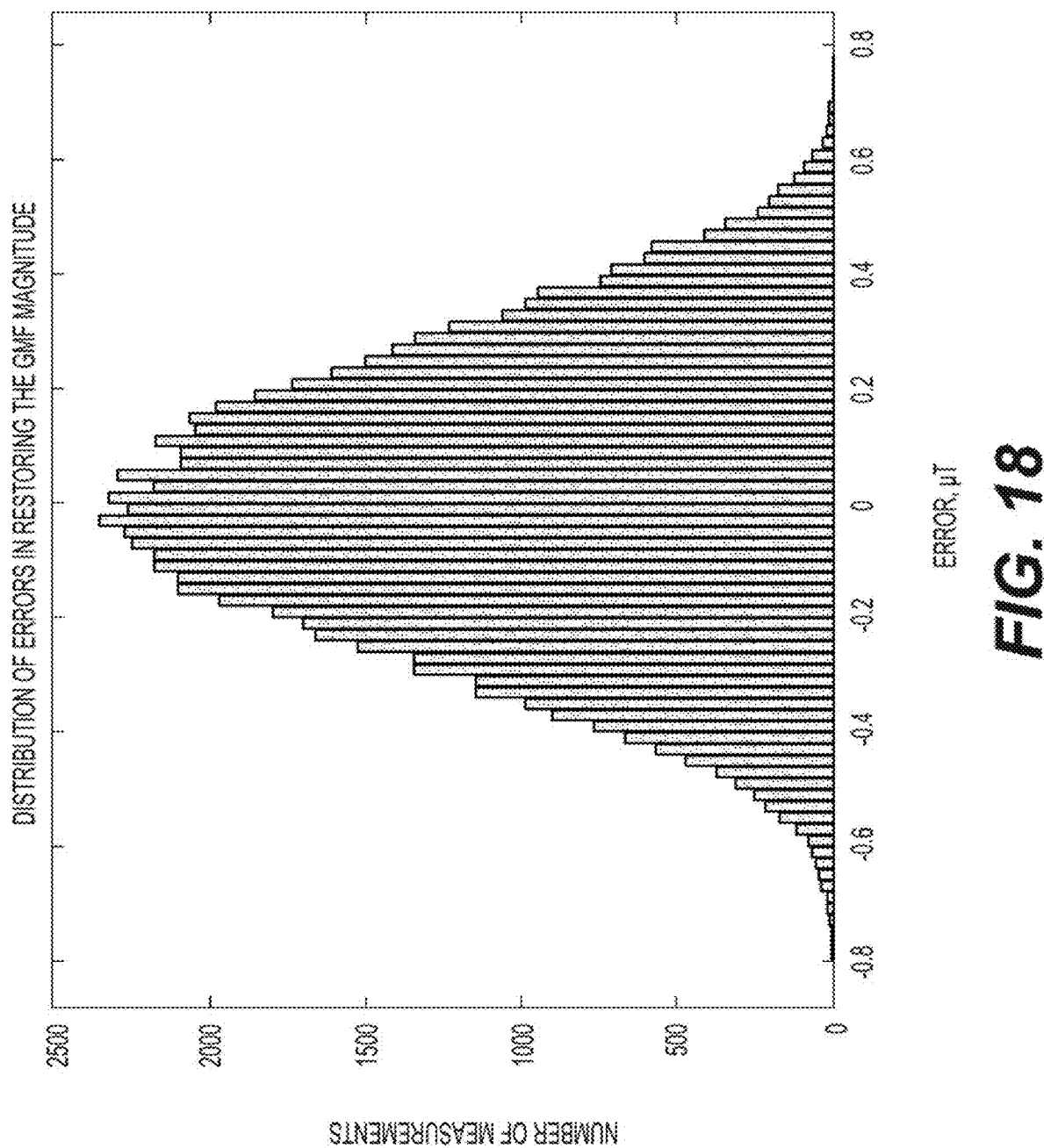
FIG. 18 illustrates another example distribution of errors in restoring example GMF magnitude.

In particular embodiments, the number of Qlevels in each X, Y, and Z component is 64, as illustrated in the example of FIG. 18. Values of QLevels and total size of MXYZ color palette in this case are as follows:

| X | Y | Z | MXYZ colormap | Error of restoring |
|---|---|---|---|---|
| 0.7819 | 0.7483 | 0.671 | 2585 | 0.7621 |

Figure 19:
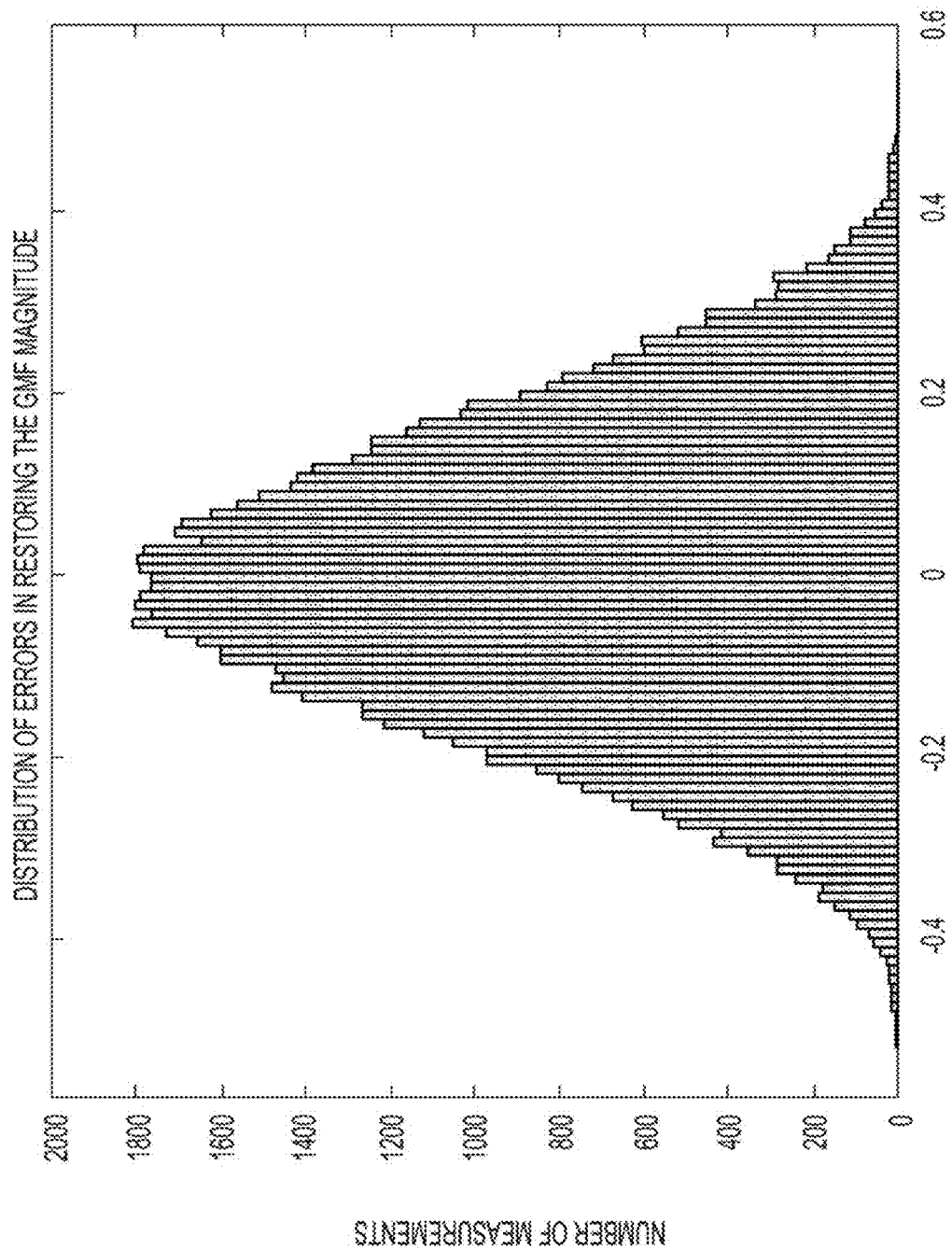
FIG. 19 illustrates another example distribution of errors in restoring example GMF magnitude.

In particular embodiments, the number of Qlevels in each X, Y, and Z component is 128, as illustrated in the example of FIG. 19. Values of QLevels and total size of MXYZ color palette in this case are as follows:

| X | Y | Z | MXYZ colormap | Error of restoring |
|---|---|---|---|---|
| 0.3879 | 0.3712 | 0.3329 | 5520 | 0.5466 |

Figure 20:
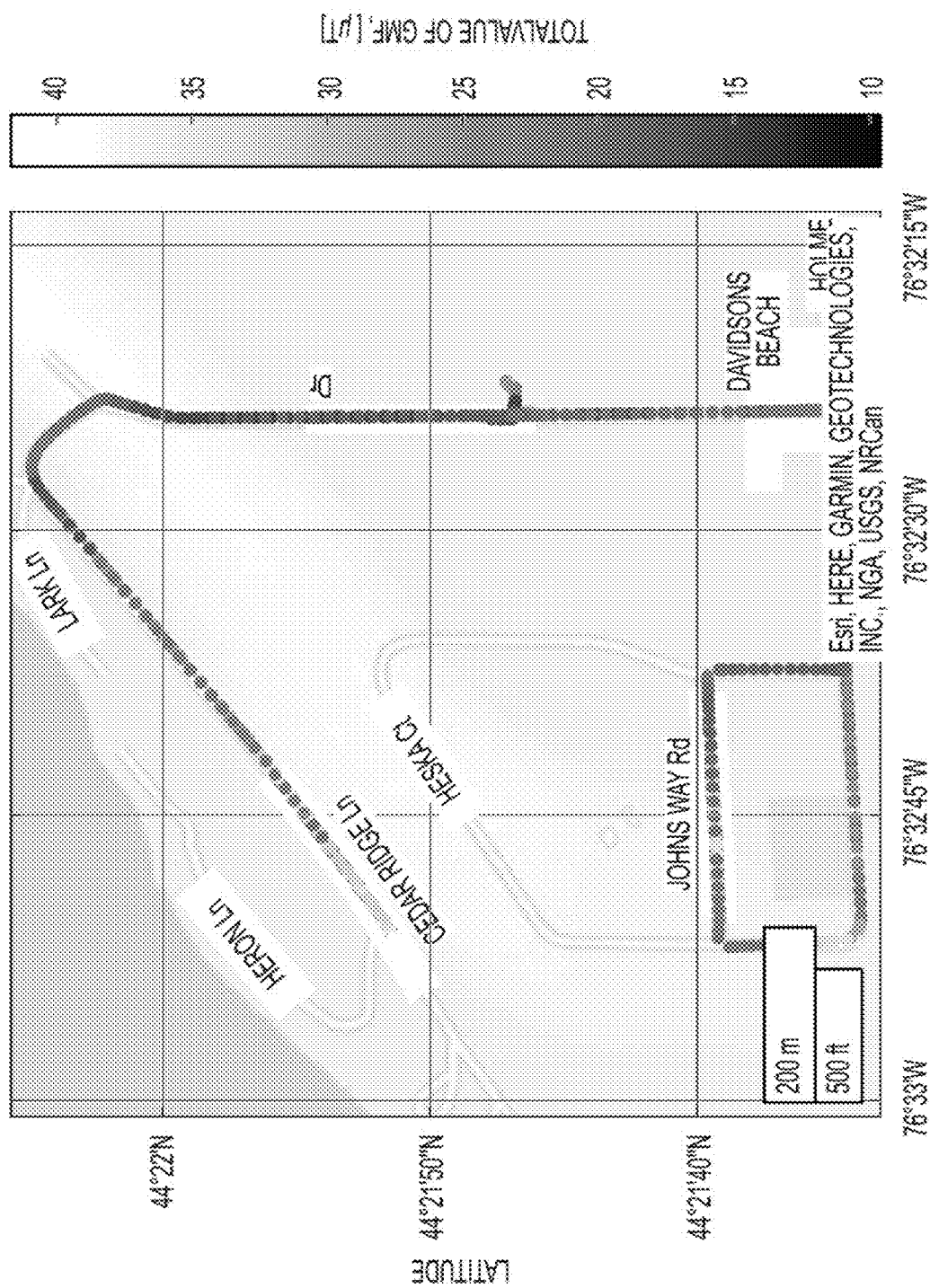
FIG. 20 provides an example visualization of the total value of an example magnetic field in an example area.

In particular embodiments, increasing the number of QLevels uniformly separated among XYZ components of GMF does not substantially provide the corresponding increase in the accuracy of restoring the image. First, in particular embodiments, the data for each separate XYZ component are patched together. The results are four patches (patch_ID_calibr, patch_ID_Mx, patch_ID_My, and patch_ID_Mz) and array trajectory_calibr containing eight columns (i, j—indexes of array, total GMF, Mx, My, Mz, latitude, and longitude). FIG. 20 illustrates total GMF scattered along the trajectory specified by latitude and longitude.

Figure 21:
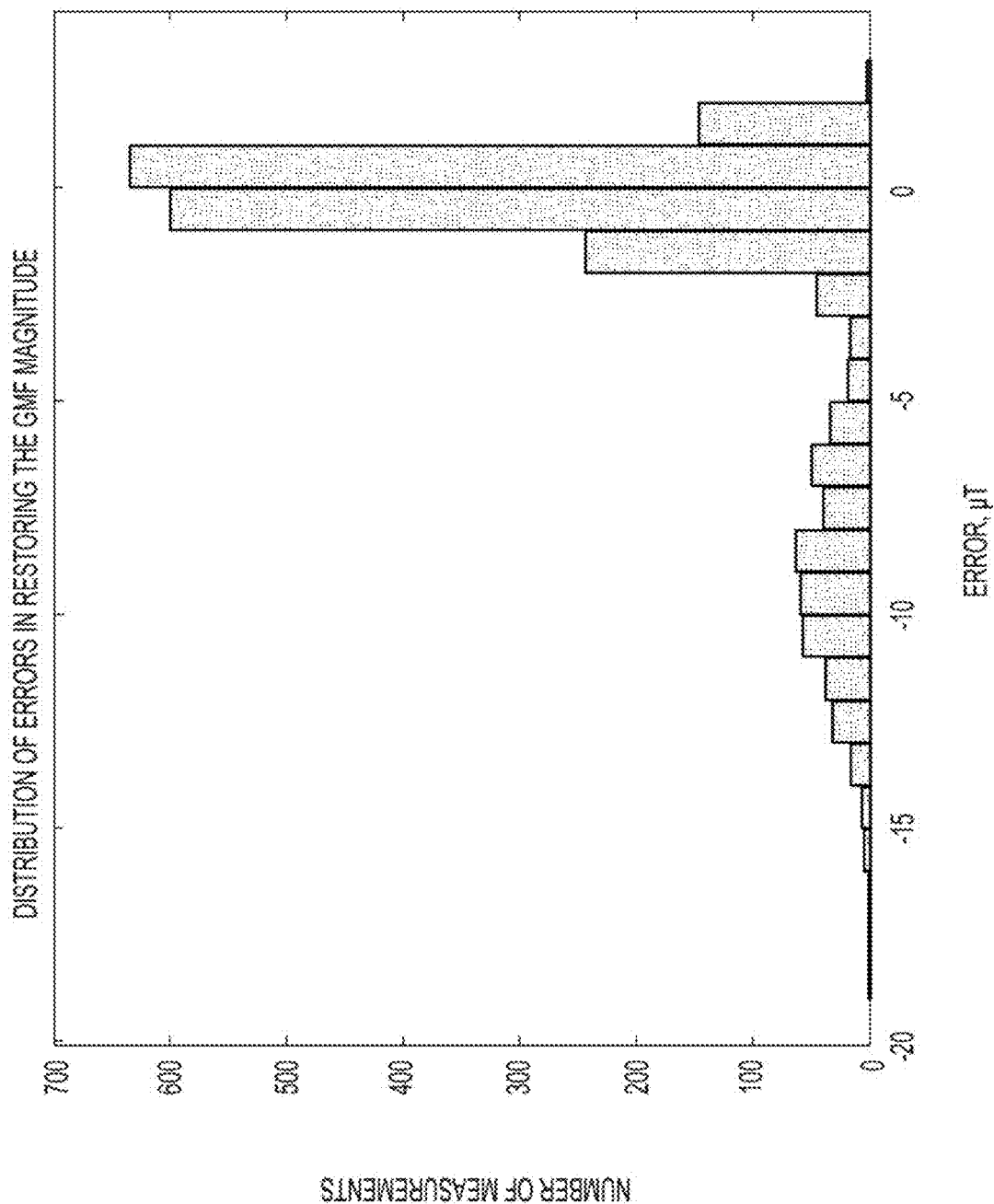
FIG. 21 illustrates another example distribution of errors in restoring example GMF magnitude.

Second, the number of QLevels=31 is selected with uniform distribution and the quantization error is checked, as illustrated in the example of FIG. 21.

| QX | QY | QZ | MXYZ Colormap (length) | QError (abs. value) |
|---|---|---|---|---|
| 1.6002 | 3.6339 | 1.4073 | 1141 | 18.6199 |

The example of QError distribution in the example of FIG. 21 shows there is significant non-uniform behavior of error. In particular embodiments, this is due to the non-equal values of QLevels in XYZ (see QY in the table above). The range of change in the Y component of GMF is twice as large as in the X and Z components, as follows:

| deltaX | 49.6068 |
|---|---|
| deltaY | 112.6503 |
| deltaZ | 43.6254 |

Figure 22:
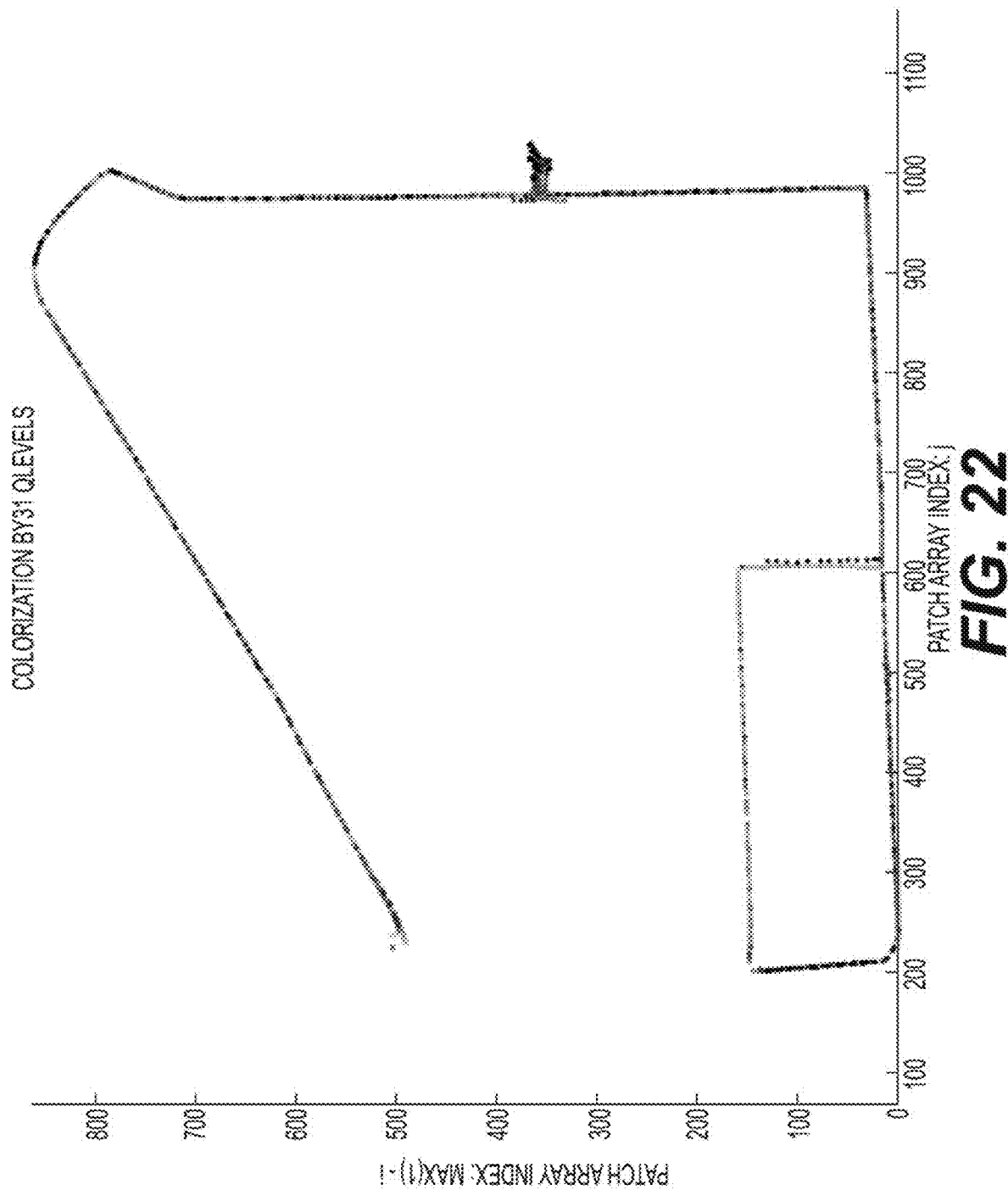
FIG. 22 illustrates an example colorization of GMF data for a sample patch.
Figure 23:
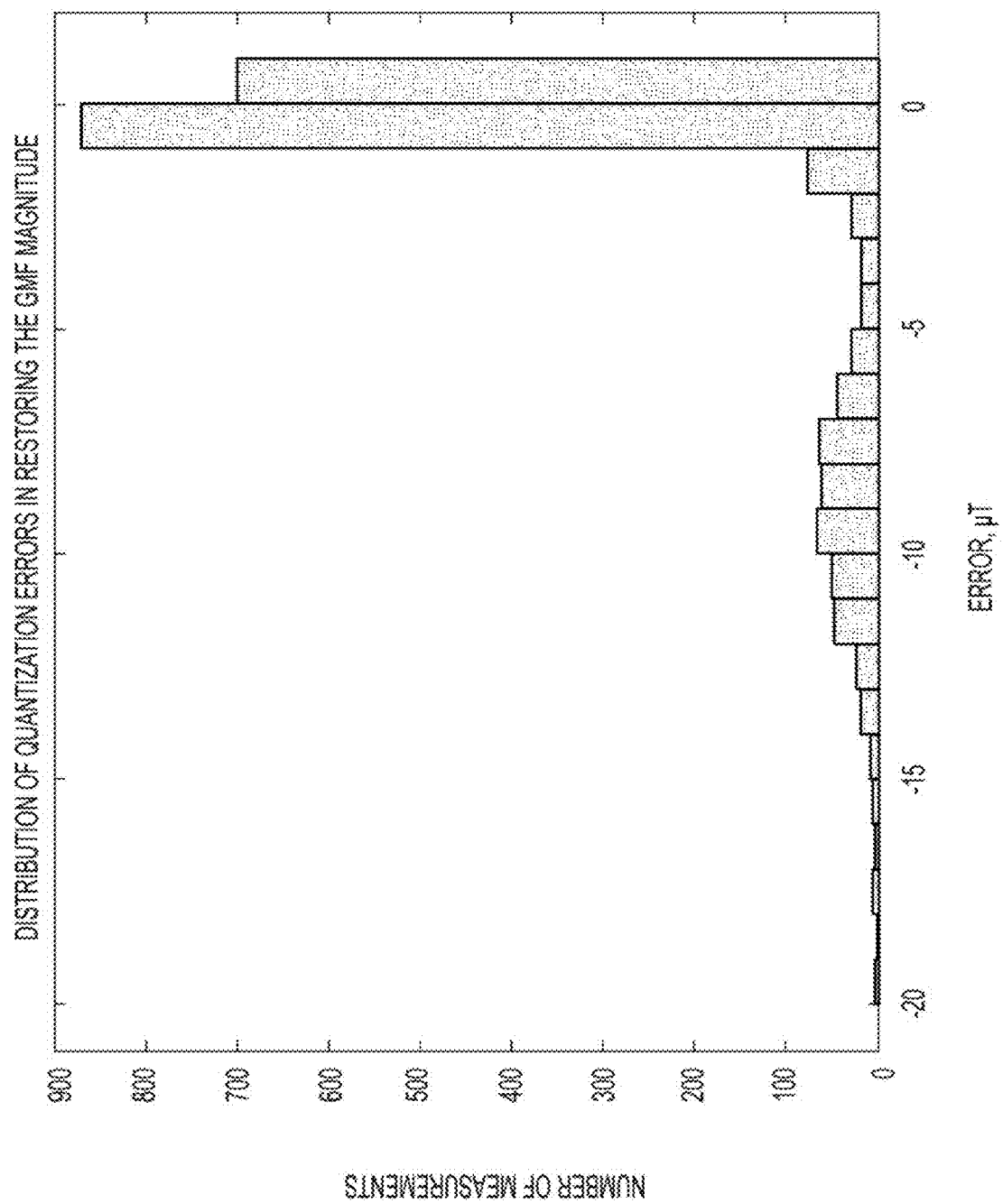
FIG. 23 illustrates another example distribution of errors in restoring example GMF magnitude.

FIG. 22 is an example visualization of example GMF data for an example patch with 31 Qlevels in each channel with uniform quantization. Third, the data are quantized with a variable number of QLevels in each channel. In particular embodiments, QLevels are selected in such a way as to get change in each component of approximately 1 $\mu T$. As can be seen in the example of FIG. 23, non-Gaussian behavior of the quantized error distribution is still present compared with the previous results (i.e. the accuracy is not improved when quantization levels are increased). And, as it can be seen in the chart below, the quantization error is even increasing.

| QX | NX | QY | NY | QZ | NZ | MXYZ Colormap (length) | QError (abs. value) |
|---|---|---|---|---|---|---|---|
| 1.0124 | 49 | 1.0058 | 112 | 1.0145 | 43 | 1614 | 19.2510 |

Fourth, a source of the problem is identified. Returning to the file where there is patching of several trajectories into a map and checking the code:

```
for m=2:length(lon_value_all)
i=round((A-lat_value_all(m))/10e-6);
j=round((lon_value_all(m)-D)/10e-6);
patch_ID_calibr(i,j)=patch_ID_calibr(i,j)+patch_K_calibr(i,j)*(totM_calibr_value_all(m)
-patch_ID_calibr(i,j));
patch_ID_Mx(i,j)=patch_ID_Mx(i,j)+patch_K_calibr(i,j)*(Mx(m)-patch_ID_Mx(i,j));
patch_ID_My(i,j)=patch_ID_My(i,j)+patch_K_calibr(i,j)*(My(m)-patch_ID_My(i,j));
patch_ID_Mz(i,j)=patch_ID_Mz(i,j)+patch_K_calibr(i,j)*(Mz(m)-patch_ID_Mz(i,j));
patch_N_calibr(i,j)= patch_N_calibr(i,j)+1;
patch_K_calibr(i,j)=1/(patch_N_calibr(i,j)+1);
if (i==trajectory_calibr(kk,1))&&(j==trajectory_calibr(kk,2))
trajectory_calibr(kk,3)= patch_ID_calibr(i,j);
    trajectory_calibr(kk,4)= patch_ID_Mx(i,j);
trajectory_calibr(kk,5)= patch_ID_My(i,j);
    trajectory_calibr(kk,6)= patch_ID_Mz(i,j);
    trajectory_calibr(kk,7)= lat_value_all(m);
trajectory_calibr(kk,8)= lon_value_all(m);
else
kk=kk+1;
trajectory_calibr(kk,1)=i;
trajectory_calibr(kk,2)=j;
    trajectory_calibr(kk,3)= patch_ID_calibr(i,j);
    trajectory_calibr(kk,4)= patch_ID_Mx(i,j);
    trajectory_calibr(kk,5)= patch_ID_My(i,j);
    trajectory_calibr(kk,6)= patch_ID_Mz(i,j);
```

```
trajectory_calibr(kk,7)= lat_value_all(m);
trajectory_calibr(kk,8)= lon_value_all(m);
end
end
```

Figure 24:
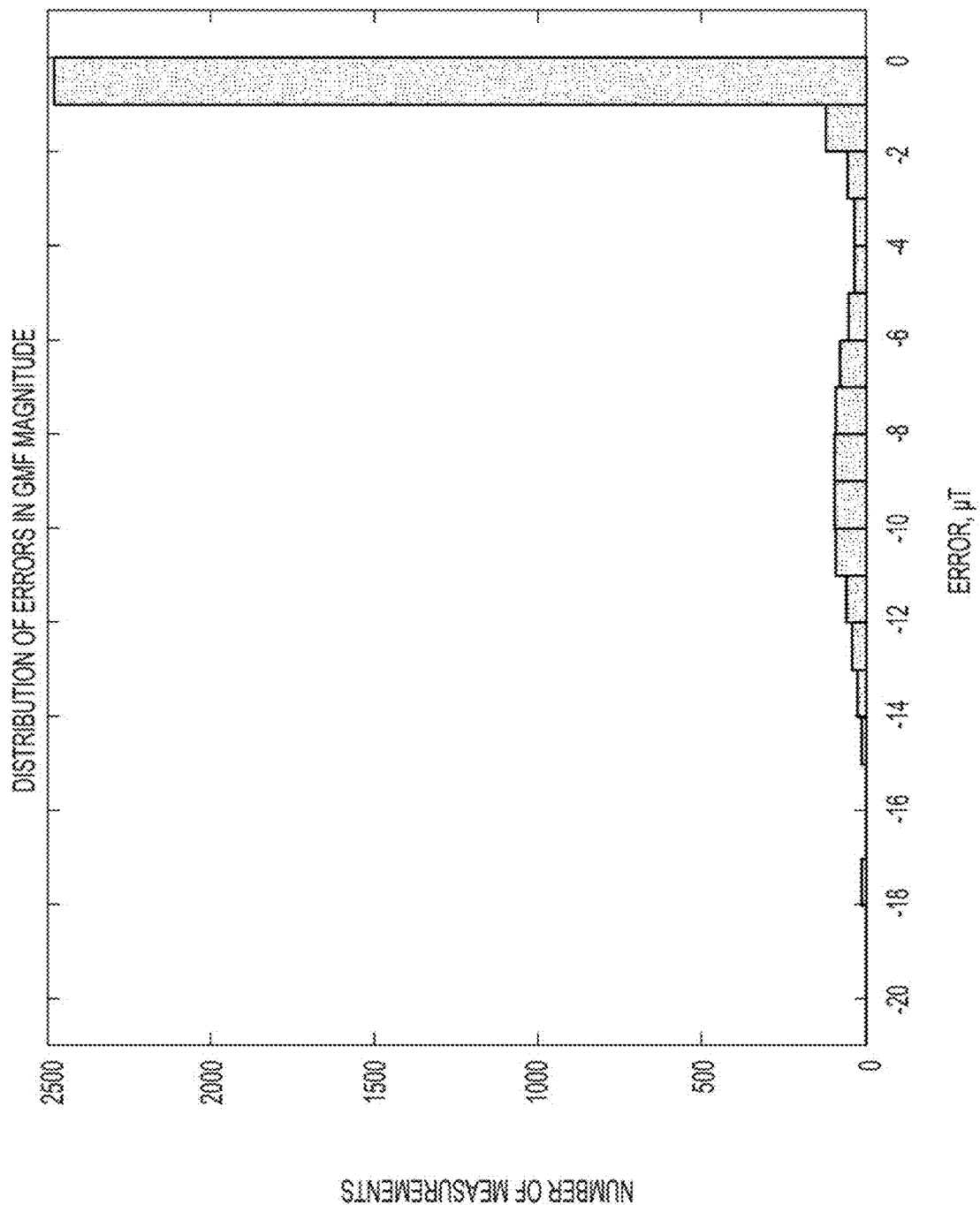
FIG. 24 illustrates another example distribution of errors in restoring example GMF magnitude.
Figure 25:
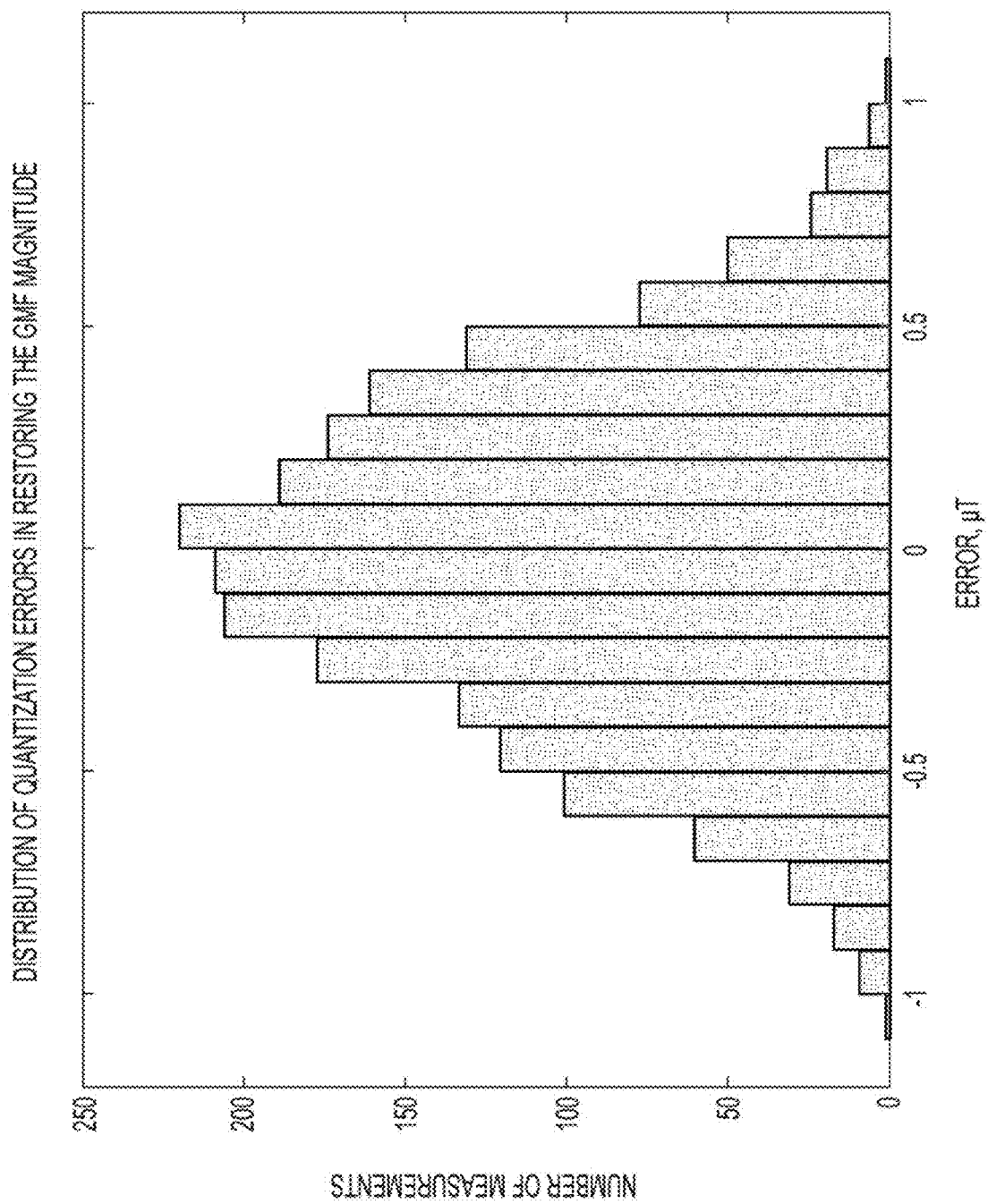
FIG. 25 illustrates another example distribution of errors in restoring example GMF magnitude.

As can be seen in the example of FIG. 24, the error follows the quantization error. This means that the problem is in the procedure of patching and not in the quantization itself. If it is assumed that the data of three components XYZ is more reliable (and not the written data about total GMF in patch_ID_calibr), then the results will be as illustrated in the example of FIG. 25. The chart below demonstrates that the quantization error decreased significantly.

| QX | NX | QY | NY | QZ | NZ | MXYZ Colormap (length) | QError (abs. value) |
|---|---|---|---|---|---|---|---|
| 1.0124 | 49 | 1.0058 | 112 | 1.0145 | 43 | 1614 | 1.0523 |

Figure 26:
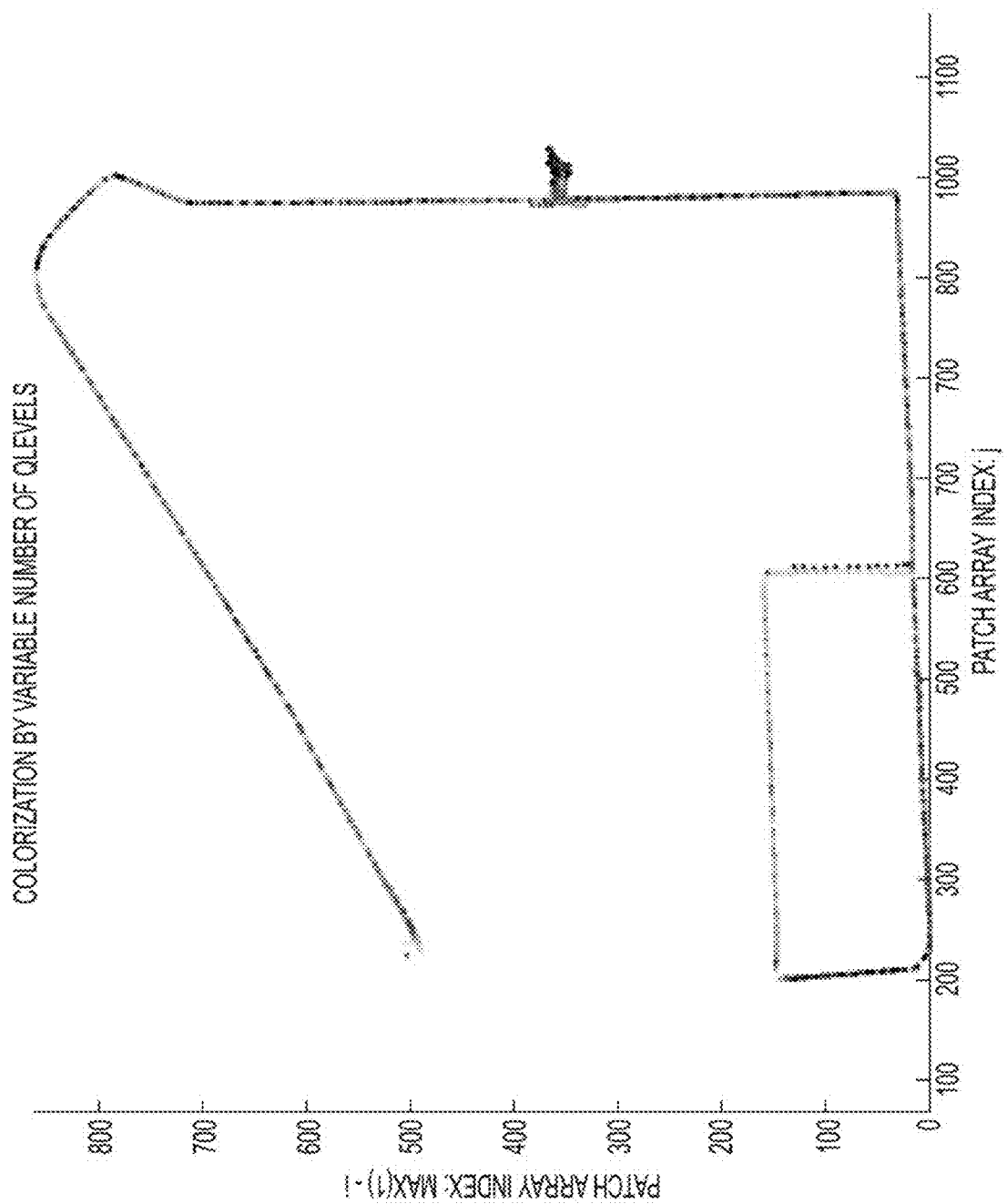
FIG. 26 illustrates example colorization of GMF data for a specific patch.
Figure 27:
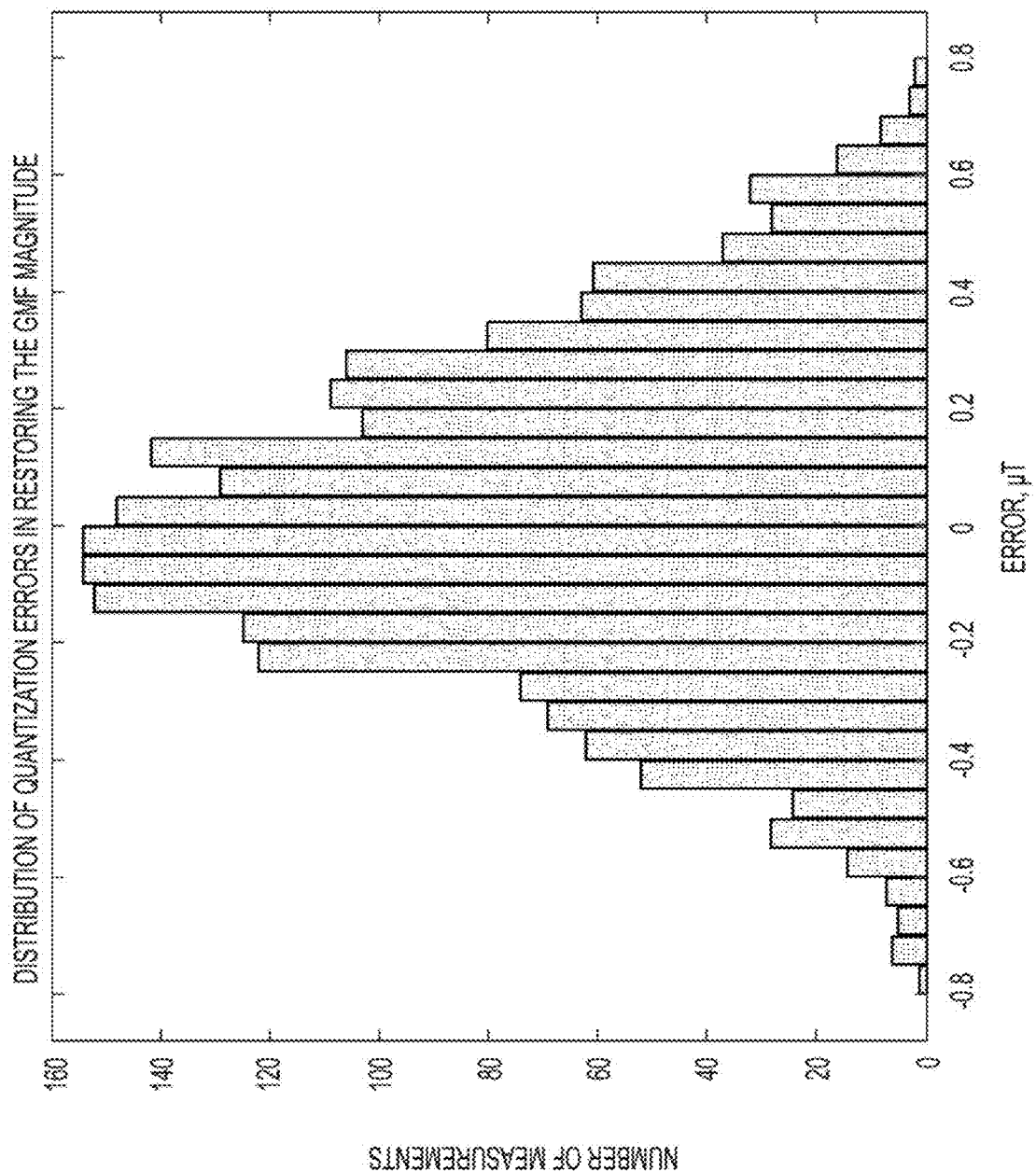
FIG. 27 illustrates another example distribution of errors in restoring example GMF magnitude.

FIG. 26 illustrates colorization of a sample GMF data for a patch with different number of Qlevels in each channel with uniform quantization. In particular embodiments, the QLevels can be further decreased to reduce variation in each component to below 1.0 µT. FIG. 27 illustrates distribution of quantization errors in restoring GMF magnitude. As we can see from the figure, error distribution has a Gaussian normal form. The chart below illustrates the decreased error value for the selected Qlevels for each channel.

| QX | NX | QY | NY | QZ | NZ | MXYZ Colormap (length) | QError (abs. value) |
|---|---|---|---|---|---|---|---|
| 0.5062 | 98 | 0.5029 | 224 | 0.5073 | 86 | 1900 | 0.7716 |

Figure 28:
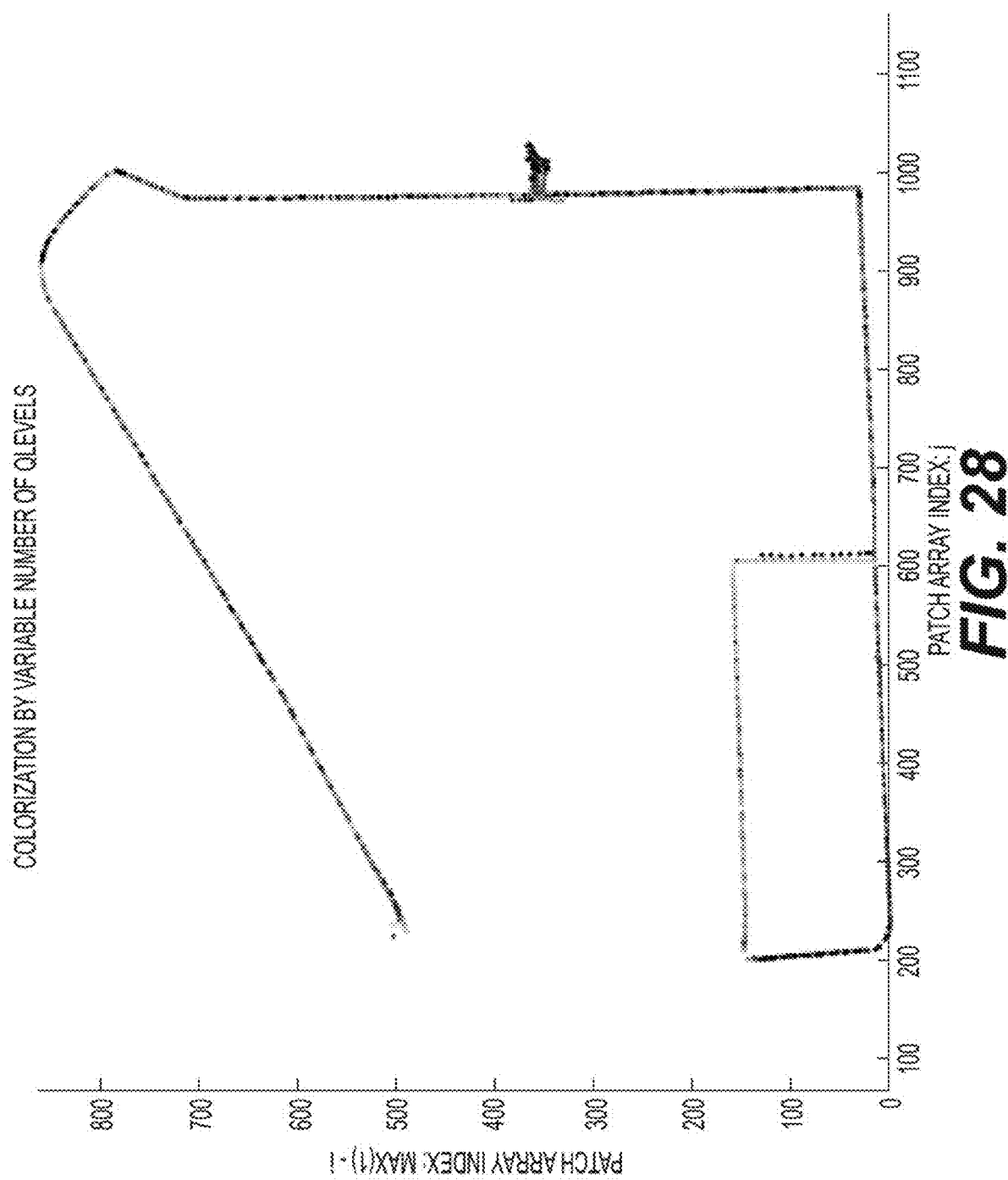
FIG. 28 illustrates example colorization of GMF data for a specific patch.

FIG. 28 illustrates colorization of GMF data for a patch with different number of Qlevels in each channel with uniform quantization.

In particular embodiments, in the case of missing the step of converting the raw readings of the XYZ components from a body-fixed frame into an ENU frame, there may be significant differences between the magnitude of GMF calculated from raw readings of XYZ components (which may be designated as rawGMF) and magnitude of GMF calculated from patched together readings of XYZ components (which may be designated as patchedGMF). For a trajectory, the XYZ components are assigned and then rawGMF is calculated as follows:

$$rawGMF = \sqrt{X^2 + Y^2 + Z^2} \quad (1)$$

Then rawGMF is patched together by data-fusion algorithm that takes into account a degree of trust to any new measurements j in the same point i.

$$rawGMF_i = rawGMF_i + k_i(rawGMF_i(j) - rawGMF_i); \quad (2)$$

$$k_i = \frac{1}{N+1},$$

where k is a fusion coefficient and N is the number of repeating measurements at point i.

In particular embodiments, to use three components of GMF in mapping (embedding GeoTIFF) and navigation, XYZ components of GMF may be converted from a body-fixed frame into a reference frame (e.g. ENU) and then patched into a map. In particular embodiments, averaging by separate components with different orientation of a device (e.g. a mobile phone) in the same point will provide errors in total GMF (approximately 33 µT in the above experiment). When horizontal and vertical components of GMF are used, raw XYZ data may have to be at least leveled. When total magnetic field is used for patching, preliminary conversion from body to reference frame (e.g. ENU) may be unnecessary.

To realize the representation of GMF in the form of total magnitude, inclination, and declination, it may be beneficial to represent the XYZ components (initially measured by magnetometers) in the reference coordinate system. That is, from a device (e.g. a mobile phone) XYZ components (in body-fixed coordinate system) the data may be converted into the ENU frame. Another conversion may then ne performed to represent this in FDI form (F total, Declination, and Inclination). Then the data may be quantized for representation in a GeoTIFF in colormap. It may be advantageous to have the total value of GMF magnitude F directly incorporated into colormap. If navigation by all three components of GMF is desired, then the XYZ components may be restored in the ENU frame, since the sensors of a device (e.g. a mobile phone) provide the measurements in XYZ. If we have representation of GMF directly in the form of XYZ components, then the following conversions may be used: XYZ components (in body-fixed coordinate system) into an ENU frame and then into quantized representation in Geo-TIFF in colormap.

Figure 29:
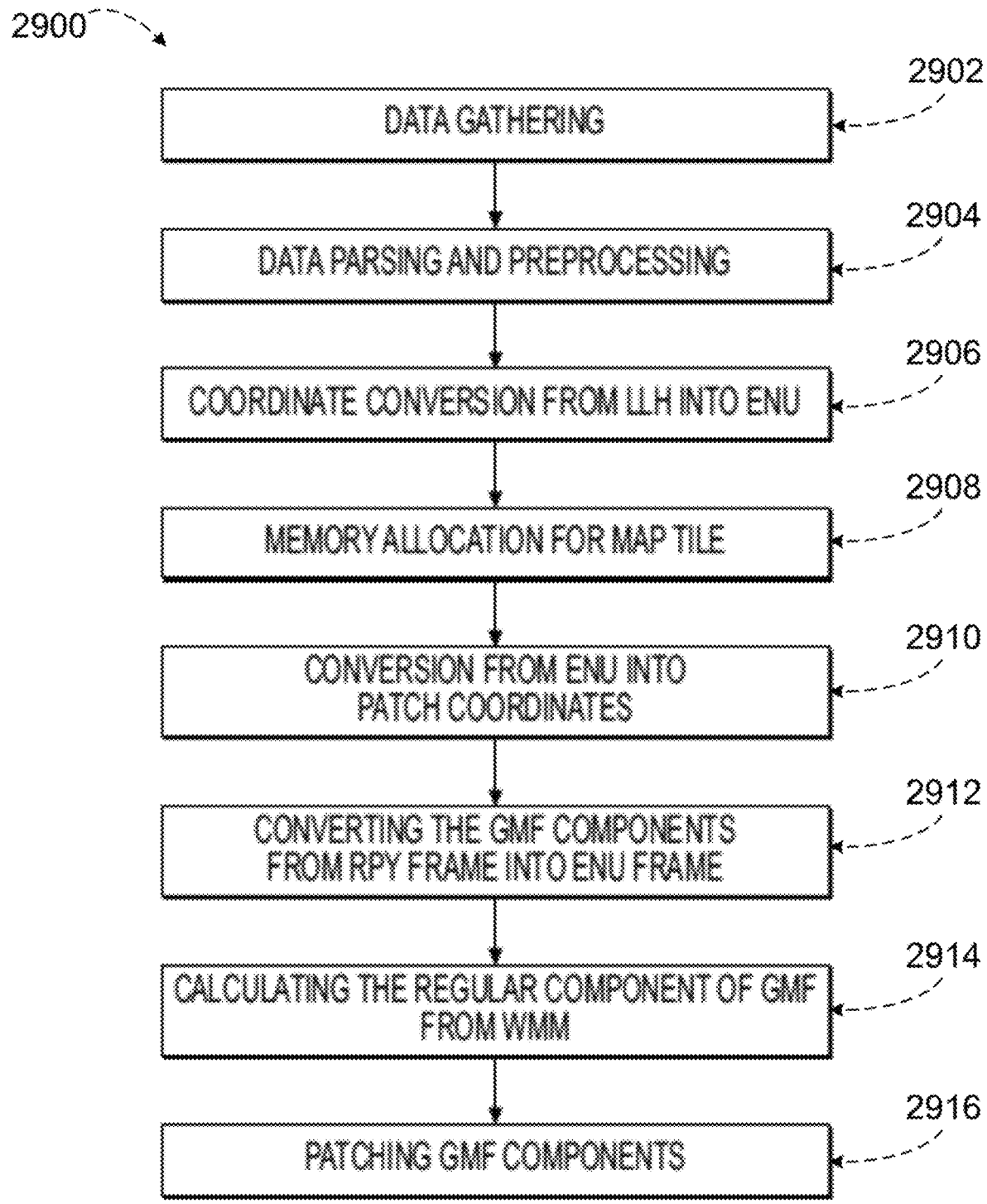
FIG. 29 illustrates an example method for processing raw magnetic readings and patching them together to create a magnetic map that may be embedded into files that contain georeferencing information.

FIG. 29 illustrates an example method 2900 for processing raw magnetic readings and patching them together to create a magnetic map (such as, e.g., a GMF map) that may be embedded into files that contain georeferencing information (such as, e.g., GeoTIFF files). Although this disclosure describes and illustrates a particular method for processing raw magnetic readings and patching them together to create a magnetic map, this disclosure contemplates any suitable method for processing raw magnetic readings and patching them together to create a magnetic map, which may include any suitable steps (which may where appropriate include all, some, or none of the particular steps described or illustrated herein) occurring in any suitable order. Moreover, although this disclosure describes and illustrates particular components, devices, or systems carrying out particular steps of a particular method for processing raw magnetic readings and patching them together to create a magnetic map, this disclosure contemplates any suitable combination of any suitable components, devices, or systems carrying out any suitable steps of any suitable method for processing raw magnetic readings and patching them together to create a magnetic map.

Method 2900 begins at step 2902, where data are accumulated at one or more servers. One or more magnetic readings from one or more users are accumulated on one or more servers and saved into one or more corresponding folders. The filename (or name) of a file containing a set of magnetic readings may indicate a corresponding map tile for the magnetic readings (e.g. "N50E30" corresponds to a 1°×1° map tile at northern latitude 50° and eastern longitude 30°). In particular embodiments, output of step 2902 includes recording files from magnetic-navigation devices accumulated at regional servers.

At step 2904, the data are pre-processed and parsed. In particular embodiments, output of step 2904 includes magnetic profiles presented in a particular, pre-defined format after parsing and pre-processing. The statistical pre-processing is performed before map construction and may include the following tasks:
- Checking whether the data are valid, with satisfied localization, and can be used for map construction directly, or the data contain outliers or other artefacts.
- If the data include outliers, then removing them.
- If the data include artefacts (e.g. drops or jumps (e.g. bounds or leaps)), then making corresponding corrections.
- Smoothing the remaining data with a filter (e.g. median, moving average, etc.).

After the data are parsed, the following values may be obtained:
- Timestamp—contains year, month, day, hours, minutes and seconds of each samples in the made recordings.
  Example: 18 Oct. 2020 07:51:18.239
- Three components of acceleration in body frame (Roll-Pitch-Yaw) normalized to acceleration of gravity force g (unitless)
  Example: accelUserX_g_, accelUserY_g_, accelUserZ_g_
- Three components of angular velocities in body frame (Roll-Pitch-Yaw) obtained from gyroscopes (in rad/sec)
  Example: gyroX_rad_s, gyroY_rad_s, gyroZ_rad_s_
- Attitude angles in body frame—Roll, Pitch, Yaw (in rad)
  Example: Roll_rads_, Pitch_rads_, Yaw_rads_
- Coordinates in Latitude-Longitude-Height (LLH) frame if GNSS mode is available. Latitude and longitude may be given in degrees and height may be given in meters.
  Example: Lat, Long, Altitude_m_
- Ground speed (in m/sec) if GNSS mode is available
  Example: Speed_m_s_
- Course (in degrees) if GNSS mode is available
  Example: course_
- Horizontal and vertical accuracy of GNSS localization if available (in meters)
  Example: HorizontalAccuracy_m_, VerticalAccuracy_m_
- Magnetic heading (in degrees) from magnetometers
  Example: TrueHeading_
- Three components of total magnetic field (in μT) in roll-pitch-yaw (RPY) frame
  Example: calMagX_T_, calMagY_T_, calMagZ_T_
- Quaternions (internally calculated)
  Example: qX, qY, qZ, qW Although coordinates are described above as being in LLH, this disclosure contemplates coordinates of any suitable positioning system. For example, in addition or as an alternative to using the GCS to determine or indicate a position, particular embodiments may use dead reckoning. In such embodiments, latitude and longitude coordinates may be substantially disregarded and measurements determined by dead reckoning may be entered in an appropriate format (e.g. the dimensions of an indoor area in meters) instead. This may be advantageous in situations when reliable satellite positioning (e.g., with GPS) is unavailable.

Figure 30:
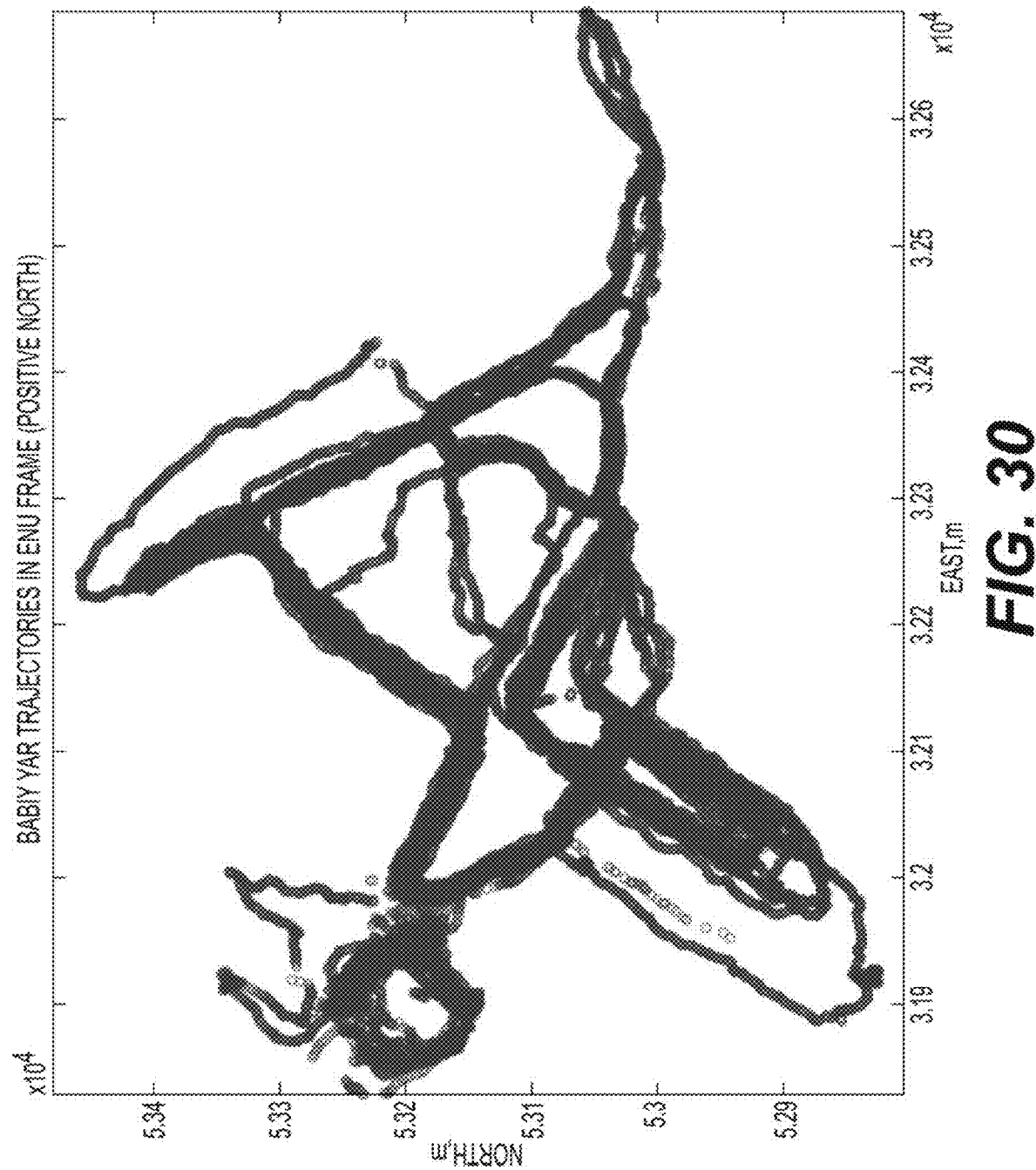
FIG. 30 provides an example visualization of GMF data for a specific patch in an ENU frame with north being positive.
Figure 31:
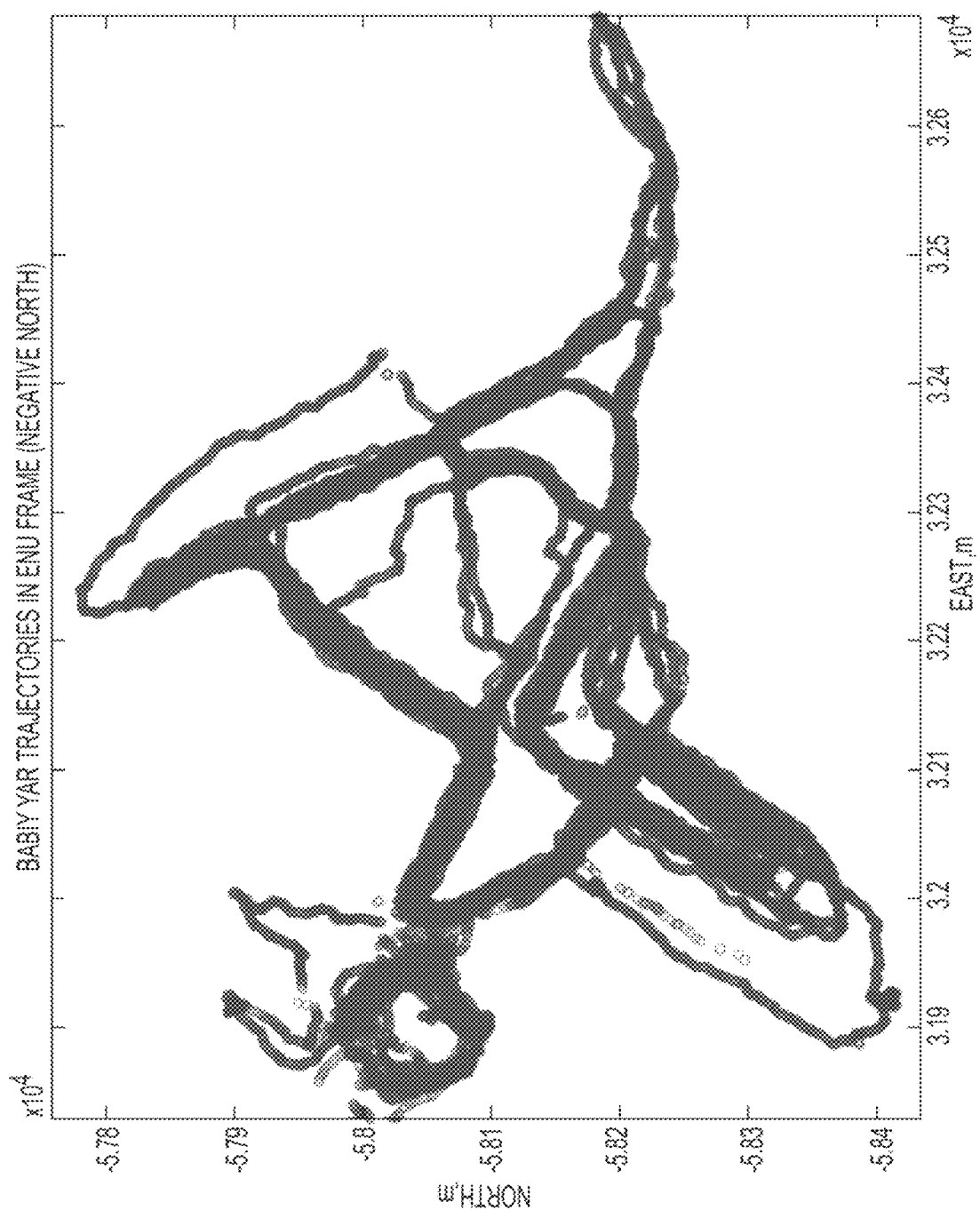
FIG. 31 provides an example visualization of GMF data for a specific patch in an ENU frame with north being negative.

At step 2906, LLH is converted to ENU (East-North-Up). In particular embodiments, output of step 2906 includes parsed coordinates within the specific map tile that they are related to. If the reference latitude of tile 1°×1° is taken at the bottom left corner for patch creation, then northern direction is positive. Coordinates of bottom left corner of patch are lat0=50; lon0=30. FIG. 30 visualizes trajectories for Babiy Yar district in Kyiv, Ukraine, in ENU with north being positive. If the reference latitude of tile 1°×1° is taken at the upper left corner, then northern direction is negative and more convenient for further conversion into patch coordinate system. Coordinates of upper left corner of patch are lat0=5 I; lon0=30. FIG. 31 visualizes trajectories for Babiy Yar district in ENU with north being negative. For further consideration, a positive direction of north may be selected. Output for step 2906 may include coordinates xEast, yNorth, zUp of all points in the magnetic trajectories. In particular embodiments, as an alternative to ENU, coordinates from step 2904 may be converted to a grid frame. A top left corner of the map may be chosen as a coordinate origin, and the map may (but need not) be oriented relative to true north. To take into account a correction for a true orientation of the map, a map angle (e.g. an angle between true north and a vertical axis of the grid frame of the map) may be introduced.

Figure 32:
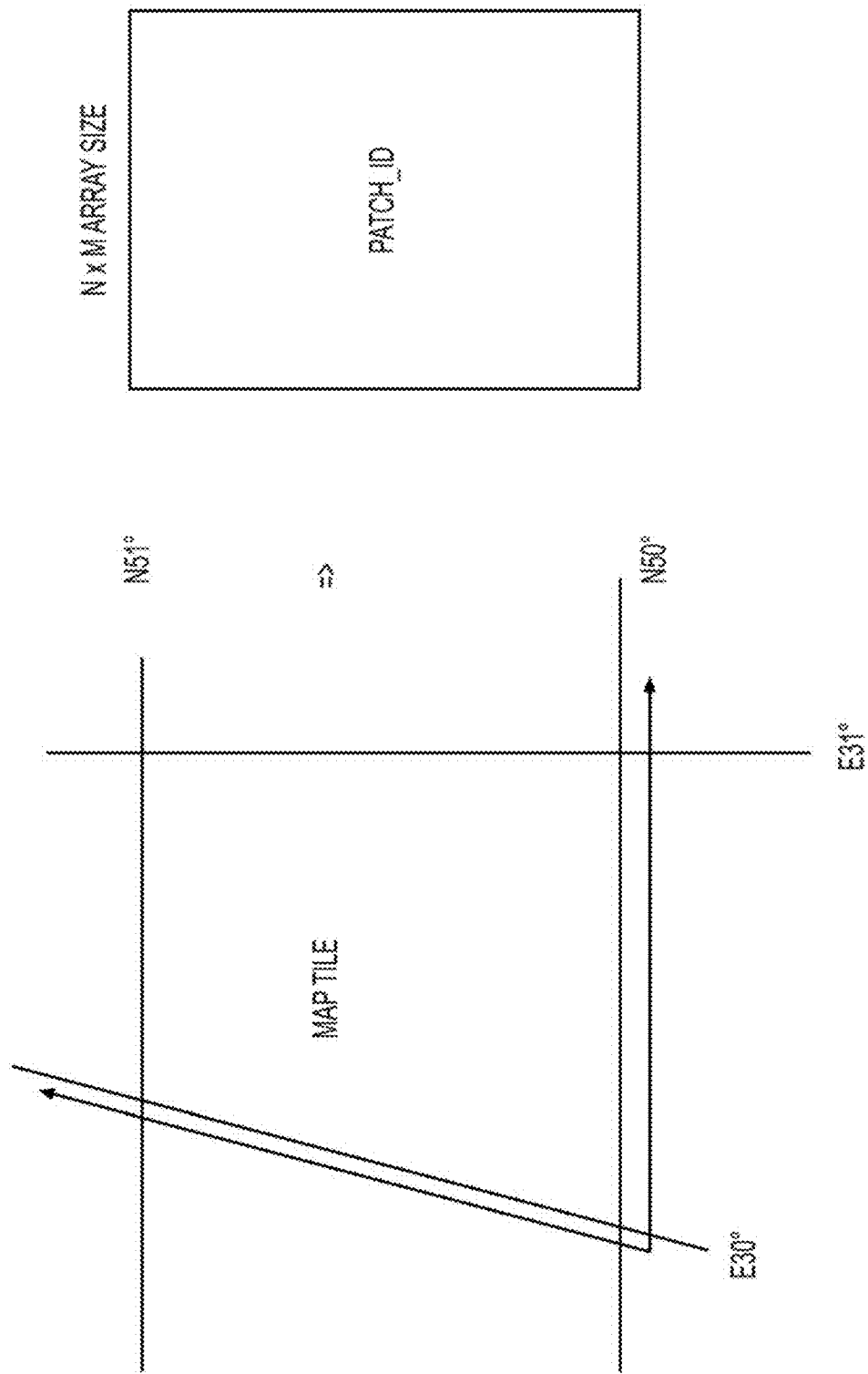
FIG. 32 illustrates an example map tile.

At step 2908, a patch is created. Here, to allocate memory for map, an empty sparse matrix may be used. In particular embodiments, a patch is an array and its size corresponds to the size of a map tile (in meters), with each element containing either a GMF value (if it is already measured) or being empty. The array size of corresponding patch is N by M elements where each element (cell) is 1 meter by 1 meter. The size is determined from previous step where the converted coordinates of bottom left and upper right corners were obtained in ENU in metric units. Output of this step is empty sparse matrix patch_ID. Here the map tile is 1 degree by 1 degree with ENU frame oriented as illustrated by way of example in FIG. 32. A map tile may also be referred to as a patched area, and vice versa, where appropriate. Output for step 2908 may include a matrix for patching together magnetic data. In particular embodiments, a magnetic map may be represented by a regular matrix instead of a sparse matrix. In such embodiments, an additional coordinate transformation (e.g. as in step 2910 below) may be unnecessary and (e.g. at step 2912 below) a coordinate transformation from RPY may be directly performed into a grid frame.

At step 2910, the ENU frame is converted to patch/array coordinates. The conversion may be done by rounding xEast and yNorth coordinates and reversing the y axis in order to avoid the mirrored image of trajectories. Output of step 2910 may include coordinates of magnetic trajectories in the patch in terms of its rows and columns I and J.

At step 2912, GMF components are converted from the RPY (body-fixed) frame to the ENU frame. This conversion may be required in order to align three components of GMF in the horizon and then calculate the horizontal and vertical components of total GMF. It may be done using the quaternions. Output of step 2912 may include a total value of GMF and vertical and horizontal components of total GMF, M_total, MZ_total, and MH_total. The error between the raw value of GMF magnitude calculated from not-converted components and the GMF magnitude in ENU calculated respectively from XYZ components converted into ENU may be kept at or below 0.01 μT for kinematic data.

At step 2914, the regular components of GMF are calculated from the WMM for the first day of each month of the magnetic survey. Differences in vertical and horizontal components of regular GMF for bottom left and upper right corners of map tile 'N50E30' are ~0.6 µT and 0.5 µT respectively.

$Z0=1.0e+04*4.6537$ (in nT)

$H0=1.9687e+04$ (in nT)

$Z\_nm=1.0e+04*4.7141$ (in nT)

$H\_nm=1.9148e+04$ (in nT)

Figure 33:
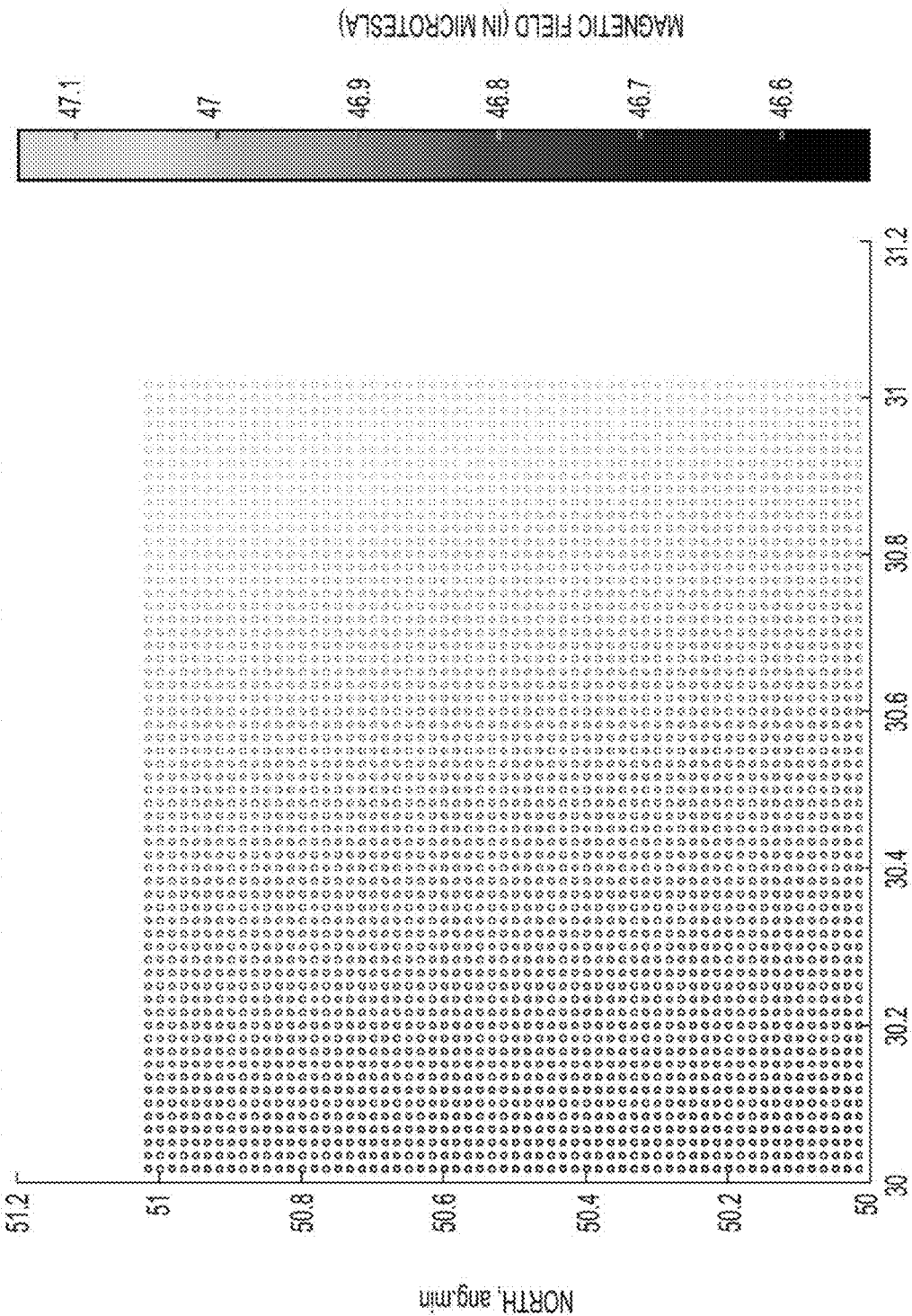
FIG. 33 illustrates an example visualization of a vertical component of regular GMF for the map tile illustrated in FIG. 32.
Figure 34:
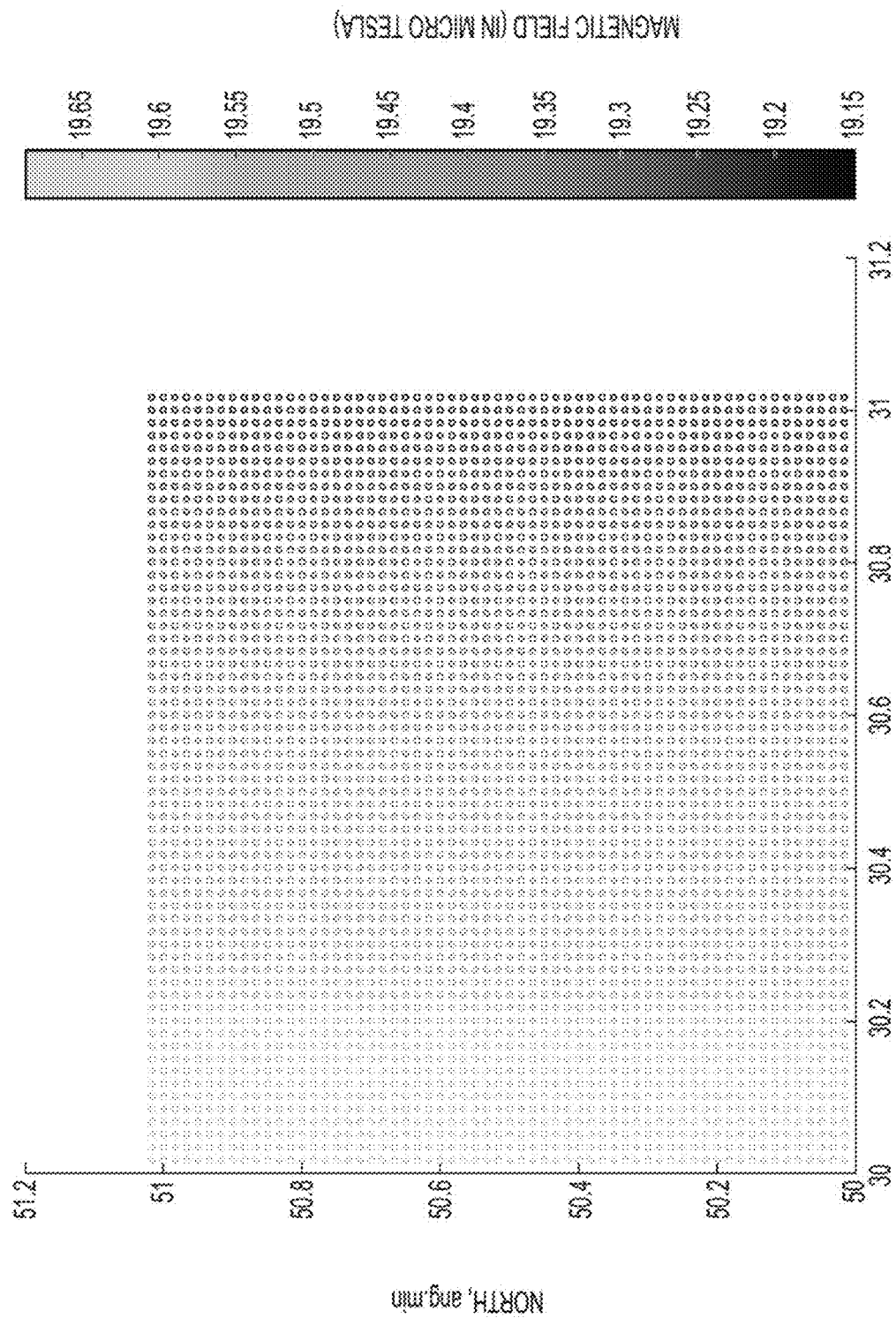
FIG. 34 illustrates an example visualization of a horizontal component of regular GMF for the map tile illustrated in FIG. 32.

For the selected region (park Babiy Yar), the variation in the regular components of GMF are calculated for the whole region and will be updated each month. FIG. 33 and FIG. 34 provide example visualizations of the vertical and horizontal components of regular GMF. Output of step 2914 may include vertical and horizontal components of regular GMF, MZ_reg, MH_reg.

At step 2916, the vertical and horizontal components of anomalous GMF and total GMF are merged into a patch. In particular embodiments, patching is done based on averaging (e.g. non-optimal recurrent filtering). For a single point of space (e.g. a map cell), the measurement equation is separately considered. A series of measurements z=z1, z2, . . . zN done at this point by different users and in different moments of time are considered to be independent of each other and distorted by Gaussian noise with known (e.g. approximated) mean and variance. Also, the possible variation of GMF values over time may, in particular embodiments, be assumed to be small (even if it is not due to diurnal variation, which may be substantially eliminated through pre-processing). The state vector X in this case includes three components of GMF (e.g. total, vertical anomalous, and horizontal anomalous). Measurement vector Z contains readings from different sensors over the definite time (discrete sample) interval i=1, N. In particular embodiments, for simplicity, the state vector and correspondingly the measurement vector may be truncated to only the total value of GMF. In particular embodiments, the continuity of recordings is not necessarily kept. If we have only one type of sensor (or several sensors which are unknown from the point of view of their accuracy characteristics), then in particular embodiments it is possible to use a non-optimal averaging by using recurrent filtering. Recurrent methods of data processing allow an estimate of the parameter to be obtained after each reading is obtained. To explain the recurrent (sequential) method of obtaining estimates, it may be assumed that there are N measurements of the parameter x, e.g.:

$z_i = x + v_{z_i}$; $i=1,N$ where x is estimated parameter (Btotal) and $v_{z_i}$ is the error of i-th reading.

As a result of estimating the measured parameter $x_m$ when having m observations $$\hat{x}_m = \frac{1}{m}\sum_{i=1}^{m} z_i.$$

When new measurement is coming on (i+1)-th step of data processing, then the estimate value $\hat{x}_{m+1}$ will be as follows:

$$\hat{x}_{m+1} = \frac{\left(\sum_{i=1}^{m} z_i\right) + z_{m+1}}{m+1} = \frac{m}{m+1}\left(\frac{1}{m}\sum_{i=1}^{m} z_i\right) + \frac{1}{m+1}z_{m+1}, \quad (1)$$

or $$\hat{x}_{m+1} = \frac{m}{m+1}\hat{x}_m + \frac{1}{m+1}z_{m+1},$$

where $z_{m+1}$ is the last (m+1)-th observation.

Adding and subtracting the value $\hat{x}_m$ from the right part of equation (1) results in the following:

$$\hat{x}_{m+1} = \hat{x}_m + \left(\frac{m}{m+1} - 1\right)\hat{x}_m + \frac{1}{m+1}z_{m+1} = \hat{x}_m - \frac{1}{m+1}\hat{x}_m + \frac{1}{m+1}z_{m+1},$$

It is then possible to write:

$$\hat{x}_{m+1} = \hat{x}_m + \frac{1}{m+1}(z_{m+1} - \hat{x}_m),$$

or, by designating $$\frac{1}{m+1} = k,$$

$$\hat{x}_{m+1} = \hat{x}_m + k(z_{m+1} - \hat{x}_m), \quad (2)$$

The estimate $\hat{x}_{m+1}$ can be obtained from the previous estimate $\hat{x}_m$ by adding it to the difference between the new observation $z_{m+1}$ and the previous estimate multiplied by the weighting factor k. In this case, it is no longer necessary to store in observations obtained in the previous measurement steps, as all previous information is combined in the a priori estimate $\hat{x}_m$.

Recurrent algorithm (2) connects the current value of the estimate $\hat{x}_{m+1}$ to its previous value $\hat{x}_m$. The difference $(z_{m+1}-\hat{x}_m)$ becomes an indicator of the trust to the information obtained during $z_{m+1}$ observation. Indeed, if this difference is close to zero, then the newly coming observation $z_{m+1}$ does not carry any new information compared to a priori, and in this case $\hat{x}_{m+1} \cong \hat{x}_m$. On the contrary, with a large difference $(z_{m+1}-\hat{x}_m)$ taking into account the weighting factor k, there will a significant refinement of the estimate $\hat{x}_m$ obtained on the previous step of the calculations. But the ratio $$k = \frac{1}{m+1}$$

is obtained without using the criterion of optimality, so the estimate $\hat{x}_{m+1}$ is also not optimal, which reduces the value of this method of information processing.

The map patch is associated with several layers (copies of patches of the same dimension), which correspondingly contain the anomalous vertical and horizontal components, the number of measurements N and weighting coefficient k. Each time when new recordings are coming, they are parsed and averaged according to (2) with updating the associated layers. Of course, after definite number of repeating measurements the values of N and k become saturated, which means that any new measurement cannot significantly change the estimate. In such case, the new layer (called "steady 1") is created to preserve the initial estimate and the process of averaging starts again with empty values in corresponding cells. After a certain number of iterations, the layers with trusted estimates "steady 1," "steady 2," and so on will be obtained and then it is possible to use the optimal filtering.

Figure 35:
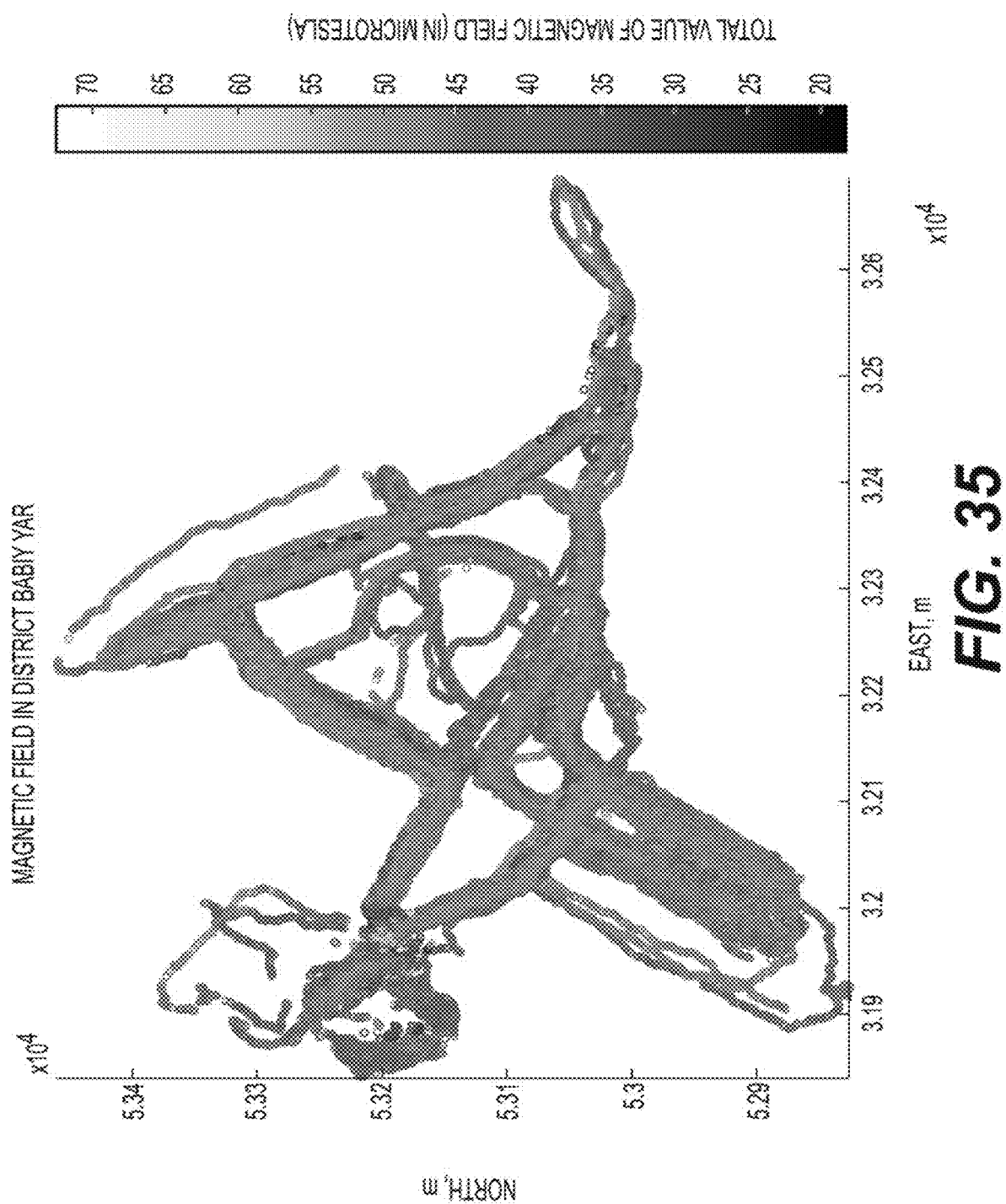
FIG. 35 provides an example visualization of a magnetic field in a sample area.
Figure 36:
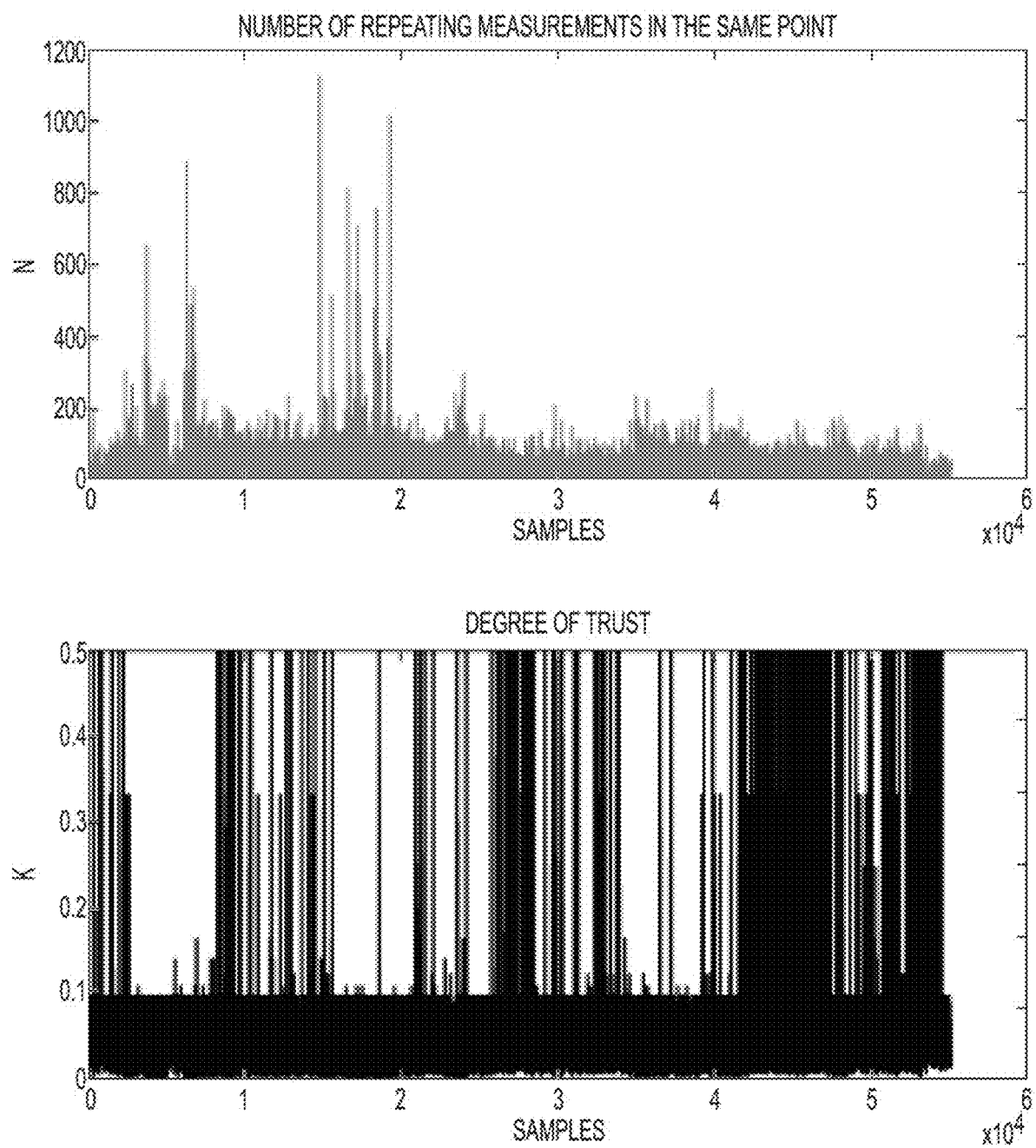
FIG. 36 illustrates example repeating measurements in an example point and degrees of trust over a set of samples in FIG. 35.
Figure 37:
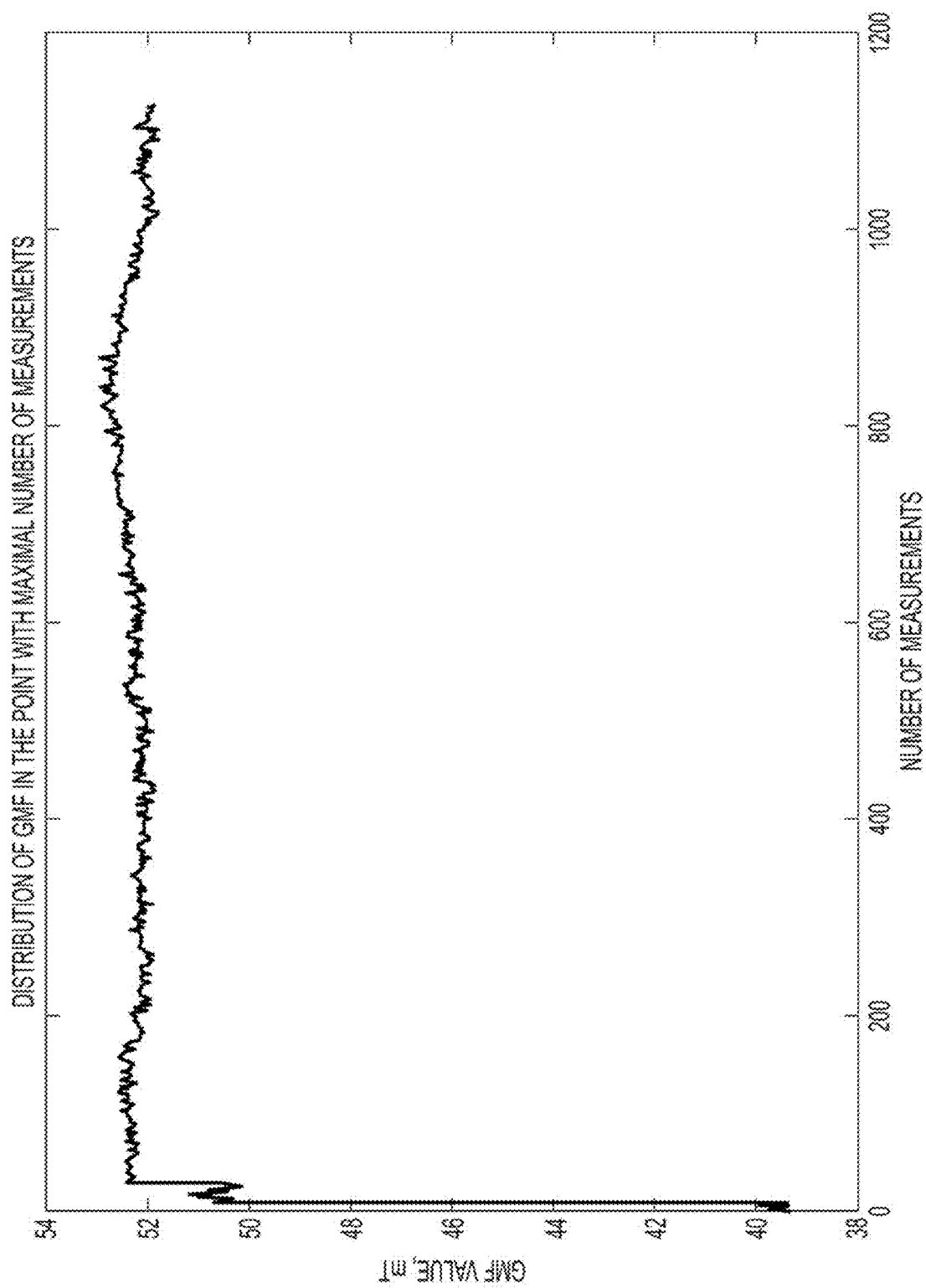
FIG. 37 illustrates an example distribution of GMF at an example point in FIG. 36.
Figure 38:
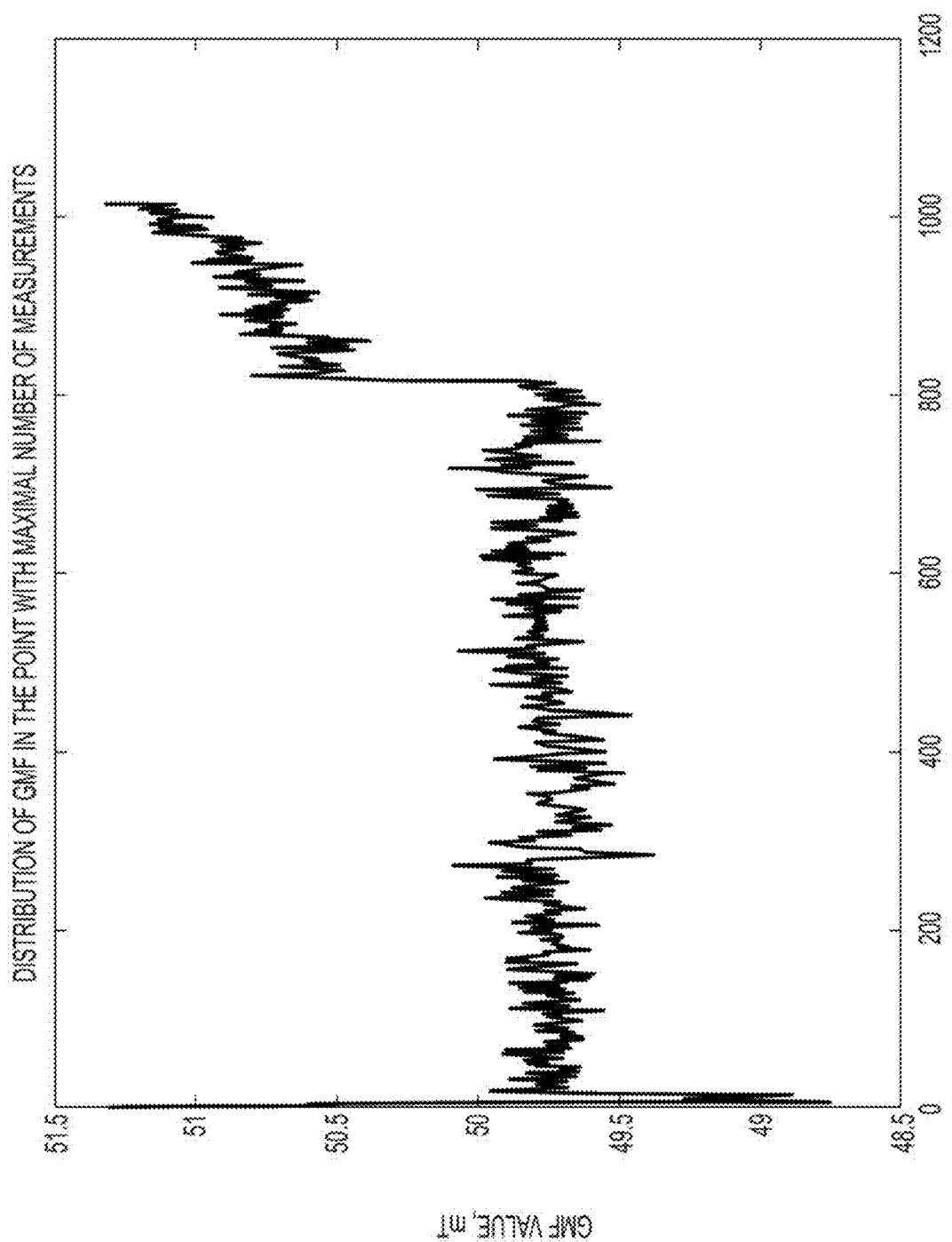
FIG. 38 illustrates another example distribution of GMF at another example point in FIG. 36.
Figure 39:
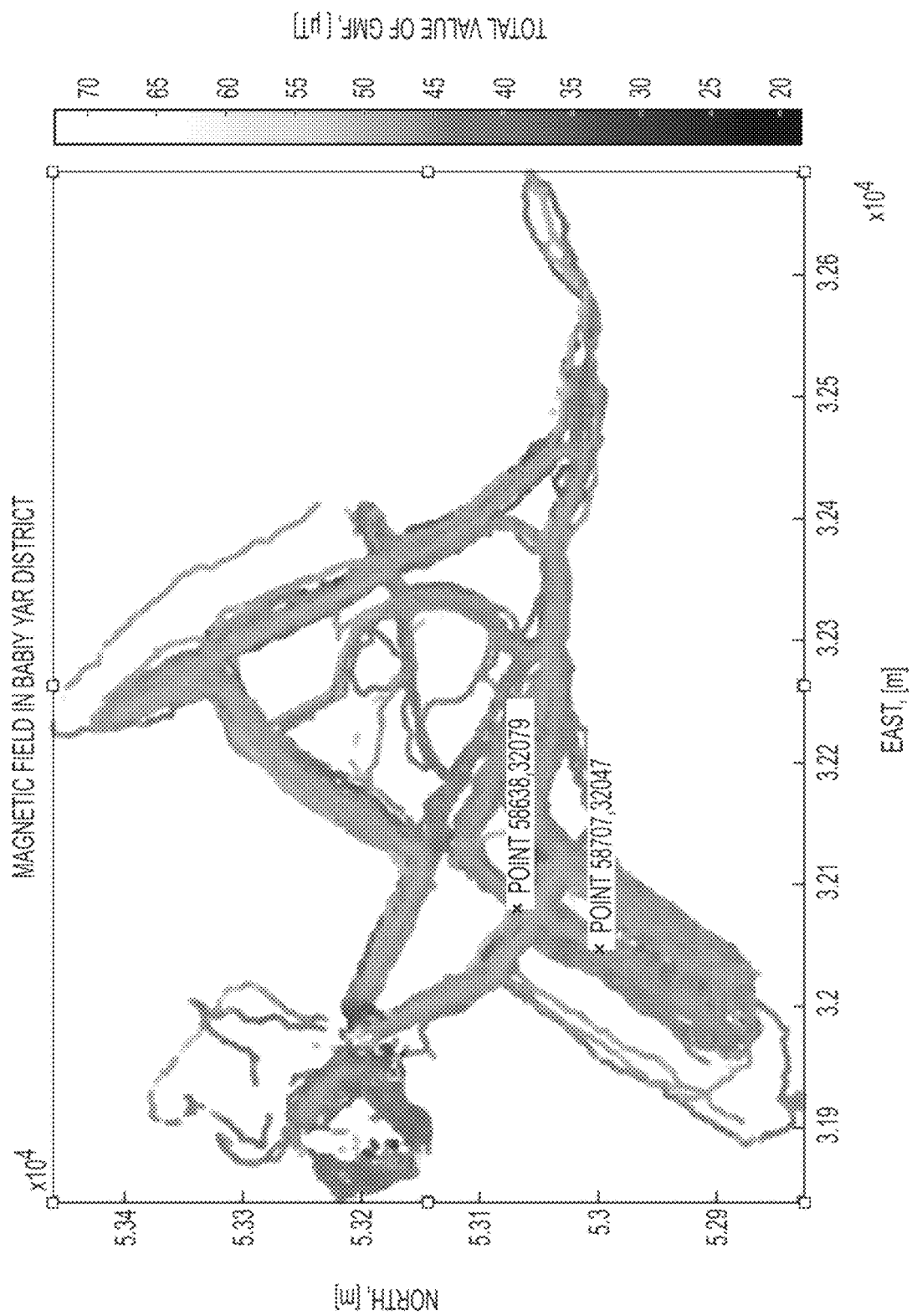
FIG. 39 illustrates the points in FIG. 37 and FIG. 38 in the magnetic map of FIG. 35.

In particular embodiments, when a number of GMF readings (measurement files) exceeds a pre-defined value P (50 in an example case) the following situation may result. A number of repeating measurements in the same point in average is about 100 (in this example), which actually means that the same point was not covered 100 times with independent measurements but the number of measurements was gained due to high update rate of magnetometers (10 Hz) and lower frequency of GNSS update (1 Hz). The walking speed of a pedestrian is about 0.5 m/s, which means at least 10 measurements will be associated with two consecutive cells in the map. FIG. 35 illustrates an example magnetic field in an example area. FIG. 36 illustrates example repeating measurements in the same point and degrees of trust over a set of samples in FIG. 35. To analyze the distribution of errors (mostly due to errors in localization), consider the point where the number of readings was high enough to assume the statistically representative sampling: maxN=1126, point_58707_32047. FIG. 37 illustrates example distribution of GMF at that point. As it can be seen, there is a significant deviation of magnetic field, but the number of points with GMF value in the range from 40 to 50 μT is small and does not exceed 100 measurements. Consider the final estimate of GMF at this point: patch_ID (58707,32047)=52.1459. As can be seen, with the large number of measurements, this small outlier at the beginning was filtered. Other points with large number of measurements may be checked: e.g. N=1016, point_58638_32079. FIG. 38 illustrates example distribution of GMF at that point. In this case, the values differ slightly. A final estimate of GMF at this point may be as follows: patch_ID(58638, 32079)=49.9574. FIG. 39 illustrates these example points on the magnetic map illustrated in the example of FIG. 35. Output of step 2916 may include filled sparse matrix patch_ID and its several layers, patch_MZ_anom, patch_MH_anom, patch_N, patch_K (copies of patch of the same dimension), which correspondingly contain the anomalous vertical and horizontal components, the numbers of measurements N and weighting coefficients k for each point in a patch. All these patches may be saved in a data file, e.g., FZH.mat (or other appropriate formats).

Figure 40:
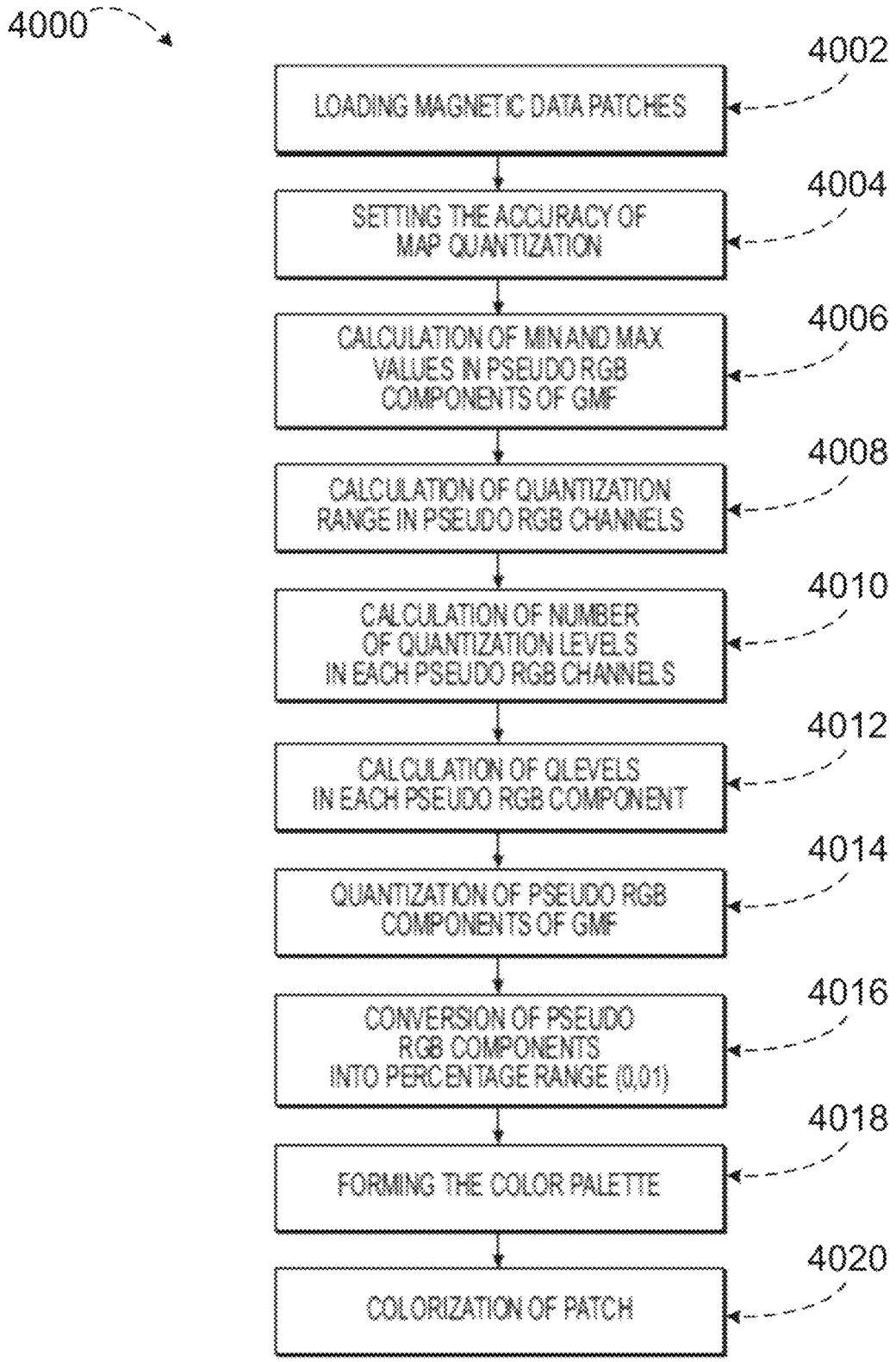
FIG. 40 illustrates an example method for embedding one or more magnetic maps into one or more image files.

FIG. 40 illustrates an example method 4000 for embedding one or more magnetic maps (e.g. generated as described above) into one or more image files (such as, e.g., GeoTIFF files). Moreover, although files with georeferencing information are described and illustrated herein, this disclosure contemplates files without georeferencing information (e.g. TIFF, PNG, etc.), where appropriate, as an alternative to files that contain georeferencing information. This may be the case with indoor applications, where reliable satellite positioning (e.g., with GPS) may be unavailable. Although this disclosure describes and illustrates a particular method for embedding one or more magnetic maps into one or more files that contain georeferencing information, this disclosure contemplates any suitable method for embedding one or more magnetic maps into one or more files that contain georeferencing information, which may include any suitable steps (which may where appropriate include all, some, or none of the particular steps described or illustrated herein) occurring in any suitable order. Moreover, although this disclosure describes and illustrates particular components, devices, or systems carrying out particular steps of a particular method for embedding one or more magnetic maps into one or more files that contain georeferencing information, this disclosure contemplates any suitable combination of any suitable components, devices, or systems carrying out any suitable steps of any suitable method for embedding one or more magnetic maps into one or more files that contain georeferencing information.

Figure 41:
FIG. 41 provides an example visualization of a GeoTIFF image with overlaid magnetic data.

The magnetic map generated by example method 2900 and a GeoTIFF image of the mapped region may be used. Although a GeoTIFF image is disclosed and illustrated, this disclosure contemplates any image file that contains georeferencing information. The GeoTIFF image may be taken from a full global basemap including high-resolution satellite imagery provided by ENVIRONMENTAL SYSTEMS RESEARCH INSTITUTE (Esri) and have the same resolution as the magnetic map being embedded (e.g. one-meter-by-one-meter resolution for each pixel). FIG. 41 visualizes the GeoTIFF image of Babiy Yar district with overlaid values of total magnetic field in micro Teslas along measured trajectories.

Method 4000 begins at step 4002, where the patch data are loaded and assigned. File FZH.mat (from the example above) contains filled matrixpatch_ID and its several layers patch_MZ_anom, patch_MH_anom, patch_N, patch_K for anomalous vertical and horizontal components, the numbers of measurements N and weighting coefficients k for each point in the patch. The corresponding components for red, green and blue pseudo color channels with corresponding marking of all variables are assigned as follows:

Total value of GMF—to pseudo red channel
Anomalous horizontal component—to pseudo green channel
Anomalous vertical component—to pseudo blue channel
Output of step 4002 may include pseudo red, green, and blue components or renamed total value of GMF and vertical and horizontal components of anomalous GMF.

At step 4004, the QErrors limitations (accuracy of map quantization) are set. These quantization errors may be selected based on the required accuracy of map reproducing in pseudo colorization. If the user sensor does not provide the accuracy of measurement greater than, e.g., 0.5 μT, then the magnetic map with higher accuracy may not be required. For further consideration, minimal QErrors are set for all three channels to be equal to 0.5 μT. As an example, this is enough for most mobile phones, since the accuracy of magnetic-field measurement does not exceed 1 μT. Output of step 4004 may include quantization levels for each pseudo RGB color channels: QErrorRmin=0.5; QErrorGmin=0.5; QErrorBmin=0.5.

At step 4006, minimum and maximum values are calculated in pseudo RGB components of GMF. Before calculating the extreme limits of pseudo RGB components, the fixed positive shift may be added to avoid negative values: e.g., shift=1000. Output of step 4006 may include minimal and maximal values of total value of GMF (pseudo red channel) Rmin and Rmax; minimal and maximal values of vertical component of anomalous GMF (pseudo green channel) Gmin and Gmax; minimal and maximal values of horizontal component of anomalous GMF (pseudo blue channel) Bmin and Bmax.

At step 4008, a range in pseudo RGB components of GMF is calculated. The difference may be calculated between maximal and minimal values in each RGB channel obtained on the previous step. Output of step 4008 may include ranges in pseudo color channels: deltaR, deltaG, deltaB. At step 4010, the number of quantization levels in each pseudo RGB components may be calculated. This calculation may be performed as follows. The ranges in each pseudo color channel deltaR, deltaG, deltaB obtained at step 4006 may be divided by the minimal QerrorsRmin, QerrorGmin, and QErrorBmin selected at step 4004. The results may be rounded, because the number of quantization levels should be integers. Output of step 4008 may include the number of quantization levels in each pseudo RGB channel: NR, NG, NB.

At step 4012, QLevels in each pseudo RGB component may be calculated. Quantization levels are the smallest amount in change of value to be assigned to the next integer sample. This calculation may be performed as follows. The ranges in each pseudo color channel deltaR, deltaG, deltaB obtained at step 4008 are divided by the number of quantization level in each pseudo RGB channel: NR; NG; NB calculated at step 4010. Output of step 4012 may include quantization levels in each pseudo RGB channel: QLevelR, QLevelG, and QLevelB.

At step 4014, pseudo RGB components of GMF are quantized, e.g., according to the following formulas:

$QR = \text{round}((R-R\text{min})/Q\text{Level}R);$ $QG = \text{round}((G-G\text{min})/Q\text{Level}G);$ $QB = \text{round}((B-B\text{min})/Q\text{Level}B);$ Output of step 4014 may include quantified values of each pseudo RGB color channel: QR, QG, QB.

At step 4016, pseudo RGB components are unified to the range from 0 to 1 (or amount of color component in percent value). Pseudo RGB components may also be normalized to be within this range [0, 1]. The following formulas may be used:

$QR\_RGB = QR/NR;$ $QG\_RGB = QG/NG;$ $QB\_RGB = QB/NB;$

Output of step 4016 may include normalized (to 1) values of each pseudo RGB color channel QR_RGB, QG_RGB, and QB_RGB from step 4014.

At step 4018, an indexed pseudo RGB color palette is generated. First, the normalized to unit (1) values of each pseudo RGB color channel QR_RGB, QG_RGB, QB_RGB are combined into array QRGB of dimension n-by-3, where n is a number of data entries in file FZH.mat.

$QRGB = \text{round}([QR\_RGB\ QG\_RGB\ QB\_RGB], 2).$

Repeated entries may be eliminated from this array and the pseudo RGB colormap may be generated:

$RGB\_\text{colormap} = \text{unique}(QRGB(:,[1\ 2\ 3]), \text{'rows'});$

In this example, the size may be decreased from 54727-by-3 to 5108-by-3 in the variable RGB_colormap. The pseudo RGB colormap contains unique combinations of Red (total GMF), Green (vertical anomalous component of GMF) and Blue (horizontal anomalous component of GMF). For the data in a patch we replace the pseudo RGB values by single value:

$[\textit{tf}, \text{index}] = \text{ismember}(QRGB, RGB\_\text{colormap}, \text{'rows'});$ Variable 'index' has the same number of rows as QRGB, we rename it into 'magnetic profile' for visualization (magnetic_profile=index). An output of step 4018 is a pseudo RGB colormap. At step 4020, the patch is colorized. Output of step 402 may include magnetic data embedded in GeoTIFF via an alpha channel.

Figure 42:
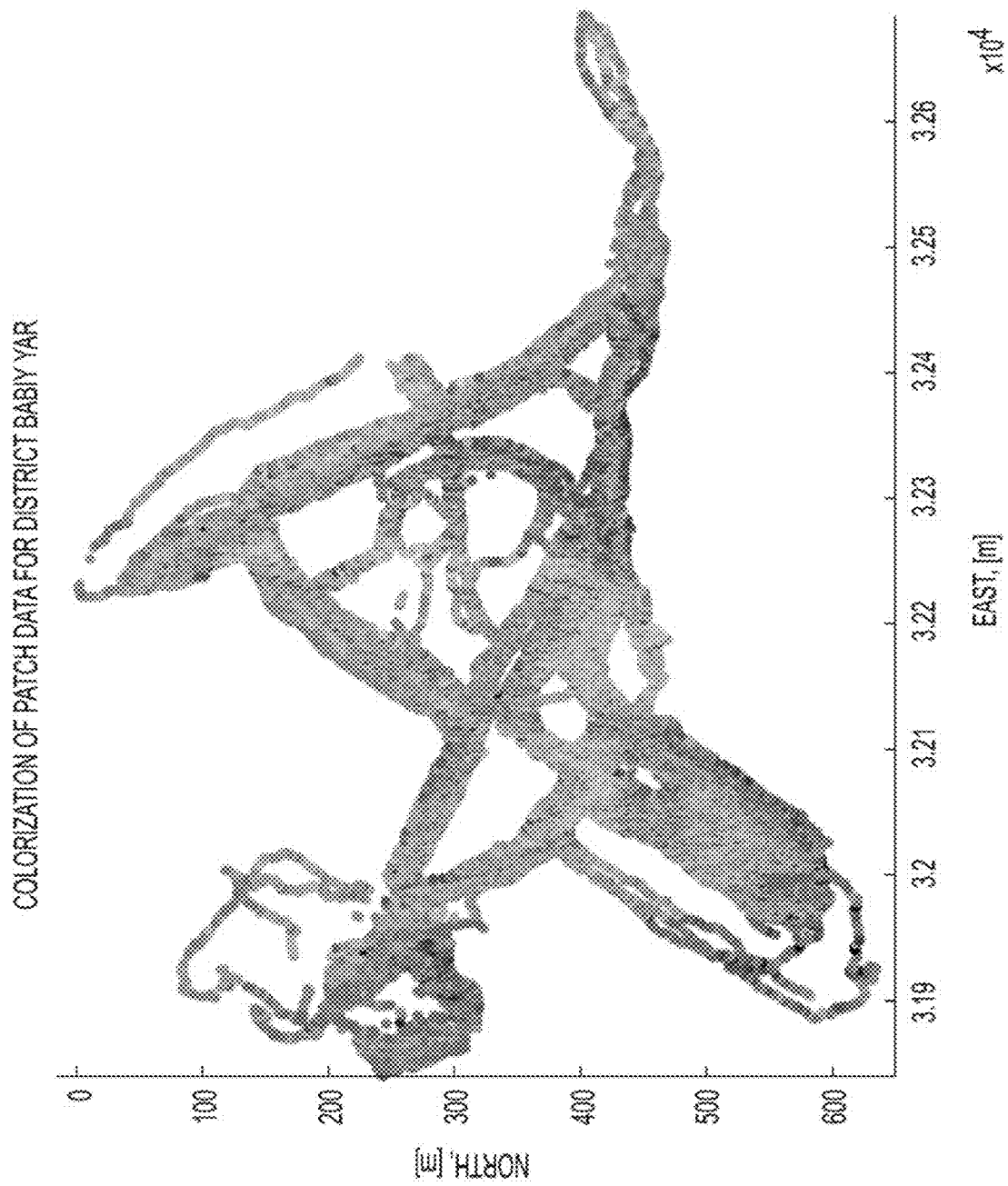
FIG. 42 illustrates an example colorization of QRGB after example quantization and normalization.
Figure 43:
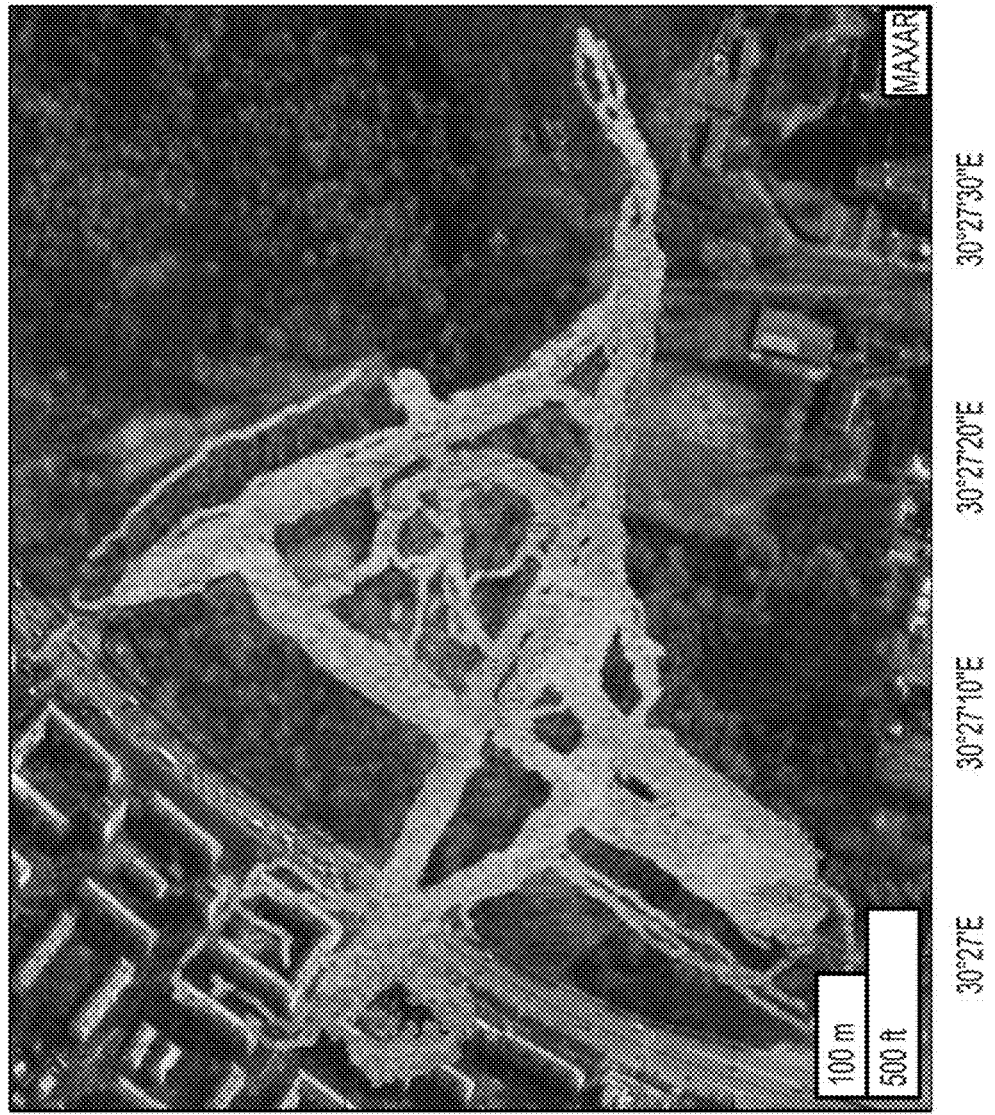
FIG. 43 illustrates an example colorization (in grayscale) of an example magnetic map.
Figure 44:
FIG. 44 illustrates an example zoomed-in portion of the map in FIG. 43.

FIG. 42 is an example visualization of QRGB after quantization and normalization to one. These links (numbers) may be embedded into GeoTIFF via an alpha channel (e.g. as 4-th sample) for each pixel (if the magnetic data for the given pixel is present in the magnetic map). FIG. 43 illustrates example colorization (in grayscale) of the corresponding magnetic map within the satellite image of Babiy Yar district. FIG. 44 illustrates an example zoomed-in portion of the example of FIG. 43.

In particular embodiments, components of the magnetic field can be used for magnetic-aided navigation. A regular component of GMF varies with time while the anomalous component tends to be more stable. Thus, the navigation may be performed by anomalous component as follows. For poor initial localization, when the regular component of the field cannot be extracted from the model WMM or IGRF (because these models require user coordinates as input), the user can navigate by total intensity of GMF. After the stable navigation solution is obtained, and coordinates are determined, the user can switch to the navigation by anomalous components as advanced (precise) mode. Magnetic maps for navigation may have the following components:

Total value of GMF—to pseudo red channel

Anomalous horizontal component—to pseudo green channel

Anomalous vertical component—to pseudo blue channel

All three components may then be indexed, and the link to pseudo color palette in the GeoTIFF file may be added for each pixel via an alpha channel (also known as a transparency channel).

In particular embodiments, after a magnetic map is embedded in a particular GeoTIFF file, this file may be used for navigation by using various techniques. This way magnetic data (maps) can be transmitted (embedded with GeoTIFF tiles) inside existing satellite-based navigation systems (most of them use GeoTIFF files for display purposes) and, as a result, an independent source of navigational data (magnetic) can be added to the existing system and used for navigation. After embedding magnetic data into a GeoTIFF, the corresponding image (based on our newly created pseudo colormap) may be used to navigate using a variety of available image-processing techniques. Particular embodiments represent current magnetic readings visually and compare them to the image-map for navigation.

Figure 45:
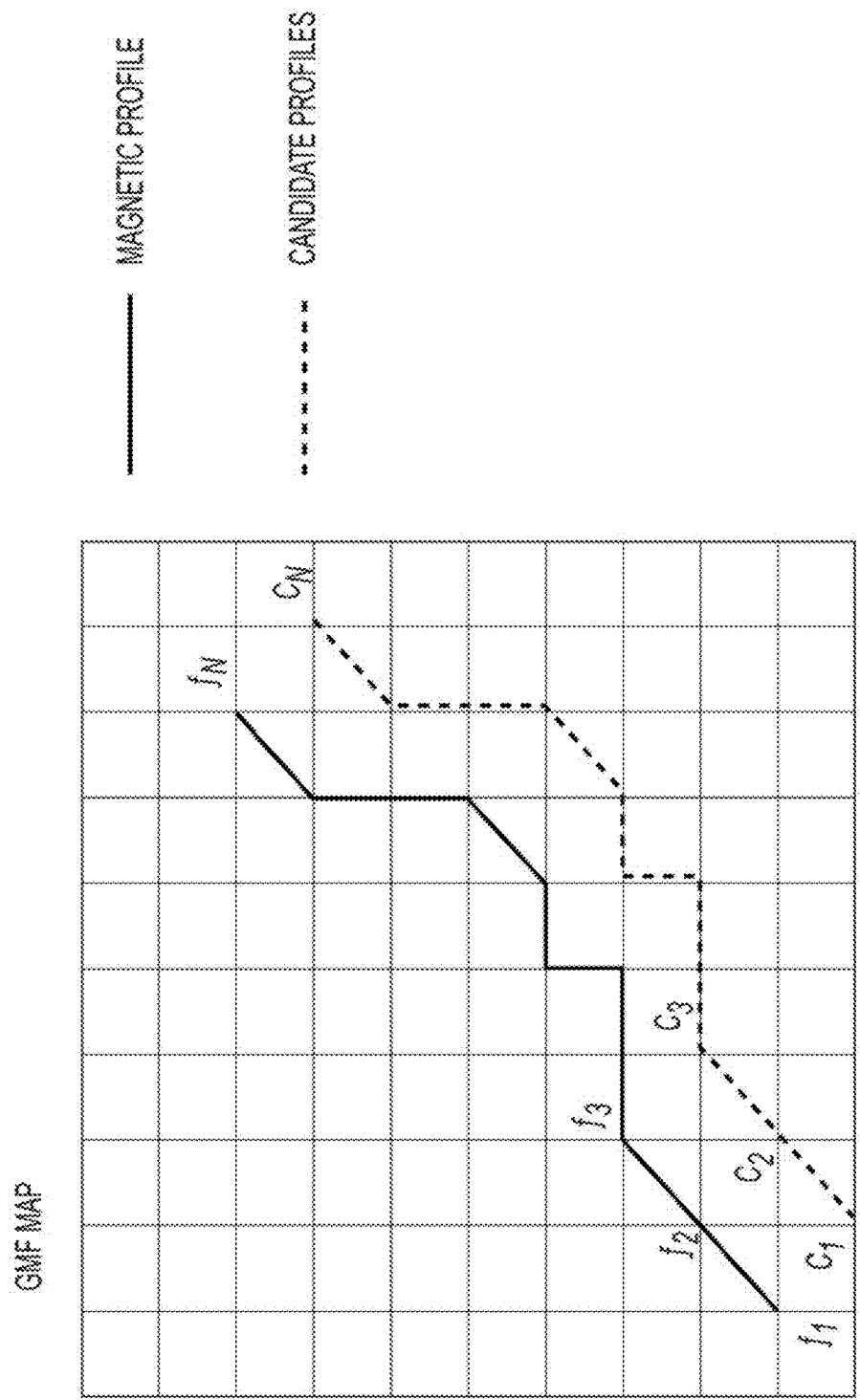
FIG. 45 illustrates example similarity between a current (e.g. being measured) magnetic profile and a candidate (e.g. selected from a map) magnetic profile using a sample GMF map.

In particular embodiments, gradient representation is a difference in GMF values between two adjacent points in space (e.g. of map cells). Considering a given profile and finding all the potential matches (e.g. candidate profiles) from the map, the difference in GMF value is taken between the corresponding samples, as shown in the example of FIG. 45.

$$\Delta f(r) = \frac{f(r) - f(r - \Delta r)}{\Delta r},$$

where f(r) is the GMF value in the given point, $\Delta r$ is the distance between the adjacent points.

Figure 46:
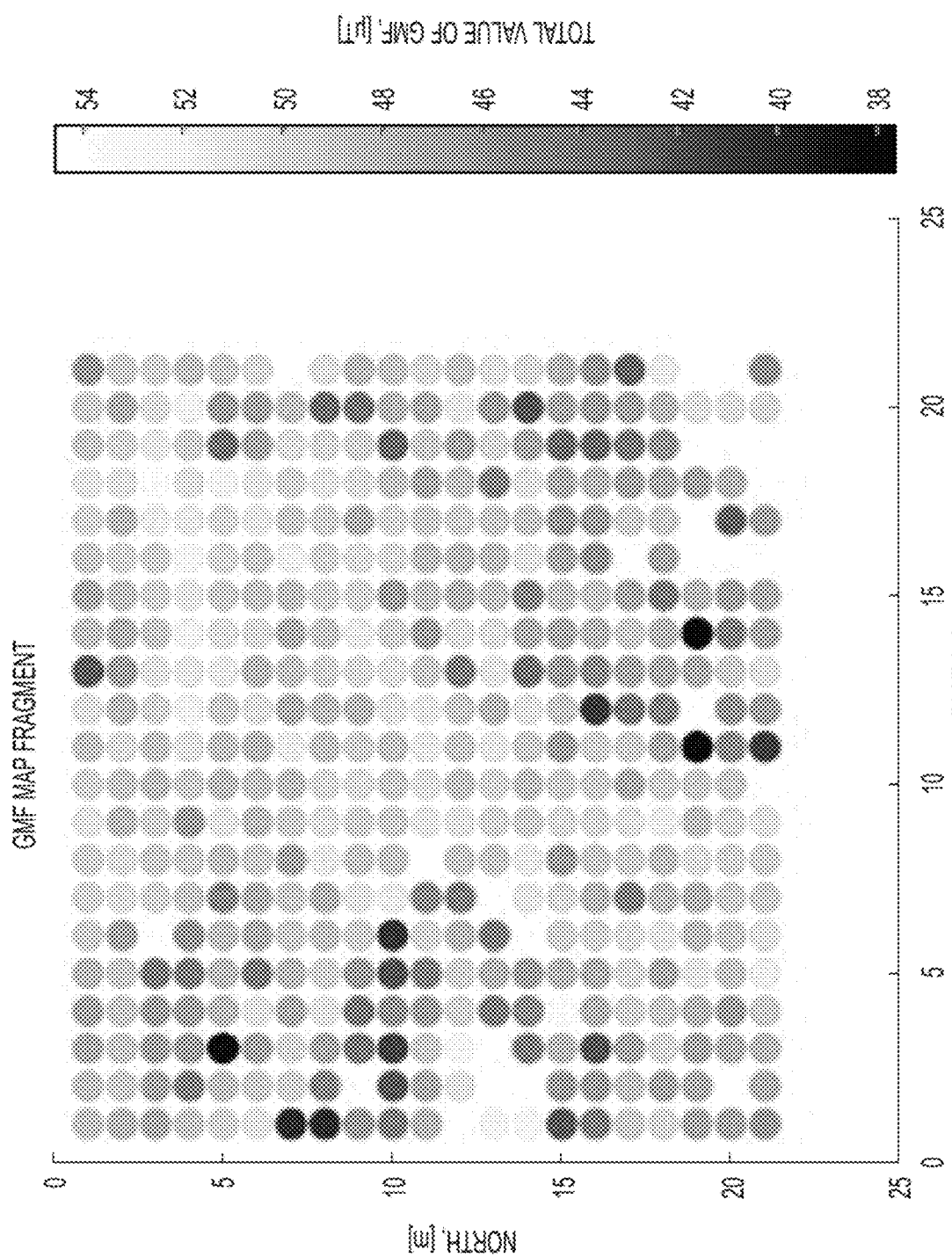
FIG. 46 illustrates an example magnetic-map fragment.
Figure 47:
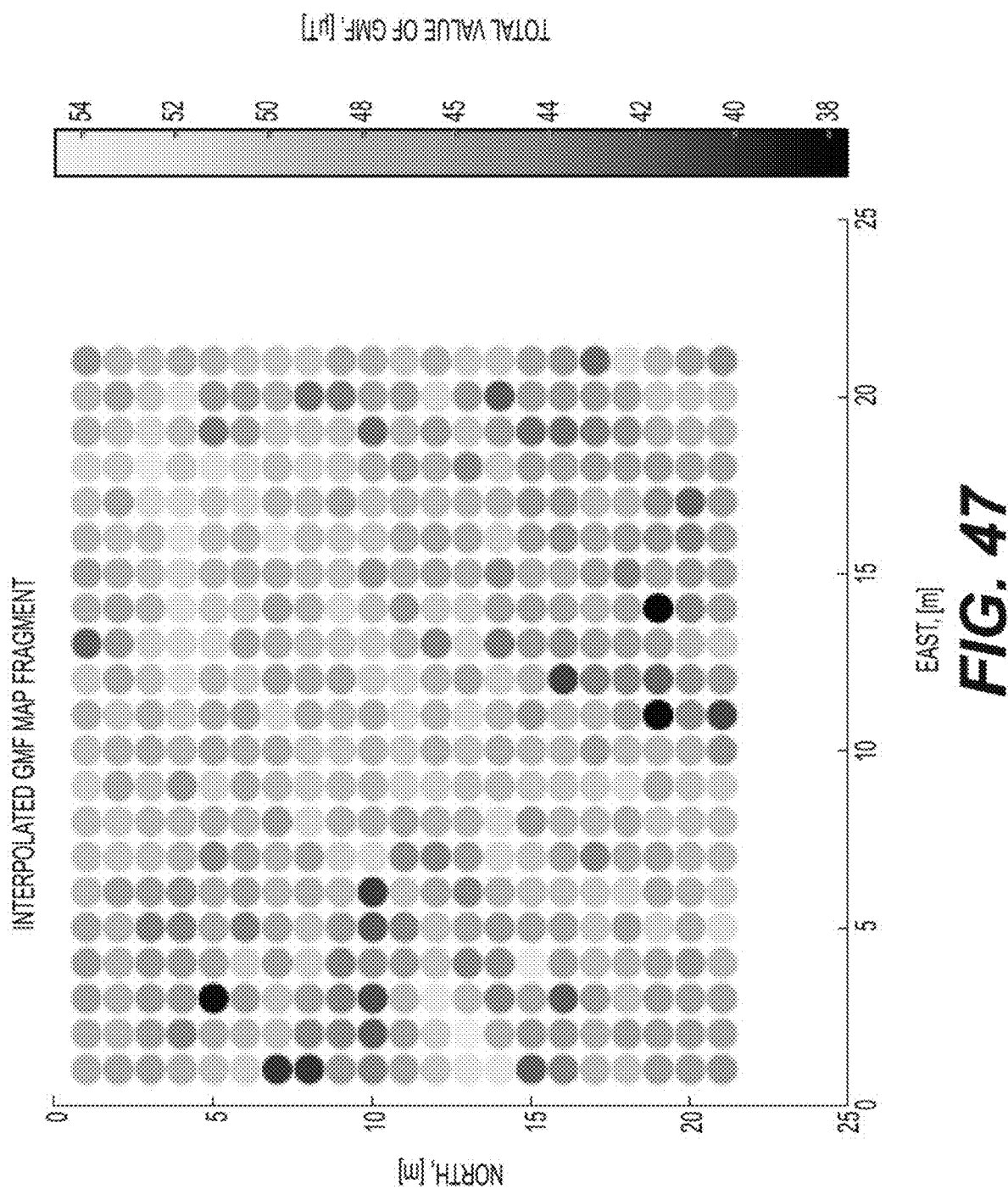
FIG. 47 illustrates example interpolation of the magnetic-map fragment in FIG. 46.
Figure 48:
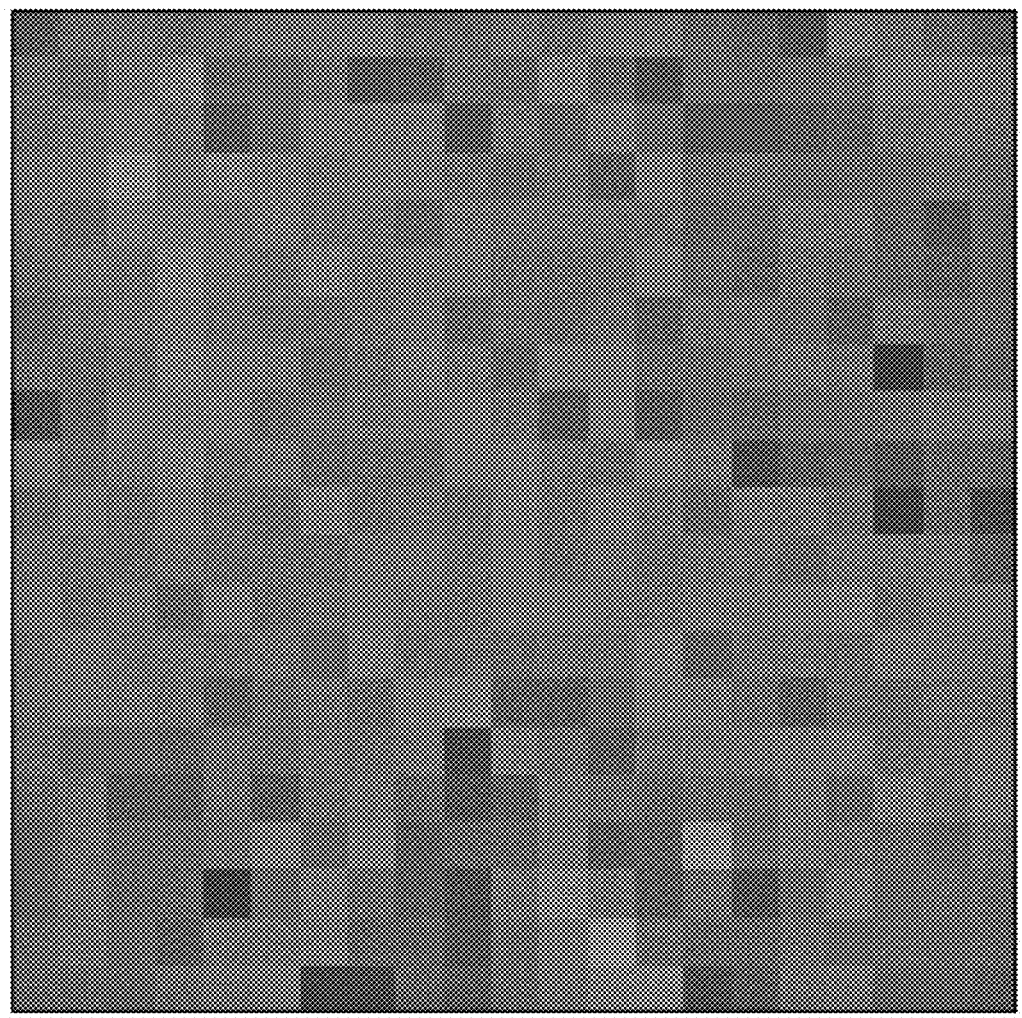
FIG. 48 illustrates example quantization of the magnetic-map fragment in FIG. 47.

In particular embodiments, map visualization is based on quantization of the GMF values (either total magnitude or XYZ components separately) to represent them in grayscale form (in case of quantization of total magnitude of GMF) or in pseudo colored form. FIG. 46 illustrates an example GMF map fragment from Babiy Yar park. Not all cells are filled, so the map fragment may be completed by interpolation. After interpolation, the map fragment of FIG. 46 may look as shown in the example of FIG. 47. Quantization may be performed for a standard grayscale range from 0 to 255. After quantization, the map fragment of FIG. 47 may look as show in the example of FIG. 48. In the example of FIG. 48, the minimal and maximal values of GMF were taken from the whole map (these values may change in the future based on any potential modifications of the map data). The maximal and minimal values of GMF are as follows:
maxGMF=72.5401
minGMF=18.1808
Resolution of quantized level is as follows: QLevel-GMF=0.2132.

Figure 49:
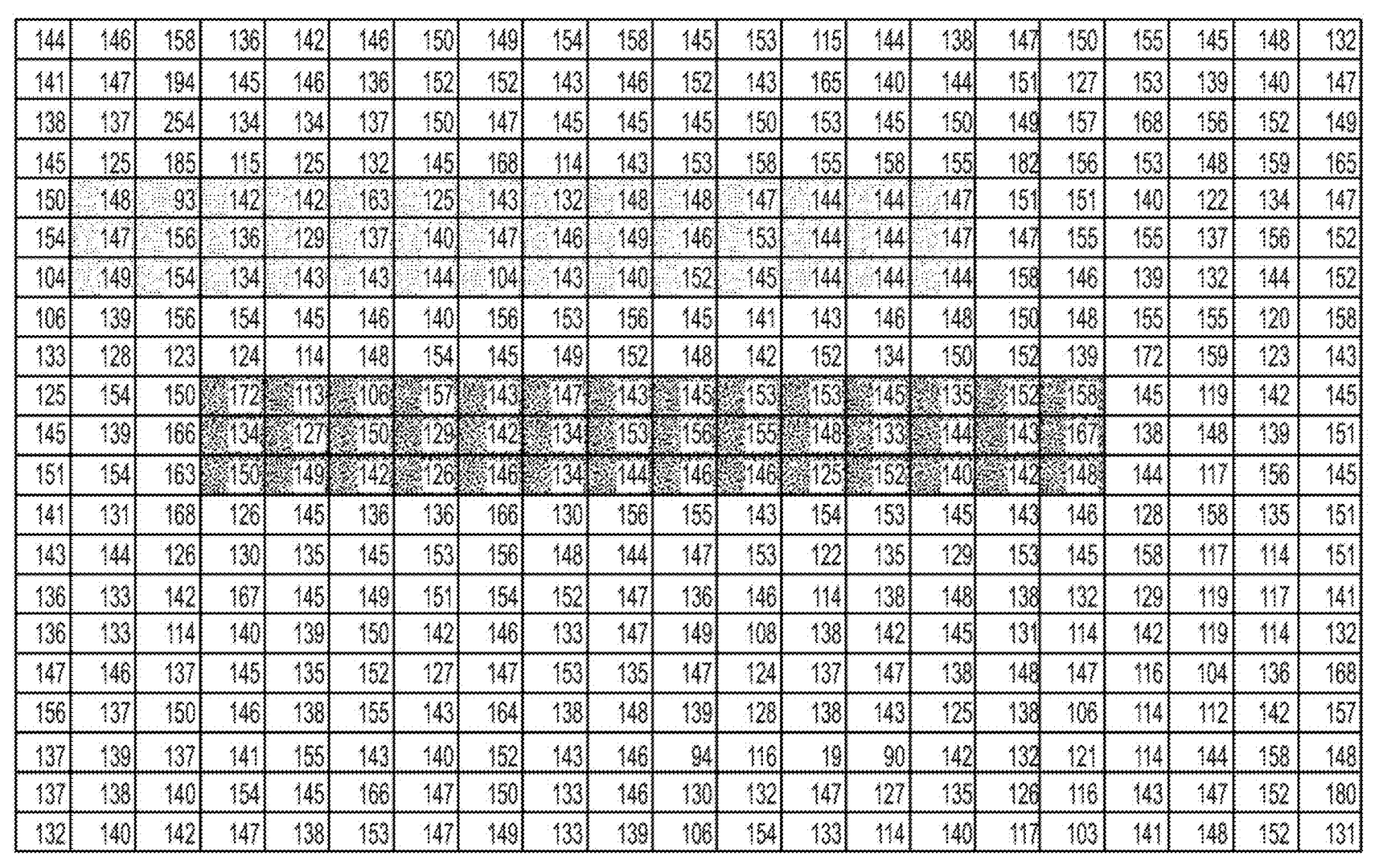

Taking into account the sensitivity and accuracy characteristics of magnetic sensors (e.g. magnetometer built into a mobile phone), the resolution of map is ~0.2 µT is enough for localization and navigation purposes in particular embodiments. If profile matching is performed similar to image matching (that is, thinking of a current magnetic profile as an image strip), then the magnetic profile and the selected candidate profile may be as shown in the example of FIG. 49, which visualizes numerical values of a quantized map fragment. In FIG. 49, the upper, lighter section designates the current magnetic profile and the lower, darker section is related to a candidate profile.

In particular embodiments, the mean square difference (MSD) is calculated as following:

$$MSD = \frac{1}{N}\sum_{i=1}^{N}(f_i - C_i)^2,$$

where $f_i$ are values of current magnetic profile, $C_i$ are values of candidate profile from a map. If the magnetic profiles are represented as image strip by size M×N, then they are converted by lexicographic ordering into MN×1 vectors. In this case, the formula for MSD will be as follows:

$$MSD = \frac{1}{MN}\sum_{i=1}^{MN}(f_i - C_i)^2,$$

MSD returns a squared sum of Euclidean distances between two profiles. If MSD returns zero, two profiles are the same, which means a match. But as for practical applications the problem is in the fact that there is no maximum value of MSD. The larger the MSD is, the smaller the corresponding correlation.

In particular embodiments, mean absolute difference (MAD) is calculated as follows:

$$MAD = \frac{1}{N}\sum_{i=1}^{N}|f_i - C_i|.$$

For magnetic profile strips, the formula is as follows:

$$MAD = \frac{1}{MN}\sum_{i=1}^{MN}|f_i - C_i|,$$

MAD returns a sum of absolute differences between two profiles. The characteristic of MAD is similar to that of MSD. If MAD is near zero, this implies two profiles have high correlation. In contrast, if MAD has a larger value, the correlation level is low. Like MSD, MAD also has no limitation to its maximal value.

In particular embodiments, normalized cross correlation (NCC) is calculated as follows:

$$NCC = \frac{\sum_{i=1}^{N}f_i \cdot C_i}{\sqrt{\sum_{i=1}^{N}f_i^2 \cdot \sum_{i=1}^{N}C_i^2}}$$

In case of image strips, the formula becomes:

$$NCC = \frac{\sum_{i=1}^{MN}f_i \cdot C_i}{\sqrt{\sum_{i=1}^{MN}f_i^2 \cdot \sum_{i=1}^{MN}C_i^2}}$$

NCC returns a normalized value between 0 and 1. A sum of a product is normalized by squared sums of each profile. The value 1 indicates the best match. This measure is known to be more robust to pixel-wise white noise in comparison to MSD and MAD. On the other hand, NCC is not invariant under the constant shift in a field value. To provide this invariance, we utilize Zero-mean Cross-Correlation, $$ZNCC = \frac{\sum_{i=1}^{MN}(f_i - \bar{f}) \cdot (C_i - \bar{C})}{\sqrt{\sum_{i=1}^{MN}(f_i - \bar{f})^2 \cdot \sum_{i=1}^{MN}(C_i - \bar{C})^2}},$$

where $\bar{f}, \bar{C}$ are the mean values of the current and candidate magnetic profiles. Note that, in tracking, only the positive correlation is of interest, thus max(0, ZNCC) may be used as a similarity measure. The sensitivity of NCC and ZNCC is smaller in comparison to MSD and MAD, especially for long profiles, where N tends to infinity. However, when finding matches rather than finding the discrepancies, the NCC (or ZNCC) may provide more accurate results.

Figure 53:
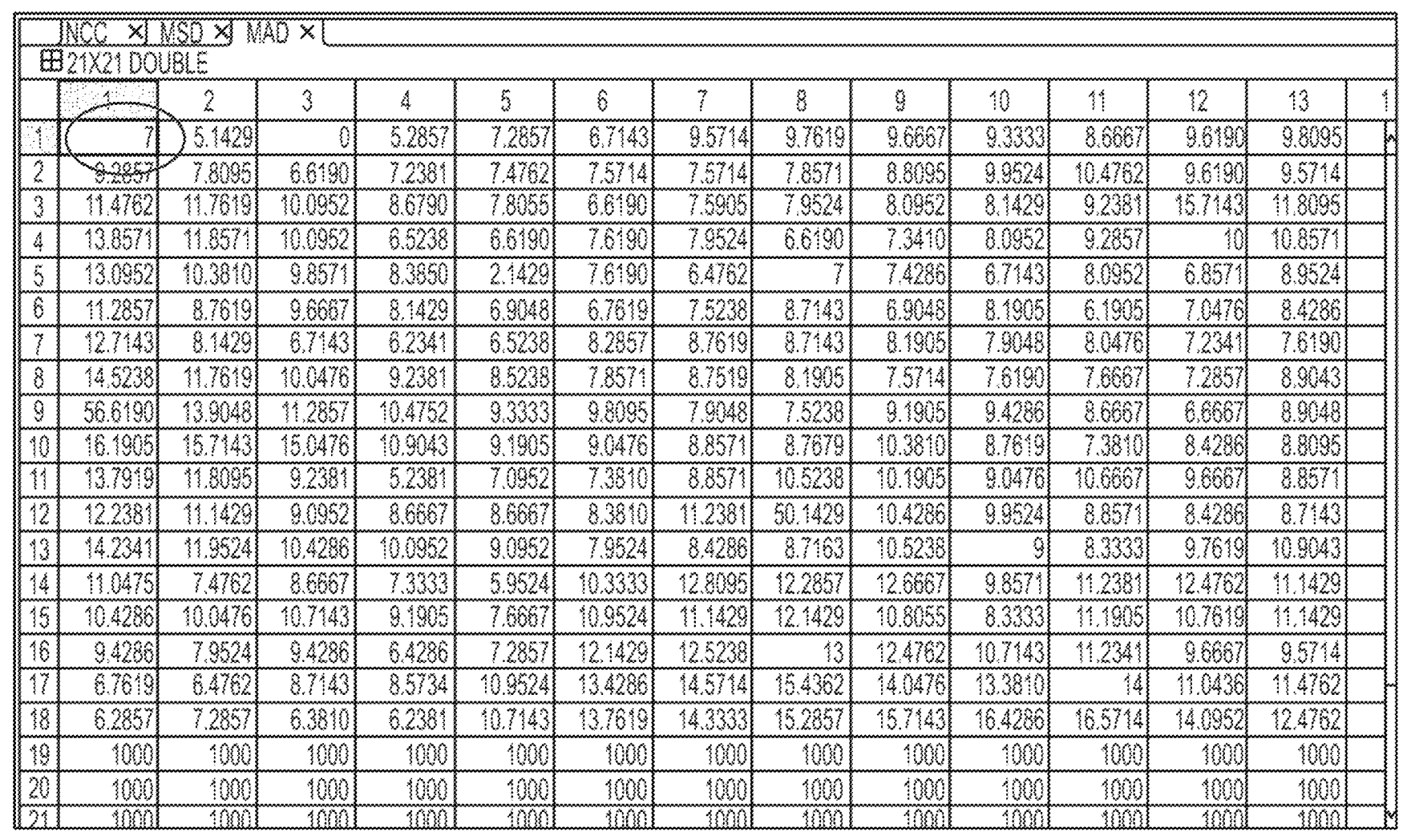
Figure 58:
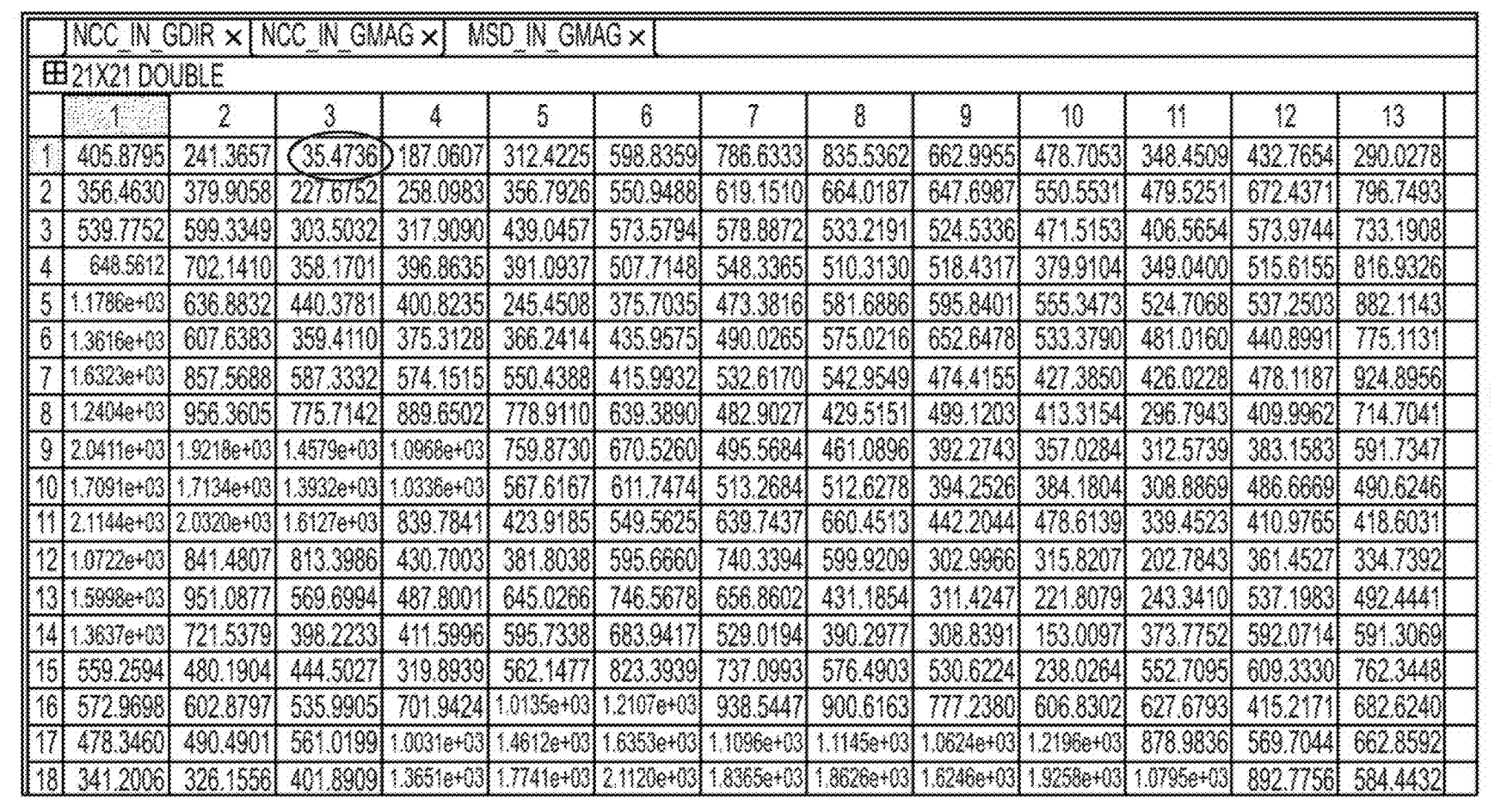

In particular embodiments, the same approach is applied to the part of the image (instead of just a single magnetic profile) over the visualized GMF map. Consider the example magnetic profile strip (3×7) illustrated in FIG. 50. NCC, MSD, and MAD are calculated by sliding along the map by changing the left upper corner. The results are illustrated in FIG. 51, FIG. 52, and FIG. 53. Noise is added to the magnetic gradient strip and the performance of each of these error metrics checked, as illustrated in FIG. 54, FIG. 55, and FIG. 56. For MAD (in FIG. 56), an incorrect best matching is selected. The visualization of the map is pre-processed via a gradient operator, such as a Prewitt operator, which represents the image as gradient values in magnitude and direction. The results are presented in FIG. 57, FIG. 58, and FIG. 59. FIG. 57 demonstrates calculating a best match as a maximal value of the NCC metrics, and such maximal element is marked. In FIG. 58 and FIG. 59, we are searching for the minimal elements of MSD and MAD metrics, the resulting values are marked and they correspond to the initial position.

In particular embodiments, all three error metrics perform better for gradient representation (for gradient magnitude). The gradient in direction may be used to speed up the search for larger maps, especially when there is significant uncertainty in initial position. Three-component representation (colorization, gradient, and visual representation) of a magnetic map may, in particular embodiments, provide one or more, or none, of the following benefits:

It may facilitate the use of well known image-processing techniques to determine the information content of the map (e.g. map informativity).

It may facilitate detection of magnetic-map features using image-processing techniques. Magnetic-map features may include, e.g., points, contours, and areas. These features (e.g., anomalies) may be used, e.g., for validation of data from potentially unreliable sources (e.g., crowdsourcing) in updating the magnetic map.

It may facilitate more detailed analysis and detection of more anomalies by, e.g., increasing the richness of the information content of the magnetic map.

The sequence of measurements (using gradiometers for example) may also be represented as part of an image, which may facilitate the matching of the magnetic profile with an existing map (e.g., as may be done in image processing based on feature matching).

Particular embodiments may improve mapping quality by GMF colorization and visualization. Representation of GMF data by a magnetic map according to particular embodiments herein may facilitate use of well known methods of image processing. Particular embodiments estimate map informativity by one or more of the following parameters:

directly by the size of colormap $N_{CM}$;
by number $N_{SA}$ of segmented areas within a map tile; or
by number $N_{ME}$ of magnetic anomalies (e.g. edges).

In particular embodiments, an edge is an area with a rapid change in image (map) intensity or where the GMF value is spatially localized. Assume that the GMF data varies from GMFmin to GMFmax for a selected map tile of size M by N (in meters or any other units). In particular embodiments, a standard parameter for informativity estimation is variance and is calculated as follows:

$$\sigma^2 = \frac{1}{N}\sum_{i=1}^{N}(X-\mu)^2,$$

where N is the number of data samples X and µ is the mean value. However, in particular embodiments, the variance may not indicate whether the map tile is good or bad from the point of view of reliability of navigation. The greater the variance, the better and more reliable navigation will be, but there is no clear threshold between "completely unreliable" and "reliable to some degree" or between "reliable to some degree" and "completely reliable." It may be advantageous to have some characteristic expressed as a percentage to understand a difference between "reliable" and "not reliable." In particular embodiments, reliability (e.g. informativity) of a map tile may have no relation to a quality of mapping as a process. The informativity in this case may be a property of GMF itself, since, if the magnetic field for some area has no variation (e.g. stable because of lack of anomaly sources), then magnetic-aided navigation in this area may be useless without another geophysical field.

In particular embodiments, informativity of GMF (e.g. by its total component) may be calculated as follows. Assume that the ranges of possible change of total value of GMF are from 0 µT to 150 µT (e.g. in the presence of large metallic constructions or magnets). If it is also assumed that the step in GMF detection in 0.5 µT and this step is used for calculating quantization and pseudo colorization, then the size $N_{CM}$ of a colormap may be calculated as follows (e.g., in assumption, that the variation in total GMF is continuous by all its range):

$$N_{CM} = \frac{GMF_{max} - GMF_{min}}{0.5} = \frac{150-0}{0.5} = 300$$

Figure 60:
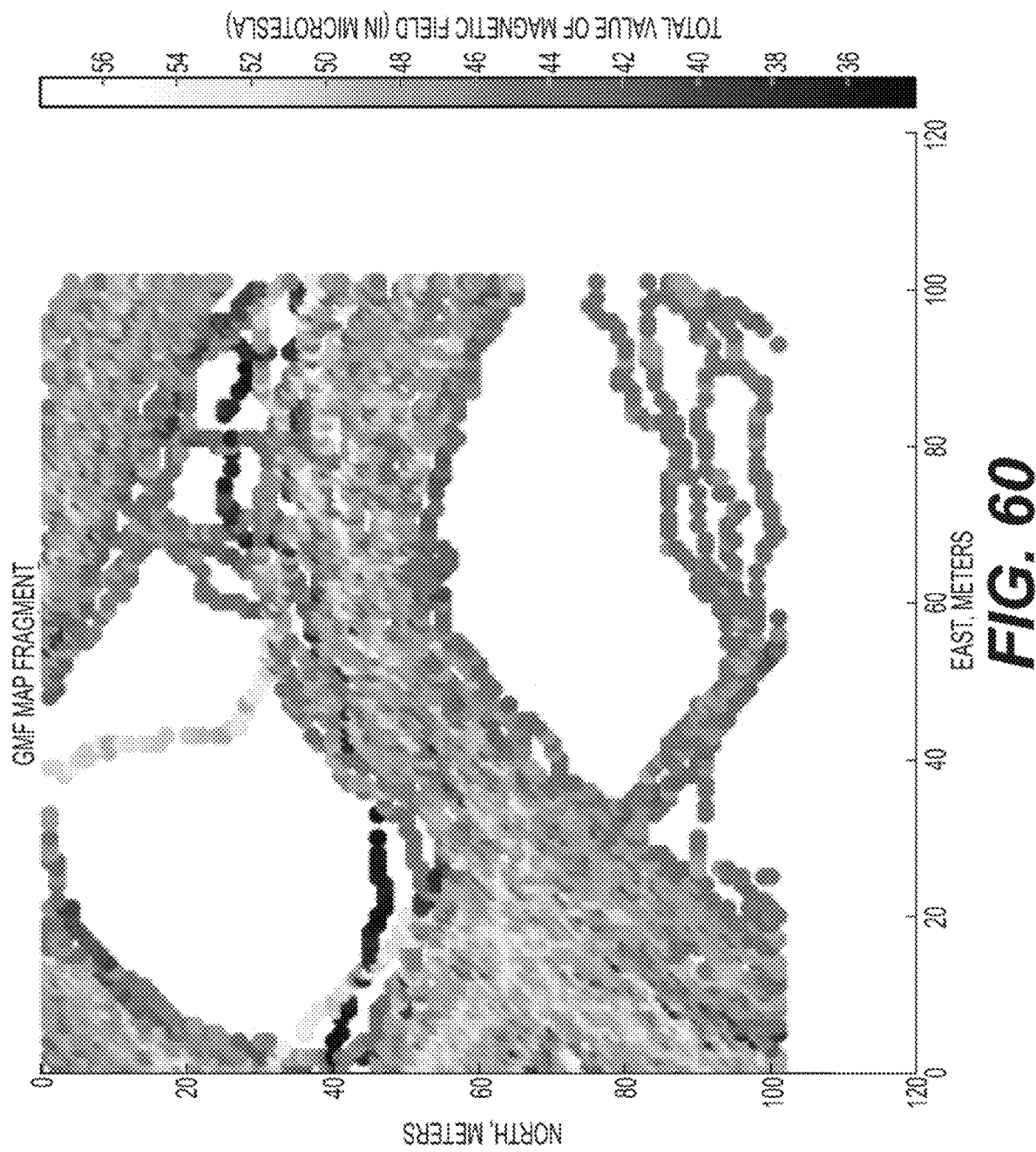
FIG. 60 illustrates an example magnetic-map fragment.

For a mapped area of Babiy Yar with size in 101 m by 101 m, as illustrated in the example of FIG. 60, the range of total GMF intensity varies from 34.1488 µT to 57.6683 µT. The number of quantization levels for pseudo colorization of GMF in the selected map tile may be calculated as follows:

$$N_{map\ tile} = \frac{57.6683 - 34.1488}{0.5} = 47.0389$$

By rounding the calculated value, the number of quantization levels is equal to 47. Since, in this example, only the total component of GMF is considered, the number of quantization levels determines the size of colormap $N_{map\ tile}$. This value may be corrected depending on number of unique GMF entries in the selected map tile. In the given example, it is shorter and contains only 44 unique entries. And the relative informativity of the selected map tile can be calculated as follows:

$$\frac{N_{map\ tile}}{N_{CM}} \cdot 100\% = \frac{44}{300} \cdot 100\% = 14.7\%$$

In particular embodiments, such informativity may be used rarely because, as a rule, the approximate position of an object may be known to at least some degree. Because of this, relative informativity may be used. The informativity of an "area of initial uncertainty" may be defined to be the area where the search is started.

In this example, the a priori information about the position of the object being somewhere in Babiy Yar park is known. In this case, the informativity S is determined by minimal and maximal values of total GMF in the whole patch as follows:

$$N_{CM} = \frac{72.5401 - 18.1808}{0.5} = 108.7186$$

or, after rounding, 109. By deleting the repeating entries in the colormap, 93 unique entries are obtained. Now the relative informativity of selected map tile increases:

$$\frac{N_{map\ tile}}{N_{CM}} \cdot 100\% = \frac{44}{93} \cdot 100\% = 47.31\%$$

Increasing the step in quantization (which may be associated with increasing the accuracy of measurement) may not change informativity (e.g. defined as proposed) much. It may be considered substantially invariant to a hardware change (e.g. a change in type of magnetic sensor). If the accuracy of the sensor is significantly increased and mapping accuracy is changed from 0.5 µT (from an earlier example) to 0.05 µT (by a factor of 10), the previously determined characteristics may change as follows:

$$N_{CM} = \frac{72.5401 - 18.1808}{0.05} = 1087.186$$

$$N_{map\ tile} = \frac{57.6683 - 34.1488}{0.05} = 470.389$$

By eliminating the repeating entries in a corresponding colormap slightly different values may be obtained: $N_{CM}=642$; $N_{map\ tile}=341$.

$$\frac{N_{map\ tile}}{N_{CM}} \cdot 100\% = \frac{341}{642} \cdot 100\% = 53.12\%$$

Another proposed characteristic of map informativity is number $N_{SA}$ of segmented areas in a map tile. To make it invariant, the same principle may be used. The number $N_{SA}$ of segmented areas for the area of initial uncertainty and its ratio to the number $N_{map\ tile}$ of segmented area within the selected map tile may be determined:

$$\frac{N_{map\ tile}}{N_{SA}} \cdot 100\%$$

In particular embodiments, in digital image processing and computer vision, image segmentation may be the process of partitioning a digital image into multiple segments (e.g. sets of pixels (which may be referred to as image objects)). Image segmentation may be used to locate objects and boundaries (e.g. lines, curves, etc.) in images. For pseudo colorized magnetic maps, particular embodiments search for magnetic anomalies (e.g. by edge detection) or for areas with stable field intensities (e.g. segmented areas).

In particular embodiments, the result of image segmentation is a set of segments that collectively cover an image or a set of contours extracted from the image (e.g. edge detection). Each of the pixels in a region is similar with respect to some characteristic or computed property, such as color, intensity, or texture. Adjacent regions are substantially different with respect to the same characteristic(s). Particular embodiments deal with GMF data, and below there is an example for GMF intensity being pseudo colorized and segmented.

Figure 61:
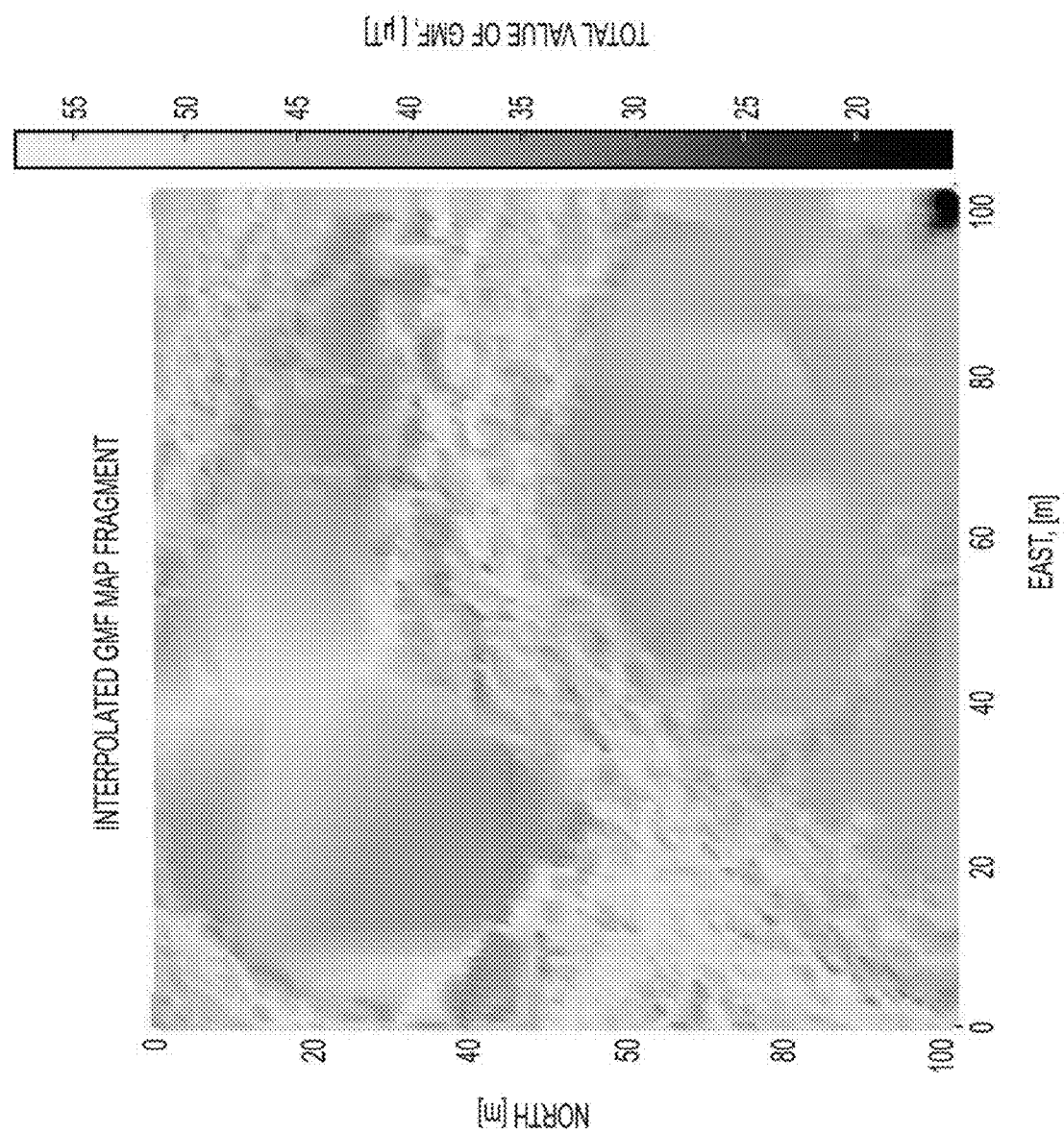
FIG. 61 illustrates example interpolation of the magnetic-map fragment in FIG. 60.
Figure 62:
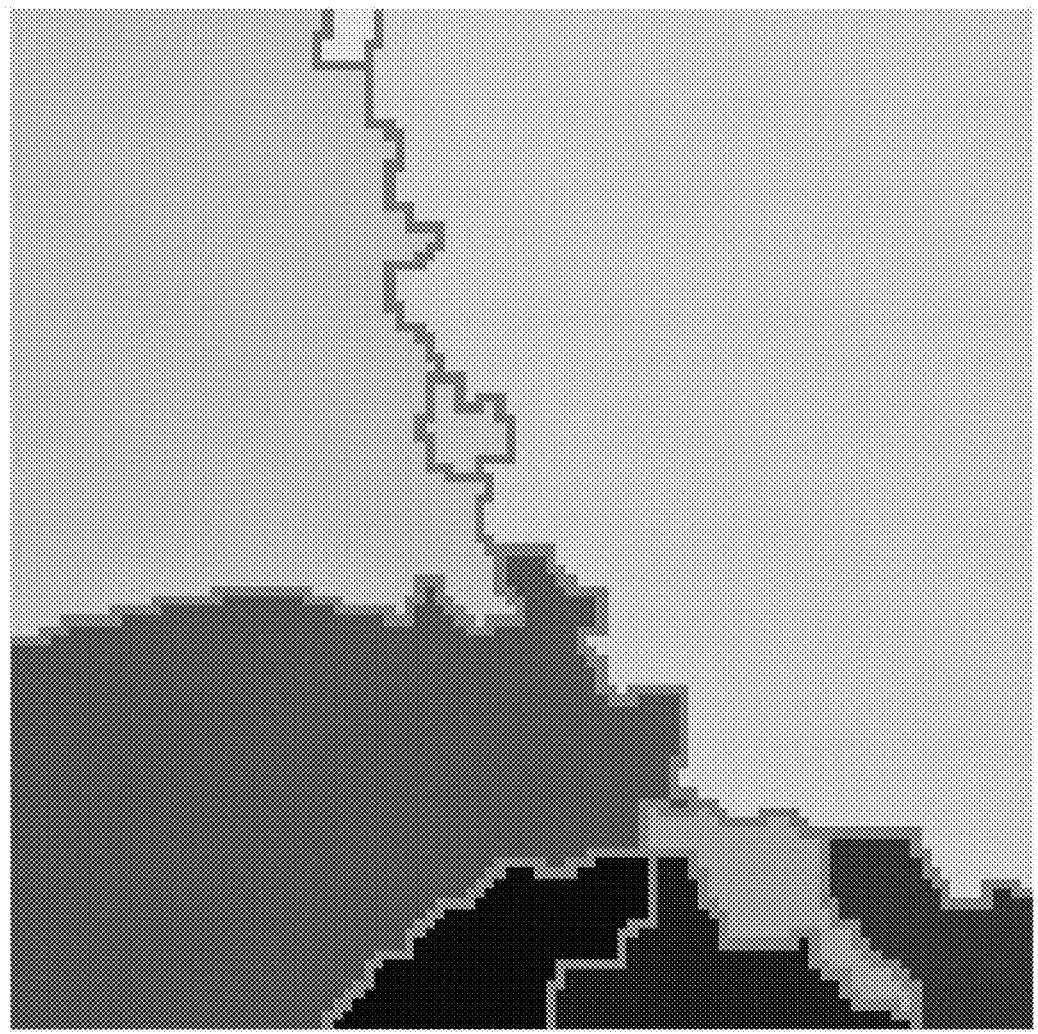
FIG. 62 illustrates an example transformation of the magnetic-map fragment in FIG. 61.
Figure 63:
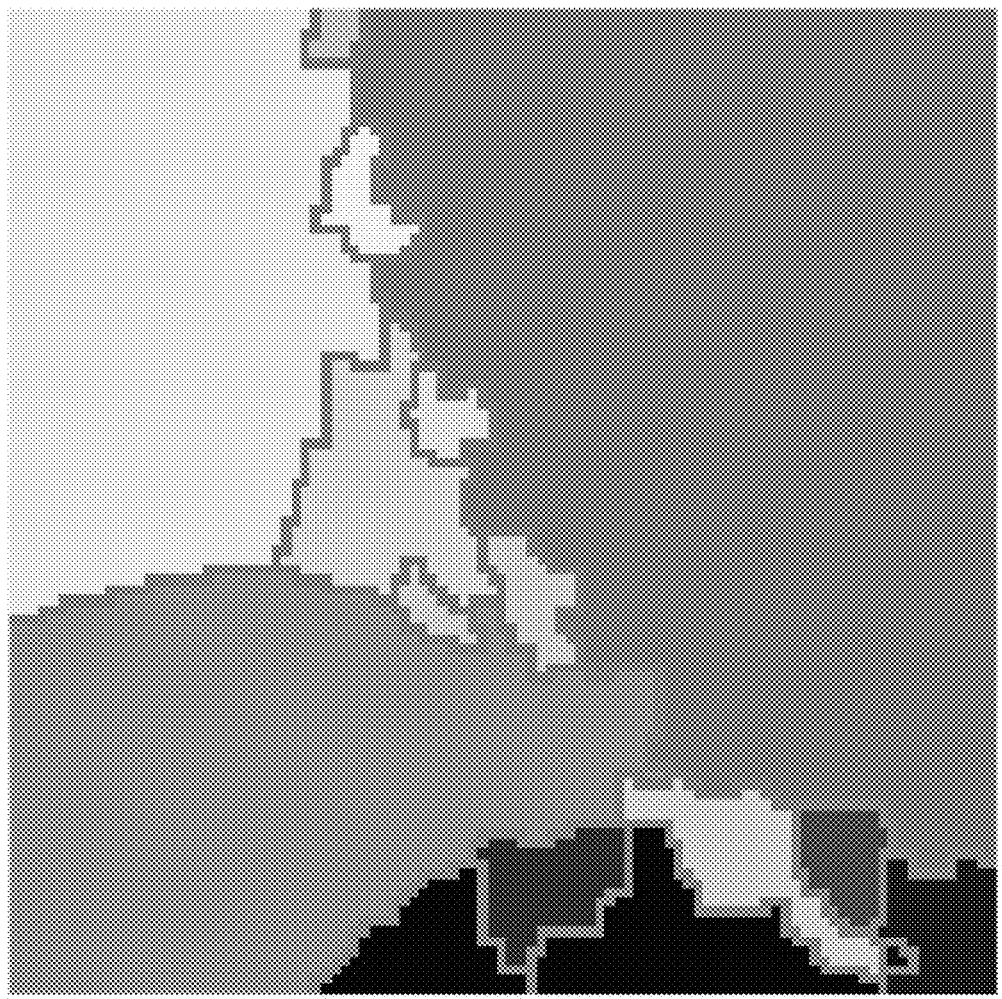
FIG. 63 illustrates the transformation in FIG. 61 with decreased quantization.
Figure 64:
FIG. 64 illustrates example binary segmentation of the magnetic-map fragment in FIG. 63.

A question arising for segmentation is the number of thresholds (similar to quantization levels) and their values. Segmentation can be considered also as roughing the 2D data. Therefore, the number of thresholds may be selected to be at least twice less than the number of quantization levels for the same map tile. FIG. 61 illustrates an example map fragment of size 101 meter by 101 meter that has been interpolated to fill empty (not yet measured) values. Then it may be processed as an image by one of the segmentation techniques. As a result, nine separate areas with similar intensities can be seen, that is, $N_{map\ tile}=9$. This is illustrated in the example of FIG. 62. If the quantization depth is decreased, then the number of segmented areas will increase, as shown in the example of FIG. 63. Now $N_{map\ tile}=17$. Using a simple variant of segmentation, binarization may produce the example binary segmented map fragment illustrated in FIG. 64. Here, the number of segmented areas is equal to 7, $N_{map\ tile}=7$. Any suitable image-segmentation method can be applied to the magnetic map and the value of $$\frac{N_{map\ tile}}{N_{SA}} \cdot 100\%$$

can be obtained. To calculate the segmented areas for the whole mapped region of Babiy Yar, the missed values may be interpolated or the map may be completed by making additional measurements.

Figure 65:
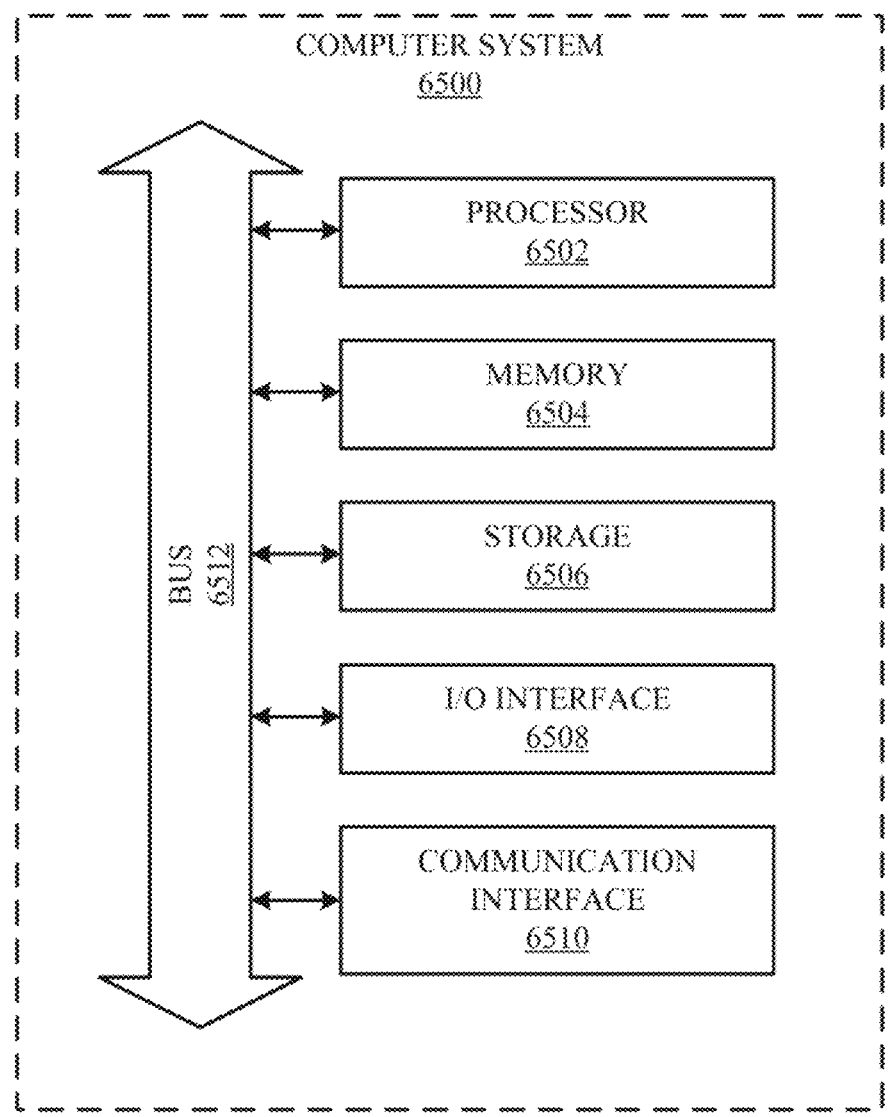
FIG. 65 illustrates an example computer system.

FIG. 65 illustrates an example computer system 6500. In articular embodiments, one or more computer systems 6500 perform one or more steps of one or more methods described or illustrated herein. In particular embodiments, one or more computer systems 6500 provide functionality described or illustrated herein. In particular embodiments, software running on one or more computer systems 6500 performs one or more steps of one or more methods described or illustrated herein or provides functionality described or illustrated herein. Particular embodiments include one or more portions of one or more computer systems 6500. Herein, reference to a computer system may encompass a computing device, and vice versa, where appropriate. Moreover, reference to a computer system may encompass one or more computer systems, where appropriate.

This disclosure contemplates any suitable number of computer systems 6500. This disclosure contemplates computer system 6500 taking any suitable physical form. As example and not by way of limitation, computer system 6500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 6500 may include one or more computer systems 6500; be unitary or distributed; span multiple locations; span multiple machines; span multiple data centers; or reside in a cloud, which may include one or more cloud components in one or more networks. Where appropriate, one or more computer systems 6500 may perform without substantial spatial or temporal limitation one or more steps of one or more methods described or illustrated herein. As an example and not by way of limitation, one or more computer systems 6500 may perform in real time or in batch mode one or more steps of one or more methods described or illustrated herein. One or more computer systems 6500 may perform at different times or at different locations one or more steps of one or more methods described or illustrated herein, where appropriate.

In particular embodiments, computer system 6500 includes a processor 6502, memory 6504, storage 6506, an input/output (I/O) interface 6508, a communication interface 6510, and a bus 6512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 6502 includes hardware for executing instructions, such as those making up a computer program. As an example and not by way of limitation, to execute instructions, processor 6502 may retrieve (or fetch) the instructions from an internal register, an internal cache, memory 6504, or storage 6506; decode and execute them; and then write one or more results to an internal register, an internal cache, memory 6504, or storage 6506. In particular embodiments, processor 6502 may include one or more internal caches for data, instructions, or addresses. This disclosure contemplates processor 6502 including any suitable number of any suitable internal caches, where appropriate. As an example and not by way of limitation, processor 6502 may include one or more instruction caches, one or more data caches, and one or more translation lookaside buffers (TLBs). Instructions in the instruction caches may be copies of instructions in memory 6504 or storage 6506, and the instruction caches may speed up retrieval of those instructions by processor 6502. Data in the data caches may be copies of data in memory 6504 or storage 6506 for instructions executing at processor 6502 to operate on; the results of previous instructions executed at processor 6502 for access by subsequent instructions executing at processor 6502 or for writing to memory 6504 or storage 6506; or other suitable data. The data caches may speed up read or write operations by processor 6502. The TLBs may speed up virtual-address translation for processor 6502. In particular embodiments, processor 6502 may include one or more internal registers for data, instructions, or addresses. This disclosure contemplates processor 6502 including any suitable number of any suitable internal registers, where appropriate. Where appropriate, processor 6502 may include one or more ALUs; be a multi-core processor; or include one or more processors 6502. Although this disclosure describes and illustrates a particular processor, this disclosure contemplates any suitable processor.

In particular embodiments, memory 6504 includes main memory for storing instructions for processor 6502 to execute or data for processor 6502 to operate on. As an example and not by way of limitation, computer system 6500 may load instructions from storage 6506 or another source (such as, for example, another computer system 6500) to memory 6504. Processor 6502 may then load the instructions from memory 6504 to an internal register or internal cache. To execute the instructions, processor 6502 may retrieve the instructions from the internal register or internal cache and decode them. During or after execution of the instructions, processor 6502 may write one or more results (which may be intermediate or final results) to the internal register or internal cache. Processor 6502 may then write one or more of those results to memory 6504. In particular embodiments, processor 6502 executes only instructions in one or more internal registers or internal caches or in memory 6504 (as opposed to storage 6506 or elsewhere) and operates only on data in one or more internal registers or internal caches or in memory 6504 (as opposed to storage 6506 or elsewhere). One or more memory buses (which may each include an address bus and a data bus) may couple processor 6502 to memory 6504. Bus 6512 may include one or more memory buses, as described below. In particular embodiments, one or more memory management units (MMUs) reside between processor 6502 and memory 6504 and facilitate accesses to memory 6504 requested by processor 6502. In particular embodiments, memory 6504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 6504 may include one or more memories 6504, where appropriate. Although this disclosure describes and illustrates particular memory, this disclosure contemplates any suitable memory.

In particular embodiments, storage 6506 includes mass storage for data or instructions. As an example and not by way of limitation, storage 6506 may include a hard disk drive (HDD), a floppy disk drive, flash memory, an optical disc, a magneto-optical disc, magnetic tape, or a Universal Serial Bus (USB) drive or a combination of two or more of these. Storage 6506 may include removable or non-removable (or fixed) media, where appropriate. Storage 6506 may be internal or external to computer system 6500, where appropriate. In particular embodiments, storage 6506 is non-volatile, solid-state memory. In particular embodiments, storage 6506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 6506 taking any suitable physical form. Storage 6506 may include one or more storage control units facilitating communication between processor 6502 and storage 6506, where appropriate. Where appropriate, storage 6506 may include one or more storages 6506. Although this disclosure describes and illustrates particular storage, this disclosure contemplates any suitable storage.

In particular embodiments, I/O interface 6508 includes hardware, software, or both, providing one or more interfaces for communication between computer system 6500 and one or more I/O devices. Computer system 6500 may include one or more of these I/O devices, where appropriate. One or more of these I/O devices may enable communication between a person and computer system 6500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 6508 for them. Where appropriate, I/O interface 6508 may include one or more device or software drivers enabling processor 6502 to drive one or more of these I/O devices. I/O interface 6508 may include one or more I/O interfaces 6508, where appropriate. Although this disclosure describes and illustrates a particular I/O interface, this disclosure contemplates any suitable I/O interface.

In particular embodiments, communication interface 6510 includes hardware, software, or both providing one or more interfaces for communication (such as, for example, packet-based communication) between computer system 6500 and one or more other computer systems 6500 or one or more networks. As an example and not by way of limitation, communication interface 6510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 6510 for it. As an example and not by way of limitation, computer system 6500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 6500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 6500 may include any suitable communication interface 6510 for any of these networks, where appropriate. Communication interface 6510 may include one or more communication interfaces 6510, where appropriate. Although this disclosure describes and illustrates a particular communication interface, this disclosure contemplates any suitable communication interface.

In particular embodiments, bus 6512 includes hardware, software, or both coupling components of computer system 6500 to each other. As an example and not by way of limitation, bus 6512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 6512 may include one or more buses 6512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. The embodiments disclosed herein are only examples, and the scope of this disclosure is not limited to them. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Particular embodiments may include all, some, or none of the components, elements, features, functions, operations, or steps of the embodiments disclosed herein. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   by a first computing device, accessing a magnetic map of an area, wherein the magnetic map comprises a plurality of magnetic-field values for a plurality of locations in the area;
   by the first computing device, accessing an image file, wherein:
     the image file comprises;
       a plurality of pixels that each correspond to one of the locations and comprise a plurality of components; and
       a first matrix comprising a plurality of first elements that each comprise one or more color values; and
     each of one or more of the components of each of one or more of the pixels comprises a link to one of the first elements in the first matrix;
   by the first computing device, embedding one or more portions of the magnetic map into the image file by:
     generating a second matrix for the image file comprising a plurality of second elements that each represent one or more of the magnetic-field values, wherein:
       each of the magnetic-field values is a total magnetic-field value corresponding to a square root of a sum of a square of an x component, a square of a y component, and a square of a z component of a magnetic field associated with the magnetic-field values;
       the magnetic-field values are normalized; and
       the second elements represent the magnetic-field values as normalized; and
     for each of one or more locations in the area, writing to one of the components of the pixel corresponding to the location a link to one of the second elements of the second matrix; and
   by the first computing device, communicating the image file, with the portions of the magnetic map embedded in it, to one or more second computing devices for navigation or localization using the magnetic map.

2. The method of claim 1, wherein navigation or localization using the magnetic map comprises generating a visualization of one or more portions of the magnetic map to be presented to a user on a display.

3. The method of claim 1, wherein the image file is a georeferenced image file.

4. The method of claim 1, wherein the image file is one or more Geographic Tagged Image File Format (GeoTIFF) files or one or more Cloud Optimized GeoTIFF (COG) files.

5. The method of claim 1, wherein the image file is one or more Tagged Image File Format (TIFF) files.

6. The method of claim 1, wherein each of one or more of the second elements further represents:
a declination of the magnetic field; or
an inclination of the magnetic field.

7. The method of claim 1, wherein one or more portions of the area are indoors.

8. The method of claim 1, wherein navigation or localization using the magnetic map comprises applying image processing or computer vision to one or more portions of the magnetic map embedded in the image file.

9. The method of claim 1, wherein the second elements represent the magnetic-field values as Red-Green-Blue (RGB) triplets.

10. The method of claim 9, wherein navigation or localization using the magnetic map comprises:
generating an image of a device's location using RGB triplets that represent one or more magnetic-field values measured at the device's location; and
applying image processing or computer vision to one or more portions of the magnetic map embedded in the image file to localize the image of the device's location within the magnetic map.

11. The method of claim 9, wherein each of one or more of the magnetic-field values is defined according to an East-North-Up (ENU) coordinate frame.

12. The method of claim 1, wherein the magnetic-field values are normalized between zero and 255 for an eight-bit-per-pixel colormap.

13. The method of claim 1, wherein the first computing device is at least one of the second computing devices.

14. One or more computer-readable non-transitory storage media embodying software that is operable when executed to:
access a magnetic map of an area, wherein the magnetic map comprises a plurality of magnetic-field values for a plurality of locations in the area;
access an image file, wherein:
the image file comprises;
a plurality of pixels that each correspond to one of the locations and comprise a plurality of components; and
a first matrix comprising a plurality of first elements that each comprise one or more color values; and
each of one or more of the components of each of one or more of the pixels comprises a link to one of the first elements in the first matrix;
embed one or more portions of the magnetic map into the image file by:
generating a second matrix for the image file comprising a plurality of second elements that each represent one or more of the magnetic-field values, wherein:
each of the magnetic-field values is a total magnetic-field value corresponding to a square root of a sum of a square of an x component, a square of a y component, and a square of a z component of a magnetic field associated with the magnetic-field values;
the magnetic-field values are normalized; and
the second elements represent the magnetic-field values as normalized; and
for each of one or more locations in the area, writing to one of the components of the pixel corresponding to the location a link to one of the second elements of the second matrix; and
communicate the image file, with the portions of the magnetic map embedded in it, to one or more second computing devices for navigation or localization using the magnetic map.

15. The media of claim 14, wherein navigation or localization using the magnetic map comprises generating a visualization of one or more portions of the magnetic map to be presented to a user on a display.

16. The media of claim 14, wherein the image file is a georeferenced image file.

17. The media of claim 14, wherein the image file is one or more Geographic Tagged Image File Format (GeoTIFF) files or one or more Cloud Optimized GeoTIFF (COG) files.

18. The media of claim 14, wherein the image file is one or more Tagged Image File Format (TIFF) files.

19. The media of claim 14, wherein each of one or more of the second elements further represents:
a declination of the magnetic field; or
an inclination of the magnetic field.

20. The media of claim 14, wherein one or more portions of the area are indoors.

21. The media of claim 14, wherein navigation or localization using the magnetic map comprises applying image processing or computer vision to one or more portions of the magnetic map embedded in the image file.

22. The media of claim 14, wherein the second elements represent the magnetic-field values as Red-Green-Blue (RGB) triplets.

23. The media of claim 22, wherein navigation or localization using the magnetic map comprises:
generating an image of a device's location using RGB triplets that represent one or more magnetic-field values measured at the device's location; and
applying image processing or computer vision to one or more portions of the magnetic map embedded in the image file to localize the image of the device's location within the magnetic map.

24. The media of claim 22, wherein each of one or more of the magnetic-field values is defined according to an East-North-Up (ENU) coordinate frame.

25. The media of claim 14, wherein the magnetic-field values are normalized between zero and 255 for an eight-bit-per-pixel colormap.

26. The media of claim 14, wherein the first computing device is at least one of the second computing devices.

27. A system comprising:
one or more processors; and
one or more computer-readable non-transitory storage media coupled to one or more of the processors and comprising instructions operable when executed by one or more of the processors to cause the system to:
access a magnetic map of an area, wherein the magnetic map comprises a plurality of magnetic-field values for a plurality of locations in the area;
access an image file, wherein:
the image file comprises;
a plurality of pixels that each correspond to one of the locations and comprise a plurality of components; and a first matrix comprising a plurality of first elements that each comprise one or more color values; and
each of one or more of the components of each of one or more of the pixels comprises a link to one of the first elements in the first matrix;
embed one or more portions of the magnetic map into the image file by:
generating a second matrix for the image file comprising a plurality of second elements that each represent one or more of the magnetic-field values, wherein:
each of the magnetic-field values is a total magnetic-field value corresponding to a square root of a sum of a square of an x component, a square of a y component, and a square of a z component of a magnetic field associated with the magnetic-field values:
the magnetic-field values are normalized; and
the second elements represent the magnetic-field values as normalized; and
for each of one or more locations in the area, writing to one of the components of the pixel corresponding to the location a link to one of the second elements of the second matrix; and
communicate the image file, with the portions of the magnetic map embedded in it, to one or more second computing devices for navigation or localization using the magnetic map.

28. The system of claim 27, wherein navigation or localization using the magnetic map comprises generating a visualization of one or more portions of the magnetic map to be presented to a user on a display.

29. The system of claim 27, wherein the image file is a georeferenced image file.

30. The system of claim 27, wherein the image file is one or more Geographic Tagged Image File Format (GeoTIFF) files or one or more Cloud Optimized GeoTIFF (COG) files.

31. The system of claim 27, wherein the image file is one or more Tagged Image File Format (TIFF) files.

32. The system of claim 27, wherein each of one or more of the second elements further represents:
a declination of the magnetic field; or
an inclination of the magnetic field.

33. The system of claim 27, wherein one or more portions of the area are indoors.

34. The system of claim 27, wherein navigation or localization using the magnetic map comprises applying image processing or computer vision to one or more portions of the magnetic map embedded in the image file.

35. The system of claim 27, wherein the second elements represent the magnetic-field values as Red-Green-Blue (RGB) triplets.

36. The system of claim 35, wherein navigation or localization using the magnetic map comprises:
generating an image of a device's location using RGB triplets that represent one or more magnetic-field values measured at the device's location; and
applying image processing or computer vision to one or more portions of the magnetic map embedded in the image file to localize the image of the device's location within the magnetic map.

37. The system of claim 35, wherein each of one or more of the magnetic-field values is defined according to an East-North-Up (ENU) coordinate frame.

38. The system of claim 27, wherein the magnetic-field values are normalized between zero and 255 for an eight-bit-per-pixel colormap.

39. The system of claim 27, wherein the first computing device is at least one of the second computing devices.

40. A system comprising:
means for accessing a magnetic map of an area, wherein the magnetic map comprises a plurality of magnetic-field values for a plurality of locations in the area;
means for accessing an image file, wherein:
the image file comprises;
a plurality of pixels that each correspond to one of the locations and comprise a plurality of components; and
a first matrix comprising a plurality of first elements that each comprise one or more color values; and
each of one or more of the components of each of one or more of the pixels comprises a link to one of the first elements in the first matrix;
means for embedding one or more portions of the magnetic map into the image file by:
generating a second matrix for the image file comprising a plurality of second elements that each represent one or more of the magnetic-field values, wherein:
each of the magnetic-field values is a total magnetic-field value corresponding to a square root of a sum of a square of an x component, a square of a y component, and a square of a z component of a magnetic field associated with the magnetic-field values;
the magnetic-field values are normalized; and
the second elements represent the magnetic-field values as normalized; and
for each of one or more locations in the area, writing to one of the components of the pixel corresponding to the location a link to one of the second elements of the second matrix; and
means for communicating the image file, with the portions of the magnetic map embedded in it, to one or more computing devices for navigation or localization using the magnetic map.

* * * * *